US012536901B2

(12) United States Patent
Lu et al.

(10) Patent No.: US 12,536,901 B2
(45) Date of Patent: Jan. 27, 2026

(54) DIGITAL ROAD NETWORK TRAFFIC STATE RECKONING METHOD BASED ON MULTI-SCALE CALCULATION

(71) Applicant: SOUTH CHINA UNIVERSITY OF TECHNOLOGY, Guangdong (CN)

(72) Inventors: Kai Lu, Guangzhou (CN); Yaoting Wu, Guangzhou (CN); Shuyan Jiang, Guangzhou (CN); Kun Zeng, Guangzhou (CN); Yanfang Shou, Guangzhou (CN); Yanglin Chen, Guangzhou (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 18/864,585

(22) PCT Filed: Oct. 12, 2022

(86) PCT No.: PCT/CN2022/124945
§ 371 (c)(1),
(2) Date: Nov. 11, 2024

(87) PCT Pub. No.: WO2023/216504
PCT Pub. Date: Nov. 16, 2023

(65) Prior Publication Data

US 2025/0259536 A1 Aug. 14, 2025

(30) Foreign Application Priority Data

May 11, 2022 (CN) ........................ 202210506795.8

(51) Int. Cl.
*G08G 1/01* (2006.01)

(52) U.S. Cl.
CPC .................................. *G08G 1/0133* (2013.01)

(58) Field of Classification Search
CPC .................................................. G08G 1/0133
(Continued)

(56) References Cited

U.S. PATENT DOCUMENTS 6,216,085 B1 * 4/2001 Emmerink ............. G08G 1/093 701/414
6,339,383 B1 * 1/2002 Kobayashi ............. G08G 1/164 340/917
(Continued)

FOREIGN PATENT DOCUMENTS

CN 102637357 8/2012
CN 104050803 9/2014
(Continued)

OTHER PUBLICATIONS

Zhang, Xuelian et al., "Traffic Demand-based Traffic Congestion Measurement Models for Road Networks", Modern Transportation Technology), vol. 5, No. 6, Dec. 26, 2008 (Dec. 26, 2008), pp. 1-5—translated abstract.

*Primary Examiner* — Luis A Martinez Borrero
(74) *Attorney, Agent, or Firm* — JMB Davis Ben-David

(57) ABSTRACT

A digital road network traffic state reckoning method includes: S1, acquiring traffic weight coefficients of vehicles; S2, calculating traffic weight coefficients of evaluation objects in the road network at different spatial scales; S3, reckoning traffic operation indexes of the different evaluation objects in the road network; S4, reckoning delay time indexes and average delay times of the different evaluation objects in the road network; S5, reckoning indexes of the numbers of times of stopping and average numbers of times of stopping of the different evaluation objects in the road network; and S6, reckoning indexes of mileages of congested roads and proportions of mileages of heavily congested roads of the different evaluation objects in the (Continued)

road network by using the mileages of the heavily congested roads and the traffic weight coefficients of the vehicles.

6 Claims, 2 Drawing Sheets

(58) Field of Classification Search
USPC .......................................................... 701/117
See application file for complete search history.

(56) References Cited

U.S. PATENT DOCUMENTS 6,490,519 B1 * 12/2002 Lapidot ............ G08G 1/096775 701/119
7,912,628 B2 * 3/2011 Chapman ............. G08G 1/0141 701/117
8,090,524 B2 * 1/2012 Chapman ........... G01C 21/3691 701/119
8,483,940 B2 * 7/2013 Chapman ........... G01C 21/3691 701/119
8,682,571 B2 * 3/2014 Chapman ............. G08G 1/0141 701/119
8,798,897 B2 8/2014 Fei
8,880,324 B2 * 11/2014 Chapman ............. G08G 1/0104 701/119
8,909,463 B2 * 12/2014 Chapman ............. G08G 1/0129 701/119
9,068,852 B2 * 6/2015 Mason ................. G06Q 10/047
9,280,894 B2 * 3/2016 Chapman ............. G08G 1/0112
9,439,044 B2 * 9/2016 Hopcraft ............. H04W 64/003
11,188,575 B2 * 11/2021 Giurgiu ............... G06F 16/2365
11,598,646 B2 * 3/2023 Kim ..................... G08G 1/0125
11,657,706 B2 * 5/2023 Fowe ................... G08G 1/0141 701/119
11,670,163 B2 * 6/2023 Aguirrebeitia ....... G08G 1/0133 701/117
11,775,936 B1 * 10/2023 Zhang ..................... G06F 17/18 705/7.18
11,922,802 B2 * 3/2024 Lorenz ................. G08G 1/0141
11,928,961 B2 * 3/2024 Dhillon ............ G08G 1/096725
12,131,630 B2 * 10/2024 Ionescu .................. G08G 1/065
12,230,129 B2 * 2/2025 Zeiynali Farid ..... G08G 1/0133
2003/0069683 A1 * 4/2003 Lapidot ............ G08G 1/096725 701/423
2008/0071465 A1 * 3/2008 Chapman ........... G01C 21/3691 701/117
2010/0211309 A1 * 8/2010 Sugawara ........ G08G 1/096816 701/533
2011/0153189 A1 * 6/2011 Chiang .............. G01C 21/3492 707/790
2011/0173015 A1 * 7/2011 Chapman ............. G08G 1/0116 701/119
2012/0109506 A1 5/2012 Fei
2012/0150425 A1 * 6/2012 Chapman ............. G08G 1/0129 701/119
2013/0214940 A1 * 8/2013 Sako .................... G08G 1/0133 340/905
2013/0289862 A1 * 10/2013 Chapman ................. G08G 1/00 701/119
2013/0297387 A1 * 11/2013 Michael ................. G06Q 30/02 705/13
2014/0149028 A1 * 5/2014 Chapman ............. G08G 1/0116 701/119
2014/0149030 A1 * 5/2014 Chapman ................. G08G 1/00 701/119
2015/0094941 A1 * 4/2015 Chapman ............. G08G 1/0133 701/119
2015/0154862 A1 * 6/2015 Bespalov ............. G08G 1/0129 701/117
2016/0055744 A1 * 2/2016 Branson ............... G08G 1/0112 340/916
2017/0262790 A1 * 9/2017 Khasis ............... G01C 21/3415
2017/0345293 A1 * 11/2017 Littlejohn .............. G08G 1/091
2018/0122234 A1 * 5/2018 Nascimento ........... G08G 1/093
2018/0174449 A1 * 6/2018 Nguyen ................. G08G 1/012
2019/0325741 A1 * 10/2019 Xu ....................... G08G 1/0133
2021/0375129 A1 * 12/2021 Meng ..................... G06N 3/045
2023/0115110 A1 * 4/2023 Yang .................... G08G 1/0112 701/117
2023/0186760 A1 * 6/2023 Littlejohn ................ G08G 1/04 701/117

FOREIGN PATENT DOCUMENTS

| | | |
|---|---|---|
| CN | 105139645 | 12/2015 |
| CN | 109741599 | 5/2019 |
| CN | 110807919 | 2/2020 |
| CN | 111081019 | 4/2020 |
| CN | 113688561 | 11/2021 |
| CN | 114898556 | 8/2022 |
| CN | 117435351 | 1/2024 |
| WO | 2016169290 | 10/2016 |
| WO | 2023216504 | 11/2023 |

* cited by examiner

DIGITAL ROAD NETWORK TRAFFIC STATE RECKONING METHOD BASED ON MULTI-SCALE CALCULATION

CROSS-REFERENCE TO RELATED APPLICATION

This is the U.S. National Stage of International Patent Application No. PCT/CN2022/124945 filed on Oct. 12, 2022, which claims the benefit of priority to Chinese Patent Application No. 202210506795.8, filed May 11, 2022.

FIELD OF THE INVENTION

The present invention relates to the technical field of traffic operation evaluation, and in particular to a digital road network traffic state reckoning method based on multi-scale calculation.

BACKGROUND OF THE INVENTION

As characteristic indexes for evaluating urban road network traffic operation states, a traffic operation index, an average delay time, an average number of times of stopping, and a proportion of a mileage of a heavily congested road have been proposed in the national and local urban traffic operation state evaluation norms and standards consecutively. They are important indexes that comprehensively reflect smooth flows and congestion of urban road traffic operation, and have good comparability, relative independence, and an ability of quantitatively describing the road traffic operation states.

However, at present, relevant evaluation and analysis on traffic operation states of a road network based on the traffic operation state evaluation indexes are mainly to calculate evaluation indexes reflecting traffic operation states of one evaluation object within different evaluation periods, so as to perform comparison to obtain relevant evaluation conclusions. An existing method is usually difficultly applicable to analysis and calculation on various evaluation objects in different sizes, with different structures, and at different scales in a road network. At the same time, deepening development of an intelligent transportation technology puts forward new requirements for research, judgment, and analysis on the urban road network traffic operation states. How to construct a digital urban traffic road network and analyze the operation states from a macro-view road network to a medium-view road to a lane and even a single vehicle has become an internal need for intelligent urban traffic management and control.

Therefore, how to unify traffic operation state calculation methods for various evaluation objects through scientific and reasonable normalization processing to form a digital road network traffic state reckoning method based on multi-scale calculation, which provides technical support for a design on an urban traffic digital road network architecture, so as to have important theoretical value and practical significance.

SUMMARY OF THE INVENTION

A purpose of the present invention is to provide a digital road network traffic state reckoning method based on multi-scale calculation, which, on the basis of normalizing traffic operation state evaluation indexes, weights different compositions in a road network by means of traffic weight coefficients, so as to unify traffic operation state evaluation methods in aspects of an evaluation time, an evaluation space, and an evaluation range, thereby enabling relevant evaluation indexes to be applied to evaluation on urban road network traffic operation states in different sizes, with different structures, and at different scales.

In order to achieve the above purpose of the present invention, the present invention provides the following technical solution:

A digital road network traffic state reckoning method based on multi-scale calculation provided by the present invention includes the following steps:

S1, acquiring traffic weight coefficients of vehicles according to free-flow driving times of the vehicles and an overall free-flow driving time of a road network;

S2, calculating traffic weight coefficients of evaluation objects in the road network at different spatial scales level by level in combination with the traffic weight coefficients of the vehicles and a composition structure of the road network;

S3, reckoning traffic operation indexes of various lanes, various sub-sections, various sections, various intersections, various roads, various sub-zones, and the road network by using an average travel time, the free-flow driving times, and the traffic weight coefficients of the vehicles;

S4, reckoning delay time indexes of various lanes, various sub-sections, various sections, various intersections, various roads, various sub-zones, and the road network by using an average delay time, the free-flow driving times, and the traffic weight coefficients of the vehicles, and calculating average delay times of various evaluation objects at the different spatial scales in combination with the free-flow driving times of the vehicles;

S5, reckoning indexes of numbers of times of stopping of various lanes, various sub-sections, various sections, various intersections, various roads, various sub-zones, and the road network by using an average number of times of stopping, the free-flow driving times, and the traffic weight coefficients of the vehicles, and calculating average numbers of times of stopping of various evaluation objects at the different spatial scales in combination with the free-flow driving times of the vehicles; and S6, reckoning indexes of mileages of congested roads of various lanes, various sub-sections, various sections, various intersections, various roads, various sub-zones, and the road network by using mileages of heavily congested roads, the free-flow driving times, and the traffic weight coefficients of the vehicles, and calculating proportions of the mileages of the heavily congested roads of various evaluation objects at the different spatial scales in combination with free-flow driving speeds of the vehicles.

As a preferred technical solution, in step S1, the traffic weight coefficient of each vehicle is a ratio of the overall free-flow driving time of a certain passing vehicle in the road network to the overall free-flow driving time of all vehicles in the road network, which is obtained by summing the traffic weight coefficients of the vehicle on various through lanes in the road network, and reflects a proportion of the certain passing vehicle occupying an overall road time-space resource of the road network; and a formula of the traffic weight coefficient is as follows:

$$w_v^V = \frac{t_{f_v}^V}{\sum_{v=1}^{N^V} t_{f_v}^V} = \frac{\sum_{l \in S_{V,v}^L} t_{f_{(v,l)}}^V}{\sum_{v=1}^{N^V} \sum_{l \in S_{V,v}^L} t_{f_{(v,l)}}^V} =$$

-continued $$\frac{\sum_{l\in S_{V,v}^L} tf_l^L}{\sum_{v=1}^{N^V}\sum_{l\in S_{V,v}^L} tf_l^L} = \sum_{l\in S_{V,v}^L}\frac{tf_l^L}{\sum_{v=1}^{N^V}\sum_{l\in S_{V,v}^L} tf_l^L} = \sum_{l\in S_{V,v}^L} w_{(v,l)}^V$$

wherein $w_v^V$ is a traffic weight coefficient of the $v^{th}$ vehicle $V_v$ in the road network; $t_{fv}^V$ is an overall free-flow driving time of the vehicle $V_v$ passing the road network; $N^V$ is the number of vehicles passing the road network within an evaluation period; $S_{V,v}^L$ is a set of lanes through which the vehicle $V_v$ passes in the road network within the evaluation period; $t_{f(v,l)}^V$ is a free-flow driving time of the vehicle $V_v$ passing the $l^{th}$ lane $L_l$ in the road network; $t_{fl}^L$ is an average free-flow driving time of the vehicles passing the lane $L_l$; and $w_{(v,l)}^V$ is a traffic weight coefficient of the vehicle $V_v$ on the lane $L_l$.

As a preferred technical solution, step S2 is specifically as follows:

according to a definition of the traffic weight coefficient, for the traffic weight coefficients of each evaluation object in the road network at the different spatial scales, each value is a ratio of the overall free-flow driving time of all the passing vehicles within a period of time to the overall free-flow driving time of all the vehicles in the whole road network for each evaluation object; and the traffic weight coefficients of all compositions belonging to one evaluation object at a same spatial scale are summed to obtain the traffic weight coefficient of the evaluation object, which is specifically as follows:

a traffic weight coefficient of the vehicle $V_v$ passing the lane $L_l$ is reckoned as follows:

$$w_{(v,l)}^V = \frac{tf_{(v,l)}^V}{\sum_{v=1}^{N^V}\sum_{l\in S_{V,v}^L} tf_{(v,l)}^V}$$

a traffic weight coefficient of the lane $L_l$ is reckoned as follows:

$$w_l^L = \frac{\sum_{v\in S_{L,l}^V} tf_{(v,l)}^V}{\sum_{v=1}^{N^V}\sum_{l\in S_{V,v}^L} tf_{(v,l)}^V} = \sum_{V\in S_{L,l}^V}\frac{tf_{(v,l)}^V}{\sum_{v=1}^{N^V}\sum_{l\in S_{V,v}^L} tf_{(v,l)}^V} = \sum_{v\in S_{L,l}^V} w_{(v,l)}^V$$

a traffic weight coefficient of a subsection $U_u$ is reckoned as follows:

$$w_u^U = \frac{\sum_{l\in S_{U,u}^L}\sum_{v\in S_{L,l}^V} tf_{(v,l)}^V}{\sum_{v=1}^{N^V}\sum_{l\in S_{V,v}^L} tf_{(v,l)}^V} = \sum_{l\in S_{U,u}^L}\frac{\sum_{v\in S_{L,l}^V} tf_{(v,l)}^V}{\sum_{v=1}^{N^V}\sum_{l\in S_{V,v}^L} tf_{(v,l)}^V} = \sum_{l\in S_{U,u}^L} w_l^L$$

a traffic weight coefficient of a section $S_s$ is reckoned as follows:

$$w_s^S = \frac{\sum_{u\in S_{S,s}^U}\sum_{l\in S_{U,u}^L}\sum_{v\in S_{L,l}^V} tf_{(v,l)}^V}{\sum_{v=1}^{N^V}\sum_{l\in S_{V,v}^L} tf_{(v,l)}^V} =$$

-continued $$\sum_{u\in S_{S,s}^U}\frac{\sum_{l\in S_{U,u}^L}\sum_{v\in S_{L,l}^V} tf_{(v,l)}^V}{\sum_{v=1}^{N^V}\sum_{l\in S_{V,v}^L} tf_{(v,l)}^V} = \sum_{u\in S_{S,s}^U} w_u^U = \sum_{l\in S_{S,s}^L} w_l^L$$

a traffic weight coefficient of an intersection $I_i$ is reckoned as follows:

$$w_i^I = \frac{\sum_{l\in S_{I,i}^L}\sum_{v\in S_{L,l}^V} tf_{(v,l)}^V}{\sum_{v=1}^{N^V}\sum_{l\in S_{V,v}^L} tf_{(v,l)}^V} = \sum_{l\in S_{I,i}^L}\frac{\sum_{v\in S_{L,l}^V} tf_{(v,l)}^V}{\sum_{v=1}^{N^V}\sum_{l\in S_{V,v}^L} tf_{(v,l)}^V} = \sum_{l\in S_{I,i}^L} w_l^L$$

a traffic weight coefficient of a road $R_r$ is reckoned as follows:

$$w_r^R = \frac{\sum_{s\in S_{R,r}^S}\sum_{u\in S_{S,s}^U}\sum_{l\in S_{U,u}^L}\sum_{v\in S_{L,l}^V} tf_{(v,l)}^V + \sum_{i\in S_{R,r}^I}\sum_{l\in S_{I,i}^L}\sum_{v\in S_{L,l}^V} tf_{(v,l)}^V}{\sum_{v=1}^{N^V}\sum_{l\in S_{V,v}^L} tf_{(v,l)}^V} = \sum_{s\in S_{R,r}^S} w_s^S + \sum_{i\in S_{R,r}^I} w_i^I = \sum_{l\in S_{R,r}^L} w_l^L$$

a traffic weight coefficient of a sub-zone $Z_z$ is reckoned as follows:

$$w_z^Z = \frac{\sum_{s\in S_{Z,z}^S}\sum_{u\in S_{S,s}^U}\sum_{l\in S_{U,u}^L}\sum_{v\in S_{L,l}^V} tf_{(v,l)}^V + \sum_{i\in S_{Z,z}^I}\sum_{l\in S_{I,i}^L}\sum_{v\in S_{L,l}^V} tf_{(v,l)}^V}{\sum_{v=1}^{N^V}\sum_{l\in S_{V,v}^L} tf_{(v,l)}^V} = \sum_{s\in S_{Z,z}^S} w_s^S + \sum_{i\in S_{Z,z}^I} w_i^I = \sum_{l\in S_{Z,z}^L} w_l^L$$

wherein $w_l^L$ is the traffic weight coefficient of the lane $L_l$; $S_{L,l}^V$ is a set of vehicles passing the lane $L_l$ within the evaluation period; $w_u^U$ is the traffic weight coefficient of the $u^{th}$ subsection $U_u$ in the road network; $S_{U,u}^L$ is a set of lanes contained in the subsection $U_u$; $w_s^S$ is the traffic weight coefficient of the $s^{th}$ section $S_s$ in the road network; $S_{S,s}^U$ is a set of sub-sections contained in the section $S_s$; $S_{S,s}^L$ is a set of lanes contained in the section $S_s$; $w_i^I$ is the traffic weight coefficient of the $i^{th}$ intersection $I_i$ in the road network; $S_{I,i}^L$ is a set of lanes contained in the intersection $I_i$; $w_r^R$ is the traffic weight coefficient of the $r^{th}$ road $R_r$ in the road network; $S_{R,r}^S$ is a set of sections contained in the road $R_r$; $S_{R,r}^I$ is a set of intersections contained in the road $R_r$; $S_{R,r}^L$ is a set of lanes contained in the road $R_r$; $w_z^Z$ is the traffic weight coefficient of the $z^{th}$ sub-zone $Z_z$ in the road network; $S_{Z,z}^S$ is a set of sections contained in the sub-zone $Z_z$; $S_{Z,z}^I$ is a set of intersections contained in the sub-zone $Z_z$; and $S_{Z,z}^L$ is a set of lanes contained in the sub-zone $Z_z$; and according to the definition of the traffic weight coefficient of the road network, the traffic weight coefficients of all the vehicles, lanes, road sections, and intersections in the road network are summed respectively, with each sum being 1; and a formula is as follows:

$$w^A=\frac{\sum_{s=1}^{N^S}\sum_{u\in S^U_{S,s}}\sum_{l\in S^L_{U,u}}\sum_{v\in S^V_{L,l}}tf^V_{(v,l)}+\sum_{i=1}^{N^I}\sum_{l\in S^L_{I,i}}\sum_{v\in S^V_{L,l}}tf^V_{(v,l)}}{\sum_{v=1}^{N^V}\sum_{l\in S^L_{V,v}}tf^V_{(v,l)}}=$$

$$\sum_{s=1}^{N^S}w^S_s+\sum_{i=1}^{N^I}w^I_i=\sum_{u=1}^{N^U}w^U_u+\sum_{i=1}^{N^I}w^I_i=\sum_{l=1}^{N^L}w^L_l=\sum_{v=1}^{N^V}w^V_v=\sum_{l\in S^L_A}\sum_{v\in S^V_{L,l}}w^V_{(v,l)}=1$$

wherein $w^A$ is the overall traffic weight coefficient of the road network; $N^S$ is the number of sections in the road network; $N^I$ is the number of intersections in the road network; $N^U$ is the number of sub-sections in the road network; and $N^L$ is the number of lanes in the road network.

As a preferred technical solution, step S3 is specifically as follows:

the traffic operation index of each evaluation object in the road network is a ratio of an overall travel time of all the passing vehicles in each evaluation object to the overall free-flow driving time, that is, an average travel time of all the passing vehicles in a distance corresponding to a unit free-flow driving time; and the traffic operation index of each evaluation object may be obtained by weighted summation of the traffic weight coefficients and the traffic operation indexes of the vehicles, the lanes, the sub-sections, the sections, and the intersections belonging to the evaluation object, and the traffic operation index is dimensionless, specifically as follows:

a traffic operation index of the vehicle $V_v$ passing the lane $L_l$ is reckoned as follows:

$$PI^V_{(v,l)}=\frac{t^V_{(v,l)}}{tf^V_{(v,l)}}$$

a traffic operation index of the vehicle $V_v$ is reckoned as follows:

$$PI^V_v=\frac{\sum_{l\in S^L_{V,v}}t^V_{(v,l)}}{\sum_{l\in S^L_{V,v}}tf^L_l}=$$

$$\frac{\sum_{l\in S^L_{V,v}}\left(PI^V_{(v,l)}\times tf^V_{(v,l)}\right)}{\sum_{v=1}^{N^V}\sum_{l\in S^L_{V,v}}tf^L_l}\times\frac{\sum_{v=1}^{N^V}\sum_{l\in S^L_{V,v}}tf^L_l}{\sum_{l\in S^L_{V,v}}tf^L_l}=\frac{\sum_{l\in S^L_{V,v}}\left(PI^V_{(v,l)}\times w^V_{(v,l)}\right)}{\sum_{l\in S^L_{V,v}}w^V_{(v,l)}}$$

a traffic operation index of the lane $L_l$ is reckoned as follows:

$$PI^L_l=\frac{\sum_{v\in S^V_{L,l}}t^V_{(v,l)}}{\sum_{v\in S^V_{L,l}}tf^V_{(v,l)}}=$$

-continued $$\frac{\sum_{v\in S^V_{L,l}}t^V_{(v,l)}}{\sum_{v=1}^{N^V}\sum_{l\in S^L_{V,v}}tf^V_{(v,l)}}\times\frac{\sum_{v=1}^{N^V}\sum_{l\in S^L_{V,v}}tf^V_{(v,l)}}{\sum_{v\in S^V_{L,l}}t^V_{(v,l)}}=\frac{\sum_{v\in S^V_{L,l}}\left(PI^V_{(v,l)}\times w^V_{(v,l)}\right)}{\sum_{v\in S^V_{L,l}}w^V_{(v,l)}}$$

a traffic operation index of a subsection $U_u$ is reckoned as follows:

$$PI^U_u=\frac{\sum_{l\in S^L_{U,u}}\sum_{v\in S^V_{L,l}}t^V_{(v,l)}}{\sum_{l\in S^L_{U,u}}\sum_{v\in S^V_{L,l}}tf^V_{(v,l)}}=$$

$$\frac{\sum_{l\in S^L_{U,u}}\sum_{v\in S^V_{L,l}}\left(PI^V_{(v,l)}\times w^V_{(v,l)}\right)}{\sum_{l\in S^L_{U,u}}\sum_{v\in S^V_{L,l}}w^V_{(v,l)}}=\frac{\sum_{l\in S^L_{U,u}}\left(PI^L_l\times w^L_l\right)}{\sum_{l\in S^L_{U,u}}w^L_l};$$

a traffic operation index of the section $S_s$ is reckoned as follows:

$$PI^S_s=\frac{\sum_{u\in S^U_{S,s}}\sum_{l\in S^L_{U,u}}\sum_{v\in S^V_{L,l}}t^V_{(v,l)}}{\sum_{u\in S^U_{S,s}}\sum_{l\in S^L_{U,u}}\sum_{v\in S^V_{L,l}}tf^V_{(v,l)}}=\frac{\sum_{l\in S^L_{S,s}}\sum_{v\in S^V_{L,l}}\left(PI^V_{(v,l)}\times w^V_{(v,l)}\right)}{\sum_{l\in S^L_{S,s}}\sum_{v\in S^V_{L,l}}w^V_{(v,l)}}=$$

$$\frac{\sum_{l\in S^L_{S,s}}\left(PI^L_l\times w^L_l\right)}{\sum_{l\in S^L_{S,s}}w^L_l}=\frac{\sum_{u\in S^U_{S,s}}\left(PI^U_u\times w^U_u\right)}{\sum_{u\in S^U_{S,s}}w^U_u}$$

a traffic operation index of the intersection $I_i$ is reckoned as follows:

$$PI^I_i=\frac{\sum_{l\in S^L_{I,i}}\sum_{v\in S^V_{L,l}}t^V_{(v,l)}}{\sum_{l\in S^L_{I,i}}\sum_{v\in S^V_{L,l}}tf^V_{(v,l)}}=$$

$$\frac{\sum_{l\in S^L_{I,i}}\sum_{v\in S^V_{L,l}}\left(PI^V_{(v,l)}\times w^V_{(v,l)}\right)}{\sum_{l\in S^L_{I,i}}\sum_{v\in S^V_{L,l}}w^V_{(v,l)}}=\frac{\sum_{l\in S^L_{I,i}}\left(PI^L_l\times w^L_l\right)}{\sum_{l\in S^L_{I,i}}w^L_l}$$

a traffic operation index of the road $R_r$ is reckoned as follows:

$$PI^R_r=\frac{\sum_{s\in S^S_{R,r}}\sum_{u\in S^U_{S,s}}\sum_{l\in S^L_{U,u}}\sum_{v\in S^V_{L,l}}t^V_{(v,l)}+\sum_{i\in S^I_{R,r}}\sum_{l\in S^L_{I,i}}\sum_{v\in S^V_{L,l}}t^V_{(v,l)}}{\sum_{s\in S^S_{R,r}}\sum_{u\in S^U_{S,s}}\sum_{l\in S^L_{U,u}}\sum_{v\in S^V_{L,l}}tf^V_{(v,l)}+\sum_{i\in S^I_{R,r}}\sum_{l\in S^L_{I,i}}\sum_{v\in S^V_{L,l}}tf^V_{(v,l)}}=$$

$$\frac{\sum_{l\in S^L_{R,r}}\sum_{v\in S^V_{L,l}}t^V_{(v,l)}}{\sum_{l\in S^L_{R,r}}\sum_{v\in S^V_{L,l}}tf^V_{(v,l)}}=\frac{\sum_{l\in S^L_{R,r}}\left(PI^L_l\times w^L_l\right)}{\sum_{l\in S^L_{R,r}}w^L_l}$$

a traffic operation index of a sub-zone $Z_z$ is reckoned as follows:

$$PI_z^Z=\frac{\sum_{s\in S_{Z,z}^S}\sum_{u\in S_{S,s}^U}\sum_{l\in S_{U,u}^L}\sum_{v\in S_{L,l}^V}t_{(v,l)}^V+\sum_{i\in S_{Z,z}^I}\sum_{l\in S_{I,i}^L}\sum_{v\in S_{L,l}^V}t_{(v,l)}^V}{\sum_{s\in S_{Z,z}^S}\sum_{u\in S_{S,s}^U}\sum_{l\in S_{U,u}^L}\sum_{v\in S_{L,l}^V}tf_{(v,l)}^V+\sum_{i\in S_{Z,z}^I}\sum_{l\in S_{I,i}^L}\sum_{v\in S_{L,l}^V}tf_{(v,l)}^V}=$$

$$\frac{\sum_{l\in S_{Z,z}^L}\sum_{v\in S_{L,l}^V}t_{(v,l)}^V}{\sum_{l\in S_{Z,z}^L}\sum_{v\in S_{L,l}^V}tf_{(v,l)}^V}=\frac{\sum_{l\in S_{Z,z}^L}\left(PI_l^L\times w_l^L\right)}{\sum_{l\in S_{Z,z}^L}w_l^L}$$

a traffic operation index of a zone is reckoned as follows:

$$PI^A=\frac{\sum_{s\in S_A^S}\sum_{u\in S_{S,s}^U}\sum_{l\in S_{U,u}^L}\sum_{v\in S_{L,l}^V}t_{(v,l)}^V+\sum_{i\in S_A^I}\sum_{l\in S_{I,i}^L}\sum_{v\in S_{L,l}^V}t_{(v,l)}^V}{\sum_{s\in S_A^S}\sum_{u\in S_{S,s}^U}\sum_{l\in S_{U,u}^L}\sum_{v\in S_{L,l}^V}tf_{(v,l)}^V+\sum_{i\in S_A^I}\sum_{l\in S_{I,i}^L}\sum_{v\in S_{L,l}^V}tf_{(v,l)}^V}=$$

$$\frac{\sum_{l\in S_A^L}\sum_{v\in S_{L,l}^V}t_{(v,l)}^V}{\sum_{l\in S_A^L}\sum_{v\in S_{L,l}^V}tf_{(v,l)}^V}=\sum_{l\in S_A^L}\left(PI_l^L\times w_l^L\right)$$

wherein $PI_{(v,l)}^V$ is the traffic operation index of the vehicle $V_v$ on the lane $L_l$; $t_{(v,l)}^V$ is a travel time of the vehicle $V_v$ passing the lane $L_l$; $PI_v^V$, $PI_l^L$, $PI_u^U$, $PI_s^S$, $PI_i^I$, $PI_r^R$, $PI_z^Z$, and $PI^A$ represent traffic operation indexes of the vehicle $V_v$, the lane $L_l$, the subsection $U_u$, the section, $S_s$, the intersection $I_i$, the road $R_r$, the sub-zone $Z_z$, and the zone respectively; $S_A^S$ is a set of sections contained in the zone; $S_A^I$ is a set of intersections contained in the zone; and $S_A^L$ is a set of lanes contained in the zone.

As a preferred technical solution, step S4 is specifically as follows:

S401, reckoning the delay time indexes of various evaluation objects at multiple spatial scales, wherein the delay time index of each evaluation object in the road network is a ratio of an overall delay time of all the passing vehicles in each evaluation object to the overall free-flow driving time, that is, an average delay time of all the passing vehicles in the distance corresponding to the unit free-flow driving time; and the delay time index of each evaluation object may be obtained by weighted summation of the traffic weight coefficients and the delay time indexes of the vehicles, the lanes, the sub-sections, the sections, and the intersections belonging to the evaluation object, and the traffic operation index is dimensionless, having an ability to further calculate the average delay time, specifically as follows:

a delay time index of the vehicle $V_v$ passing the lane $L_l$ is reckoned as follows:

$$DI_{(v,l)}^V=\frac{d_{(v,l)}^V}{tf_{(v,l)}^V}$$

a delay time index of the vehicle $V_v$ is reckoned as follows:

$$DI_v^V=\frac{\sum_{l\in S_{V,v}^L}d_{(v,l)}^V}{\sum_{l\in S_{V,v}^L}tf_l^L}=$$

$$\frac{\sum_{l\in S_{V,v}^L}\left(DI_{(v,l)}^V\times tf_{(v,l)}^V\right)}{\sum_{v=1}^{N^V}\sum_{l\in S_{V,v}^L}tf_l^L}\times\frac{\sum_{v=1}^{N^V}\sum_{l\in S_{V,v}^L}tf_l^L}{\sum_{l\in S_{V,v}^L}tf_l^L}=\frac{\sum_{l\in S_{V,v}^L}\left(DI_{(v,l)}^V\times w_{(v,l)}^V\right)}{\sum_{l\in S_{V,v}^L}w_{(v,l)}^V}$$

a delay time index of the lane $L_l$ is reckoned as follows:

$$DI_l^L=\frac{\sum_{v\in S_{L,l}^V}d_{(v,l)}^V}{\sum_{v\in S_{L,l}^V}tf_{(v,l)}^V}=$$

$$\frac{\sum_{v\in S_{L,l}^V}d_{(v,l)}^V}{\sum_{v=1}^{N^V}\sum_{l\in S_{V,v}^L}tf_{(v,l)}^V}\times\frac{\sum_{v=1}^{N^V}\sum_{l\in S_{V,v}^L}tf_{(v,l)}^V}{\sum_{v\in S_{L,l}^V}tf_{(v,l)}^V}=\frac{\sum_{v\in S_{L,l}^V}\left(DI_{(v,l)}^V\times w_{(v,l)}^V\right)}{\sum_{v\in S_{L,l}^V}w_{(v,l)}^V}$$

a delay time index of a subsection $U_u$ is reckoned as follows:

$$DI_u^U=\frac{\sum_{l\in S_{U,u}^L}\sum_{v\in S_{L,l}^V}d_{(v,l)}^V}{\sum_{l\in S_{U,u}^L}\sum_{v\in S_{L,l}^V}tf_{(v,l)}^V}=$$

$$\frac{\sum_{l\in S_{U,u}^L}\sum_{v\in S_{L,l}^V}\left(DI_{(v,l)}^V\times w_{(v,l)}^V\right)}{\sum_{l\in S_{U,u}^L}\sum_{v\in S_{L,l}^V}w_{(v,l)}^V}=\frac{\sum_{l\in S_{U,u}^L}\left(DI_l^L\times w_l^L\right)}{\sum_{l\in S_{U,u}^L}w_l^L}$$

a delay time index of the section $S_s$ is reckoned as follows:

$$DI_s^S=$$

$$\frac{\sum_{u\in S_{S,s}^U}\sum_{l\in S_{U,u}^L}\sum_{v\in S_{L,l}^V}d_{(v,l)}^V}{\sum_{u\in S_{S,s}^U}\sum_{l\in S_{U,u}^L}\sum_{v\in S_{L,l}^V}tf_{(v,l)}^V}=\frac{\sum_{l\in S_{S,s}^L}\sum_{v\in S_{L,l}^V}\left(DI_{(v,l)}^V\times w_{(v,l)}^V\right)}{\sum_{l\in S_{S,s}^L}\sum_{v\in S_{L,l}^V}w_{(v,l)}^V}=$$

$$\frac{\sum_{l\in S_{S,s}^L}\left(DI_l^L\times w_l^L\right)}{\sum_{l\in S_{S,s}^L}w_l^L}=\frac{\sum_{u\in S_{S,s}^U}\left(DI_u^U\times w_u^U\right)}{\sum_{u\in S_{S,s}^U}w_u^U}$$

a delay time index of the intersection $I_i$ is reckoned as follows:

$$DI_i^I=\frac{\sum_{l\in S_{I,i}^L}\sum_{v\in S_{L,l}^V}d_{(v,l)}^V}{\sum_{l\in S_{I,i}^L}\sum_{v\in S_{L,l}^V}tf_{(v,l)}^V}=$$

$$\frac{\sum_{l\in S_{I,i}^L}\sum_{v\in S_{L,l}^V}\left(DI_{(v,l)}^V\times w_{(v,l)}^V\right)}{\sum_{l\in S_{I,i}^L}\sum_{v\in S_{L,l}^V}w_{(v,l)}^V}=\frac{\sum_{l\in S_{I,i}^L}\left(DI_l^L\times w_l^L\right)}{\sum_{l\in S_{I,i}^L}w_l^L}$$

a delay time index of the road $R_r$ is reckoned as follows:

$$DI_r^R = \frac{\sum_{s\in S^S_{R,r}}\sum_{u\in S^U_{S,s}}\sum_{l\in S^L_{U,u}}\sum_{v\in S^V_{L,l}} d^V_{(v,l)} + \sum_{i\in S^I_{R,r}}\sum_{l\in S^L_{I,i}}\sum_{v\in S^V_{L,l}} d^V_{(v,l)}}{\sum_{s\in S^S_{R,r}}\sum_{u\in S^U_{S,s}}\sum_{l\in S^L_{U,u}}\sum_{v\in S^V_{L,l}} tf^V_{(v,l)} + \sum_{i\in S^I_{R,r}}\sum_{l\in S^L_{I,i}}\sum_{v\in S^V_{L,l}} tf^V_{(v,l)}} = \frac{\sum_{l\in S^L_{R,r}}\sum_{v\in S^V_{L,l}} d^V_{(v,l)}}{\sum_{l\in S^L_{R,r}}\sum_{v\in S^V_{L,l}} tf^V_{(v,l)}} = \frac{\sum_{l\in S^L_{R,r}}\left(DI_l^L \times w_l^L\right)}{\sum_{l\in S^L_{R,r}} w_l^L}$$

a delay time index of a sub-zone $Z_z$ is reckoned as follows:

$$DI_z^Z = \frac{\sum_{s\in S^S_{Z,z}}\sum_{u\in S^U_{S,s}}\sum_{l\in S^L_{U,u}}\sum_{v\in S^V_{L,l}} d^V_{(v,l)} + \sum_{i\in S^I_{Z,z}}\sum_{l\in S^L_{I,i}}\sum_{v\in S^V_{L,l}} d^V_{(v,l)}}{\sum_{s\in S^S_{Z,z}}\sum_{u\in S^U_{S,s}}\sum_{l\in S^L_{U,u}}\sum_{v\in S^V_{L,l}} tf^V_{(v,l)} + \sum_{i\in S^I_{Z,z}}\sum_{l\in S^L_{I,i}}\sum_{v\in S^V_{L,l}} tf^V_{(v,l)}} = \frac{\sum_{l\in S^L_{Z,z}}\sum_{v\in S^V_{L,l}} d^V_{(v,l)}}{\sum_{l\in S^L_{Z,z}}\sum_{v\in S^V_{L,l}} tf^V_{(v,l)}} = \frac{\sum_{l\in S^L_{Z,z}}\left(DI_l^L \times w_l^L\right)}{\sum_{l\in S^L_{Z,z}} w_l^L}$$

a delay time index of a zone is reckoned as follows:

$$DI^A = \frac{\sum_{s\in S^S_{A}}\sum_{u\in S^U_{S,s}}\sum_{l\in S^L_{U,u}}\sum_{v\in S^V_{L,l}} d^V_{(v,l)} + \sum_{i\in S^I_{A}}\sum_{l\in S^L_{I,i}}\sum_{v\in S^V_{L,l}} d^V_{(v,l)}}{\sum_{s\in S^S_{A}}\sum_{u\in S^U_{S,s}}\sum_{l\in S^L_{U,u}}\sum_{v\in S^V_{L,l}} tf^V_{(v,l)} + \sum_{i\in S^I_{A}}\sum_{l\in S^L_{I,i}}\sum_{v\in S^V_{L,l}} tf^V_{(v,l)}} = \frac{\sum_{l\in S^L_{A}}\sum_{v\in S^V_{L,l}} d^V_{(v,l)}}{\sum_{l\in S^L_{A}}\sum_{v\in S^V_{L,l}} tf^V_{(v,l)}} = \sum_{l\in S^L_A}\left(DI_l^L \times w_l^L\right)$$

wherein $DI_{(v,l)}^V$ is the delay time index of the vehicle $V_v$ on the lane $L_l$; $d_{(v,l)}^V$ is the delay time of the vehicle $V_v$ passing the lane $L_l$; and $DI_v^V$, $DI_l^L$, $DI_u^U$, $DI_s^S$, $DI_i^I$, $DI_r^R$, $DI_z^Z$, and $DI^A$ represent the delay time indexes of the vehicle $V_v$, the lane $L_l$, the subsection $U_u$, the road $S_s$, the intersection $I_i$, the road $R_r$, the sub-zone $Z_z$, and the zone respectively; and S402, calculating the average delay times of various evaluation objects, wherein according to the acquired delay time indexes of the different evaluation objects at the multiple spatial scales, the average delay time of each evaluation object is calculated, which is specifically as follows:

an average delay time of the vehicle $V_v$ passing the lane $L_l$ is reckoned as follows:

$$d^V_{(v,l)} = DI^V_{(v,l)} \times tf^V_{(v,l)}$$

an average delay time of the vehicle $V_v$ is reckoned as follows:

$$d_v^V = \sum_{l\in S^L_{V,v}} d^V_{(v,l)} = DI_v^V \times \sum_{l\in S^L_{V,v}} t^L_{fl} = DI_v^V \times tf_v^V$$

an average delay time of the lane $L_l$ is reckoned as follows:

$$\bar{d}_l^L = \frac{\sum_{v\in S^V_{L,l}} d^V_{(v,l)}}{N^V_{L,l}} = \frac{\sum_{v\in S^V_{L,l}} d^V_{(v,l)}}{\sum_{v\in S^V_{L,l}} tf^V_{(v,l)}} \times \frac{\sum_{v\in S^V_{L,l}} tf^V_{(v,l)}}{N^V_{L,l}} = DI_l^L \times tf_l^L$$

an average delay time of a subsection $U_u$ is reckoned as follows:

$$\bar{d}_u^U = \frac{\sum_{l\in S^L_{U,u}}\sum_{v\in S^V_{L,l}} d^V_{(v,l)}}{N^V_{U,u}} = \frac{\sum_{l\in S^L_{U,u}}\sum_{v\in S^V_{L,l}} d^V_{(v,l)}}{\sum_{l\in S^L_{U,u}}\sum_{v\in S^V_{L,l}} tf^V_{(v,l)}} \times \frac{\sum_{l\in S^L_{U,u}}\sum_{v\in S^V_{L,l}} tf^V_{(v,l)}}{N^V_{U,u}} = DI_u^U \times tf_u^U$$

an average delay time of the section $S_s$ is reckoned as follows:

$$\bar{d}_s^S = \frac{\sum_{u\in S^U_{S,s}}\sum_{l\in S^L_{U,u}}\sum_{v\in S^V_{L,l}} d^V_{(v,l)}}{N^V_{S,s}} = \frac{\sum_{u\in S^U_{S,s}}\sum_{l\in S^L_{U,u}}\sum_{v\in S^V_{L,l}} d^V_{(v,l)}}{\sum_{u\in S^U_{S,s}}\sum_{l\in S^L_{U,u}}\sum_{v\in S^V_{L,l}} tf^V_{(v,l)}} \times \frac{\sum_{u\in S^U_{S,s}}\sum_{l\in S^L_{U,u}}\sum_{v\in S^V_{L,l}} tf^V_{(v,l)}}{N^V_{S,s}} = DI_s^S \times tf_s^S$$

an average delay time of the intersection $I_i$ is reckoned as follows:

$$\bar{d}_i^I = \frac{\sum_{l\in S^L_{I,i}}\sum_{v\in S^V_{L,l}} d^V_{(v,l)}}{N^V_{I,i}} = \frac{\sum_{l\in S^L_{I,i}}\sum_{v\in S^V_{L,l}} d^V_{(v,l)}}{\sum_{l\in S^L_{I,i}}\sum_{v\in S^V_{L,l}} tf^V_{(v,l)}} \times \frac{\sum_{l\in S^L_{I,i}}\sum_{v\in S^V_{L,l}} tf^V_{(v,l)}}{N^V_{I,i}} = DI_i^I \times tf_i^I$$

an average delay time of the road $R_r$ is reckoned as follows:

$$\bar{d}_r^R = \frac{\sum_{l\in S_{R,r}^L}\sum_{v\in S_{L,l}^V} d_{(v,l)}^V}{N_{R,r}^V} = \frac{\sum_{l\in S_{R,r}^L}\sum_{v\in S_{L,l}^V} d_{(v,l)}^V}{\sum_{l\in S_{R,r}^L}\sum_{v\in S_{L,l}^V} tf_{(v,l)}^V} \times \frac{\sum_{l\in S_{R,r}^L}\sum_{v\in S_{L,l}^V} tf_{(v,l)}^V}{N_{R,r}^V} = DI_r^R \times tf_r^R$$

an average delay time of a sub-zone $Z_z$ is reckoned as follows:

$$\bar{d}_z^Z = \frac{\sum_{l\in S_{Z,z}^L}\sum_{v\in S_{L,l}^V} d_{(v,l)}^V}{N_{Z,z}^V} = \frac{\sum_{l\in S_{Z,z}^L}\sum_{v\in S_{L,l}^V} d_{(v,l)}^V}{\sum_{l\in S_{Z,z}^L}\sum_{v\in S_{L,l}^V} tf_{(v,l)}^V} \times \frac{\sum_{l\in S_{Z,z}^L}\sum_{v\in S_{L,l}^V} tf_{(v,l)}^V}{N_{Z,z}^V} = DI_z^Z \times tf_z^Z$$

an average delay time of the zone is reckoned as follows:

$$\bar{d}^A = \frac{\sum_{l\in S_A^L}\sum_{v\in S_{L,l}^V} d_{(v,l)}^V}{N^V} = \frac{\sum_{l\in S_A^L}\sum_{v\in S_{L,l}^V} d_{(v,l)}^V}{\sum_{l\in S_A^L}\sum_{v\in S_{L,l}^V} tf_{(v,l)}^V} \times \frac{\sum_{l\in S_A^L}\sum_{v\in S_{L,l}^V} tf_{(v,l)}^V}{N^V} = DI^A \times tf^A$$

wherein $d_v^V$ is the delay time of the vehicle $V_v$; $\bar{d}_l^L$, $\bar{d}_u^U$, $\bar{d}_s^S$, $\bar{d}_i^I$, $\bar{d}_r^R$, $\bar{d}_z^Z$, and $\bar{d}^A$ represent the average delay times of the lane $L_l$, the subsection $U_u$, the section $S_s$, the intersection $I_i$, the road $R_r$, the sub-zone $Z_z$, and the zone respectively; $N_{L,l}^V$, $N_{U,u}^V$, $N_{S,s}^V$, $N_{I,i}^V$, $N_{R,r}^V$, and $N_{Z,z}^V$ represent numbers of vehicles passing the lane $L_l$, the subsection $U_u$, the section $S_s$, the intersection $I_i$, the road $R_r$, the sub-zone $Z_z$ within the evaluation period respectively; and $t_{fu}^U$, $t_{fs}^S$, $t_{fi}^I$, $t_{fr}^R$, $t_{fz}^Z$, and $t_f^A$ represent the average free-flow driving times of the subsection $U_u$, the section $S_s$, the intersection $I_i$, the road $R_r$, the sub-zone $Z_z$, and the zone respectively.

As a preferred technical solution, step S5 is specifically as follows:

S501, reckoning the indexes of the numbers of times of stopping of various evaluation objects at the multiple spatial scales, wherein the index of the number of times of stopping of each evaluation object in the road network is a ratio of an overall number of times of stopping of all the passing vehicles in each evaluation object to the overall free-flow driving time, that is, an average number of times of stopping of all the passing vehicles in the distance corresponding to the unit free-flow driving time; and the index of the number of times of stopping of each evaluation object may be obtained by weighted summation of the traffic weight coefficients and the indexes of the numbers of times of stopping of the vehicles, the lanes, the sub-sections, the sections, and the intersections belonging to the evaluation object, and the index of the number of times of stopping is in a unit of "times/min", having an ability to further calculate the average number of times of stopping, specifically as follows:

an index of number of times of stopping of the vehicle $V_v$ passing the lane $L_l$ is reckoned as follows:

$$HI_{(v,l)}^V = \frac{h_{(v,l)}^V}{tf_{(v,l)}^V}$$

an index of number of times of stopping of the vehicle $V_v$ is reckoned as follows:

$$HI_v^V = \frac{\sum_{l\in S_{V,v}^L} h_{(v,l)}^V}{\sum_{l\in S_{V,v}^L} tf_l^L} = \frac{\sum_{l\in S_{V,v}^L}\left(HI_{(v,l)}^V \times tf_{(v,l)}^V\right)}{\sum_{v=1}^{N^V}\sum_{l\in S_{V,v}^L} tf_l^L} \times \frac{\sum_{v=1}^{N^V}\sum_{l\in S_{V,v}^L} tf_l^L}{\sum_{l\in S_{V,v}^L} tf_l^L} = \frac{\sum_{l\in S_{V,v}^L}\left(HI_{(v,l)}^V \times w_{(v,l)}^V\right)}{\sum_{l\in S_{V,v}^L} w_{(v,l)}^V}$$

an index of number of times of stopping of the lane $L_l$ is reckoned as follows:

$$HI_l^L = \frac{\sum_{v\in S_{L,l}^V} h_{(v,l)}^V}{\sum_{v\in S_{L,l}^V} tf_{(v,l)}^V} = \frac{\sum_{l\in S_{L,l}^V} h_{(v,l)}^V}{\sum_{v=1}^{N^V}\sum_{l\in S_{V,v}^L} tf_{(v,l)}^V} \times \frac{\sum_{v=1}^{N^V}\sum_{l\in S_{V,v}^L} tf_{(v,l)}^V}{\sum_{v\in S_{L,l}^V} tf_{(v,l)}^V} = \frac{\sum_{v\in S_{L,l}^V}\left(HI_{(v,l)}^V \times w_{(v,l)}^V\right)}{\sum_{v\in S_{L,l}^V} w_{(v,l)}^V}$$

an index of number of times of stopping of the subsection $U_u$ is reckoned as follows:

$$HI_u^U = \frac{\sum_{l\in S_{U,u}^L}\sum_{v\in S_{L,l}^V} h_{(v,l)}^V}{\sum_{l\in S_{U,u}^L}\sum_{v\in S_{L,l}^V} tf_{(v,l)}^V} = \frac{\sum_{l\in S_{U,u}^L}\sum_{v\in S_{L,l}^V}\left(HI_{(v,l)}^V \times w_{(v,l)}^V\right)}{\sum_{l\in S_{U,u}^L}\sum_{v\in S_{L,l}^V} w_{(v,l)}^V} = \frac{\sum_{l\in S_{U,u}^L}\left(HI_l^L \times w_l^L\right)}{\sum_{l\in S_{U,u}^L} w_l^L}$$

an index of number of times of stopping of the section $S_s$ is reckoned as follows:

$$HI_s^S = \frac{\sum_{u\in S_{S,s}^U}\sum_{l\in S_{U,u}^L}\sum_{v\in S_{L,l}^V} h_{(v,l)}^V}{\sum_{u\in S_{S,s}^U}\sum_{l\in S_{U,u}^L}\sum_{v\in S_{L,l}^V} tf_{(v,l)}^V} = \frac{\sum_{l\in S_{S,s}^L}\sum_{v\in S_{L,l}^V}\left(HI_{(v,l)}^V \times w_{(v,l)}^V\right)}{\sum_{l\in S_{S,s}^L}\sum_{v\in S_{L,l}^V} w_{(v,l)}^V} = \frac{\sum_{l\in S_{S,s}^L}\left(HI_l^L \times w_l^L\right)}{\sum_{l\in S_{S,s}^L} w_l^L} = \frac{\sum_{u\in S_{S,s}^U}\left(HI_u^U \times w_u^U\right)}{\sum_{u\in S_{S,s}^U} w_u^U}$$

an index of number of times of stopping of the intersection $I_i$ is reckoned as follows:

$$HI_i^I=\frac{\sum_{l\in S_{I,i}^L}\sum_{v\in S_{L,l}^V}h_{(v,l)}^V}{\sum_{l\in S_{I,i}^L}\sum_{v\in S_{L,l}^V}tf_{(v,l)}^V}=\frac{\sum_{l\in S_{I,i}^L}\sum_{v\in S_{L,l}^V}\left(HI_{(v,l)}^V\times w_{(v,l)}^V\right)}{\sum_{l\in S_{I,i}^L}\sum_{v\in S_{L,l}^V}w_{(v,l)}^V}=\frac{\sum_{l\in S_{I,i}^L}\left(HI_l^L\times w_l^L\right)}{\sum_{l\in S_{I,i}^L}w_l^L}$$

an index of number of times of stopping of the road $R_r$ is reckoned as follows:

$$HI_r^R=\frac{\sum_{s\in S_{R,r}^S}\sum_{u\in S_{S,s}^U}\sum_{l\in S_{U,u}^L}\sum_{v\in S_{L,l}^V}h_{(v,l)}^V+\sum_{i\in S_{R,r}^I}\sum_{l\in S_{I,i}^L}\sum_{v\in S_{L,l}^V}h_{(v,l)}^V}{\sum_{s\in S_{R,r}^S}\sum_{u\in S_{S,s}^U}\sum_{l\in S_{U,u}^L}\sum_{v\in S_{L,l}^V}tf_{(v,l)}^V+\sum_{i\in S_{R,r}^I}\sum_{l\in S_{I,i}^L}\sum_{v\in S_{L,l}^V}tf_{(v,l)}^V}=\frac{\sum_{l\in S_{R,r}^L}\sum_{v\in S_{L,l}^V}h_{(v,l)}^V}{\sum_{l\in S_{R,r}^L}\sum_{v\in S_{L,l}^V}tf_{(v,l)}^V}=\frac{\sum_{l\in S_{Z,z}^L}\left(HI_l^L\times w_l^L\right)}{\sum_{l\in S_{Z,z}^L}w_l^L}$$

an index of number of times of stopping of the sub-zone $Z_z$ is reckoned as follows:

$$HI_z^Z=\frac{\sum_{s\in S_{Z,z}^S}\sum_{u\in S_{S,s}^U}\sum_{l\in S_{U,u}^L}\sum_{v\in S_{L,l}^V}h_{(v,l)}^V+\sum_{i\in S_{Z,z}^I}\sum_{l\in S_{I,i}^L}\sum_{v\in S_{L,l}^V}h_{(v,l)}^V}{\sum_{s\in S_{Z,z}^S}\sum_{u\in S_{S,s}^U}\sum_{l\in S_{U,u}^L}\sum_{v\in S_{L,l}^V}tf_{(v,l)}^V+\sum_{i\in S_{Z,z}^I}\sum_{l\in S_{I,i}^L}\sum_{v\in S_{L,l}^V}tf_{(v,l)}^V}=\frac{\sum_{l\in S_{Z,z}^L}\sum_{v\in S_{L,l}^V}h_{(v,l)}^V}{\sum_{l\in S_{Z,z}^L}\sum_{v\in S_{L,l}^V}tf_{(v,l)}^V}=\frac{\sum_{l\in S_{Z,z}^L}\left(HI_l^L\times w_l^L\right)}{\sum_{l\in S_{Z,z}^L}w_l^L}$$

an index of number of times of stopping of the zone is reckoned as follows:

$$HI^A=\frac{\sum_{s\in S_A^S}\sum_{u\in S_{S,s}^U}\sum_{l\in S_{U,u}^L}\sum_{v\in S_{L,l}^V}h_{(v,l)}^V+\sum_{i\in S_A^I}\sum_{l\in S_{I,i}^L}\sum_{v\in S_{L,l}^V}h_{(v,l)}^V}{\sum_{s\in S_A^S}\sum_{u\in S_{S,s}^U}\sum_{l\in S_{U,u}^L}\sum_{v\in S_{L,l}^V}tf_{(v,l)}^V+\sum_{i\in S_A^I}\sum_{l\in S_{I,i}^L}\sum_{v\in S_{L,l}^V}tf_{(v,l)}^V}=\frac{\sum_{l\in S_A^L}\sum_{v\in S_{L,l}^V}h_{(v,l)}^V}{\sum_{l\in S_A^L}\sum_{v\in S_{L,l}^V}tf_{(v,l)}^V}=\sum_{l\in S_A^L}\left(HI_l^L\times w_l^L\right)$$

wherein $HI_{(v,l)}^V$ is the index of the number of times of stopping of the vehicle $V_v$ on the lane $L_l$; $h_{(v,l)}^V$ is the number of times of stopping of the vehicle $V_v$ passing the lane $L_l$; and $HI_v^V$, $HI_l^L$, $HI_u^U$, $HI_s^S$, $HI_i^I$, $HI_r^R$, $HI_z^Z$, and $HI^A$ represent the indexes of number of times of stopping of the vehicle $V_v$, the lane $L_l$, the subsection $U_u$, the section $S_s$, the intersection $I_i$, the road $R_r$, the sub-zone $Z_z$, and the zone respectively; and S502, calculating the average numbers of times of stopping of various evaluation objects, wherein according to the acquired indexes of number of times of stopping of the different evaluation objects at the multiple spatial scales, the average numbers of times of stopping of various evaluation objects are calculated, which are specifically as follows:

an average number of times of stopping of the vehicle $V_v$ passing the lane $L_l$ is reckoned as follows:

$$h_{(v,l)}^V=HI_{(v,l)}^V\times tf_{(v,l)}^V$$

an average number of times of stopping of the vehicle $V_v$ is reckoned as follows:

$$h_v^V=\sum_{l\in S_{V,v}^L}h_{(v,l)}^V=HI_v^V\times\sum_{l\in S_{V,v}^L}tf_l^L=HI_v^V\times tf_v^V$$

an average number of times of stopping of the lane $L_l$ is reckoned as follows:

$$\overline{h}_l^L=\frac{\sum_{v\in S_{L,l}^V}h_{(v,l)}^V}{N_{L,l}^V}=\frac{\sum_{v\in S_{L,l}^V}h_{(v,l)}^V}{\sum_{v\in S_{L,l}^V}tf_{(v,l)}^V}\times\frac{\sum_{v\in S_{L,l}^V}tf_{(v,l)}^V}{N_{L,l}^V}=HI_l^L\times tf_l^L$$

an average number of times of stopping of the subsection $U_u$ is reckoned as follows:

$$\overline{h}_u^U=\frac{\sum_{l\in S_{U,u}^L}\sum_{v\in S_{L,l}^V}h_{(v,l)}^V}{N_{U,u}^V}=\frac{\sum_{l\in S_{U,u}^L}\sum_{v\in S_{L,l}^V}h_{(v,l)}^V}{\sum_{l\in S_{U,u}^L}\sum_{v\in S_{L,l}^V}tf_{(v,l)}^V}\times\frac{\sum_{l\in S_{U,u}^L}\sum_{v\in S_{L,l}^V}tf_{(v,l)}^V}{N_{U,u}^V}=HI_u^U\times tf_u^U$$

an average number of times of stopping of the section $S_s$ is reckoned as follows:

$$\overline{h}_s^S=\frac{\sum_{u\in S_{S,s}^U}\sum_{l\in S_{U,u}^L}\sum_{v\in S_{L,l}^V}h_{(v,l)}^V}{N_{S,s}^V}=\frac{\sum_{u\in S_{S,s}^U}\sum_{l\in S_{U,u}^L}\sum_{v\in S_{L,l}^V}h_{(v,l)}^V}{\sum_{u\in S_{S,s}^U}\sum_{l\in S_{U,u}^L}\sum_{v\in S_{L,l}^V}tf_{(v,l)}^V}\times\frac{\sum_{u\in S_{S,s}^U}\sum_{l\in S_{U,u}^L}\sum_{v\in S_{L,l}^V}tf_{(v,l)}^V}{N_{S,s}^V}=HI_s^S\times tf_s^S$$

an average number of times of stopping of the intersection $I_i$ is reckoned as follows:

$$\bar{h}_i^I = \frac{\sum_{l\in S_{I,i}^L}\sum_{v\in S_{L,l}^V} h_{(v,l)}^V}{N_{I,i}^V} = \frac{\sum_{l\in S_{I,i}^L}\sum_{v\in S_{L,l}^V} h_{(v,l)}^V}{\sum_{l\in S_{I,i}^L}\sum_{v\in S_{L,l}^V} tf_{(v,l)}^V} \times \frac{\sum_{l\in S_{I,i}^L}\sum_{v\in S_{L,l}^V} tf_{(v,l)}^V}{N_{I,i}^V} = HI_i^I \times tf_i^I$$

an average number of times of stopping of the road $R_r$ is reckoned as follows:

$$\bar{h}_r^R = \frac{\sum_{l\in S_{R,r}^L}\sum_{v\in S_{L,l}^V} h_{(v,l)}^V}{N_{R,r}^V} = \frac{\sum_{l\in S_{R,r}^L}\sum_{v\in S_{L,l}^V} h_{(v,l)}^V}{\sum_{l\in S_{R,r}^L}\sum_{v\in S_{L,l}^V} tf_{(v,l)}^V} \times \frac{\sum_{l\in S_{R,r}^L}\sum_{v\in S_{L,l}^V} tf_{(v,l)}^V}{N_{R,r}^V} = HI_r^R \times tf_r^R$$

an average number of times of stopping of the sub-zone $Z_z$ is reckoned as follows:

$$\bar{h}_z^Z = \frac{\sum_{l\in S_{Z,z}^L}\sum_{v\in S_{L,l}^V} h_{(v,l)}^V}{N_{Z,z}^V} = \frac{\sum_{l\in S_{Z,z}^L}\sum_{v\in S_{L,l}^V} h_{(v,l)}^V}{\sum_{l\in S_{Z,z}^L}\sum_{v\in S_{L,l}^V} tf_{(v,l)}^V} \times \frac{\sum_{l\in S_{Z,z}^L}\sum_{v\in S_{L,l}^V} tf_{(v,l)}^V}{N_{Z,z}^V} = HI_z^Z \times tf_z^Z$$

an average number of times of stopping of the zone is reckoned as follows:

$$\bar{h}^A = \frac{\sum_{l\in S_A^L}\sum_{v\in S_{L,l}^V} h_{(v,l)}^V}{N_A^V} = \frac{\sum_{l\in S_A^L}\sum_{v\in S_{L,l}^V} h_{(v,l)}^V}{\sum_{l\in S_A^L}\sum_{v\in S_{L,l}^V} tf_{(v,l)}^V} \times \frac{\sum_{l\in S_A^L}\sum_{v\in S_{L,l}^V} tf_{(v,l)}^V}{N_A^V} = HI^A \times tf^A$$

wherein $h_v^V$ is the number of times of stopping of the vehicle $V_v$; and $\bar{h}_l^L$, $\bar{h}_u^U$, $\bar{h}_s^S$, $\bar{h}_i^I$, $\bar{h}_r^R$, $\bar{h}_z^Z$, and $\bar{h}^A$ represent the average numbers of times of stopping of the lane $L_l$, the subsection $U_u$, the second $S_s$, the intersection $I_i$, the road $R_r$, the sub-zone $Z_z$, and the zone respectively.

As a preferred technical solution, step S6 is specifically as follows:

S601, reckoning the indexes of the mileages of the congested roads of various evaluation objects at the multiple spatial scales, wherein the index of the mileage of the congested road of each evaluation object in the road network is a ratio of an overall mileage of a heavily congested road of all the passing vehicles in each evaluation object to the overall free-flow driving time, that is, an average mileage of a heavily congested road of all the passing vehicles in the distance corresponding to the unit free-flow driving time; and the index of the mileage of the congested road of each evaluation object may be obtained by weighted summation of the traffic weight coefficients and the indexes of the mileages of the congested roads of the vehicles, the lanes, the sub-sections, the sections, and the intersections belonging to the evaluation object, and the index of the mileage of the congested road is in a unit of "m/min", having an ability to further calculate the proportion of the mileage of the heavily congested road, specifically as follows:

an index of a mileage of a congested road of the vehicle $V_v$ passing the lane $L_l$ is reckoned as follows:

$$MI_{(v,l)}^V = \frac{l_{c(v,l)}^V}{l_{f(v,l)}^V}$$

an index of a mileage of a congested road of the vehicle $V_v$ is reckoned as follows:

$$MI_v^V = \frac{\sum_{l\in S_{V,v}^L} l_{c(v,l)}^V}{\sum_{l\in S_{V,v}^L} tf_l^L} = \frac{\sum_{l\in S_{V,v}^L}\left(MI_{(v,l)}^V \times tf_{(v,l)}^V\right)}{\sum_{v=1}^{N^V}\sum_{l\in S_{V,v}^L} tf_l^L} \times \frac{\sum_{v=1}^{N^V}\sum_{l\in S_{V,v}^L} tf_l^L}{\sum_{l\in S_{V,v}^L} tf_l^L} = \frac{\sum_{l\in S_{V,v}^L}\left(MI_{(v,l)}^V \times w_{(v,l)}^V\right)}{\sum_{l\in S_{V,v}^L} w_{(v,l)}^V}$$

an index of a mileage of a congested road of the lane $L_l$ is reckoned as follows:

$$MI_l^L = \frac{\sum_{v\in S_{L,l}^V} l_{c(v,l)}^V}{\sum_{v\in S_{L,l}^V} tf_{(v,l)}^V} = \frac{\sum_{v\in S_{L,l}^V} l_{c(v,l)}^V}{\sum_{v=1}^{N^V}\sum_{l\in S_{V,v}^L} tf_{(v,l)}^V} \times \frac{\sum_{v=1}^{N^V}\sum_{l\in S_{V,v}^L} tf_{(v,l)}^V}{\sum_{v\in S_{L,l}^V} tf_{(v,l)}^V} = \frac{\sum_{v\in S_{L,l}^V}\left(MI_{(v,l)}^V \times w_{(v,l)}^V\right)}{\sum_{v\in S_{L,l}^V} w_{(v,l)}^V}$$

an index of a mileage of a congested road of the subsection $U_u$ is reckoned as follows:

$$MI_u^U = \frac{\sum_{l\in S_{U,u}^L}\sum_{v\in S_{L,l}^V} l_{c(v,l)}^V}{\sum_{l\in S_{U,u}^L}\sum_{v\in S_{L,l}^V} tf_{(v,l)}^V} = \frac{\sum_{l\in S_{U,u}^L}\sum_{v\in S_{L,l}^V}\left(MI_{(v,l)}^V \times w_{(v,l)}^V\right)}{\sum_{l\in S_{U,u}^L}\sum_{v\in S_{L,l}^V} w_{(v,l)}^V} = \frac{\sum_{l\in S_{U,u}^L}\left(MI_l^L \times w_l^L\right)}{\sum_{l\in S_{U,u}^L} w_l^L}$$

an index of a mileage of a congested road of the section $S_s$ is reckoned as follows:

$$MI_s^S = \frac{\sum_{u\in S_{S,s}^U}\sum_{l\in S_{U,u}^L}\sum_{v\in S_{L,l}^V} l_{c(v,l)}^V}{\sum_{u\in S_{S,s}^U}\sum_{l\in S_{U,u}^L}\sum_{v\in S_{L,l}^V} tf_{(v,l)}^V} = \frac{\sum_{l\in S_{S,s}^L}\sum_{v\in S_{L,l}^V}\left(MI_{(v,l)}^V\times w_{(v,l)}^V\right)}{\sum_{l\in S_{S,s}^L}\sum_{v\in S_{L,l}^V} w_{(v,l)}^V} = \frac{\sum_{l\in S_{S,s}^L}\left(MI_l^L\times w_l^L\right)}{\sum_{l\in S_{S,s}^L} w_l^L} = \frac{\sum_{u\in S_{S,s}^U}\left(MI_u^U\times w_u^U\right)}{\sum_{u\in S_{S,s}^U} w_u^U}$$

an index of a mileage of a congested road of the intersection $I_i$ is reckoned as follows:

$$MI_i^I = \frac{\sum_{l\in S_{I,i}^L}\sum_{v\in S_{L,l}^V} l_{c(v,l)}^V}{\sum_{l\in S_{I,i}^L}\sum_{v\in S_{L,l}^V} tf_{(v,l)}^V} = \frac{\sum_{l\in S_{I,i}^L}\sum_{v\in S_{L,l}^V}\left(MI_{(v,l)}^V\times w_{(v,l)}^V\right)}{\sum_{l\in S_{I,i}^L}\sum_{v\in S_{L,l}^V} w_{(v,l)}^V} = \frac{\sum_{l\in S_{I,i}^L}\left(MI_l^L\times w_l^L\right)}{\sum_{l\in S_{I,i}^L} w_l^L}$$

an index of a mileage of a congested road of the road $R_r$ is reckoned as follows:

$$MI_r^R = \frac{\sum_{s\in S_{R,r}^S}\sum_{u\in S_{S,s}^U}\sum_{l\in S_{U,u}^L}\sum_{v\in S_{L,l}^V} l_{c(v,l)}^V + \sum_{i\in S_{R,r}^I}\sum_{l\in S_{I,i}^L}\sum_{v\in S_{L,l}^V} l_{c(v,l)}^V}{\sum_{s\in S_{R,r}^S}\sum_{u\in S_{S,s}^U}\sum_{l\in S_{U,u}^L}\sum_{v\in S_{L,l}^V} tf_{(v,l)}^V + \sum_{i\in S_{R,r}^I}\sum_{l\in S_{I,i}^L}\sum_{v\in S_{L,l}^V} tf_{(v,l)}^V} = \frac{\sum_{l\in S_{R,r}^L}\sum_{v\in S_{L,l}^V} l_{c(v,l)}^V}{\sum_{l\in S_{R,r}^L}\sum_{v\in S_{L,l}^V} tf_{(v,l)}^V} = \frac{\sum_{l\in S_{R,r}^L}\left(MI_l^L\times w_l^L\right)}{\sum_{l\in S_{R,r}^L} w_l^L}$$

an index of a mileage of a congested road of the sub-zone $Z_z$ is reckoned as follows:

$$MI_z^Z = \frac{\sum_{s\in S_{Z,z}^S}\sum_{u\in S_{S,s}^U}\sum_{l\in S_{U,u}^L}\sum_{v\in S_{L,l}^V} l_{c(v,l)}^V + \sum_{i\in S_{Z,z}^I}\sum_{l\in S_{I,i}^L}\sum_{v\in S_{L,l}^V} l_{c(v,l)}^V}{\sum_{s\in S_{Z,z}^S}\sum_{u\in S_{S,s}^U}\sum_{l\in S_{U,u}^L}\sum_{v\in S_{L,l}^V} tf_{(v,l)}^V + \sum_{i\in S_{Z,z}^I}\sum_{l\in S_{I,i}^L}\sum_{v\in S_{L,l}^V} tf_{(v,l)}^V} = \frac{\sum_{l\in S_{Z,z}^L}\sum_{v\in S_{L,l}^V} l_{c(v,l)}^V}{\sum_{l\in S_{Z,z}^L}\sum_{v\in S_{L,l}^V} tf_{(v,l)}^V} = \frac{\sum_{l\in S_{Z,z}^L}\left(MI_l^L\times w_l^L\right)}{\sum_{l\in S_{Z,z}^L} w_l^L}$$

an index of a mileage of a congested road of the zone is reckoned as follows:

$$MI^A = \frac{\sum_{s\in S_A^S}\sum_{u\in S_{S,s}^U}\sum_{l\in S_{U,u}^L}\sum_{v\in S_{L,l}^V} l_{c(v,l)}^V + \sum_{i\in S_A^I}\sum_{l\in S_{I,i}^L}\sum_{v\in S_{L,l}^V} l_{c(v,l)}^V}{\sum_{s\in S_A^S}\sum_{u\in S_{S,s}^U}\sum_{l\in S_{U,u}^L}\sum_{v\in S_{L,l}^V} tf_{(v,l)}^V + \sum_{i\in S_A^I}\sum_{l\in S_{I,i}^L}\sum_{v\in S_{L,l}^V} tf_{(v,l)}^V} = \frac{\sum_{l\in S_A^L}\sum_{v\in S_{L,l}^V} l_{c(v,l)}^V}{\sum_{l\in S_A^L}\sum_{v\in S_{L,l}^V} tf_{(v,l)}^V} = \sum_{l\in S_A^L}\left(MI_l^L\times w_l^L\right)$$

wherein $MI_{(v,l)}^V$ is the index of the mileage of the congested road of the vehicle $V_v$ on the lane $L_l$; $l_{c(v,l)}^V$ is the mileage of the congested road of the vehicle $V_v$ passing the lane $L_l$; and $MI_v^V$, $MI_l^L$, $MI_u^U$, $MI_s^S$, $MI_i^I$, $MI_r^R$, $MI_z^Z$, and $MI^A$ represent the indexes of the mileages of the congested roads of the vehicle $V_v$, the lane $L_l$, the subsection $U_u$, the section $S_s$, the intersection $I_i$, the road $R_r$, the sub-zone $Z_z$, and the zone respectively; and S602, calculating the proportions of the mileages of the heavily congested roads of various evaluation objects, wherein according to the acquired index of the mileage of the congested road of the different evaluation objects at the multiple spatial scales, the proportion of the mileage of the heavily congested road of each evaluation object is calculated, which is specifically as follows:

a proportion of a mileage of a heavily congested road of the vehicle $V_v$ passing the lane $L_l$ is reckoned as follows:

$$m_{(v,l)}^V = \frac{l_{c(v,l)}^V}{l_{(v,l)}^V} = \frac{l_{c(v,l)}^V}{tf_{(v,l)}^V}\times\frac{tf_{(v,l)}^V}{l_{(v,l)}^V} = \frac{MI_{(v,l)}^V}{Vf_{(v,l)}^V}$$

a proportion of a mileage of a heavily congested road of the vehicle $V_v$ is reckoned as follows:

$$m_v^V = \frac{\sum_{l\in S_{V,v}^L} l_{c(v,l)}^V}{\sum_{l\in S_{V,v}^L} l_{(v,l)}^V} = \frac{\sum_{l\in S_{V,v}^L} l_{c(v,l)}^V}{\sum_{l\in S_{V,v}^L} tf_l^L}\times\frac{\sum_{l\in S_{V,v}^L} tf_l^L}{\sum_{l\in S_{V,v}^L} l_{(v,l)}^V} = \frac{MI_v^V}{Vf_v^V}$$

a proportion of a mileage of a heavily congested road of the lane $L_l$ is reckoned as follows:

$$m_l^L = \frac{\sum_{v\in S_{L,l}^V} l_{c(v,l)}^V}{\sum_{v\in S_{L,l}^V} l_{(v,l)}^V} = \frac{\sum_{v\in S_{L,l}^V} l_{c(v,l)}^V}{\sum_{v\in S_{L,l}^V} tf_{(v,l)}^V}\times\frac{\sum_{v\in S_{L,l}^V} tf_{(v,l)}^V}{\sum_{v\in S_{L,l}^V} l_{(v,l)}^V} = \frac{MI_l^L}{Vf_l^L}$$

a proportion of a mileage of a heavily congested road of the subsection $U_u$ is reckoned as follows:

$$m_u^U = \frac{\sum_{l\in S_{U,u}^L}\sum_{v\in S_{L,l}^V} l_{c(v,l)}^V}{\sum_{l\in S_{U,u}^L}\sum_{v\in S_{L,l}^V} l_{(v,l)}^V} = \frac{\sum_{l\in S_{U,u}^L}\sum_{v\in S_{L,l}^V} l_{c(v,l)}^V}{\sum_{l\in S_{U,u}^L}\sum_{v\in S_{L,l}^V} tf_{(v,l)}^V} \times \frac{\sum_{l\in S_{U,u}^L}\sum_{v\in S_{L,l}^V} tf_{(v,l)}^V}{\sum_{l\in S_{U,u}^L}\sum_{v\in S_{L,l}^V} l_{(v,l)}^V} = \frac{MI_u^U}{V_{f_u}^U}$$

a proportion of a mileage of a heavily congested road of the section $S_s$ is reckoned as follows:

$$m_s^S = \frac{\sum_{u\in S_{S,s}^U}\sum_{l\in S_{U,u}^L}\sum_{v\in S_{L,l}^V} l_{c(v,l)}^V}{\sum_{u\in S_{S,s}^U}\sum_{l\in S_{U,u}^L}\sum_{v\in S_{L,l}^V} l_{(v,l)}^V} = \frac{\sum_{u\in S_{S,s}^U}\sum_{l\in S_{U,u}^L}\sum_{v\in S_{L,l}^V} l_{c(v,l)}^V}{\sum_{u\in S_{S,s}^U}\sum_{l\in S_{U,u}^L}\sum_{v\in S_{L,l}^V} tf_{(v,l)}^V} \times \frac{\sum_{u\in S_{S,s}^U}\sum_{l\in S_{U,u}^L}\sum_{v\in S_{L,l}^V} tf_{(v,l)}^V}{\sum_{u\in S_{S,s}^U}\sum_{l\in S_{U,u}^L}\sum_{v\in S_{L,l}^V} l_{(v,l)}^V} = \frac{MI_s^S}{V_{f_s}^S}$$

a proportion of a mileage of a heavily congested road of the intersection $I_i$ is reckoned as follows:

$$m_i^I = \frac{\sum_{l\in S_{I,i}^L}\sum_{v\in S_{L,l}^V} l_{c(v,l)}^V}{\sum_{l\in S_{I,i}^L}\sum_{v\in S_{L,l}^V} l_{(v,l)}^V} = \frac{\sum_{l\in S_{I,i}^L}\sum_{v\in S_{L,l}^V} l_{c(v,l)}^V}{\sum_{l\in S_{I,i}^L}\sum_{v\in S_{L,l}^V} tf_{(v,l)}^V} \times \frac{\sum_{l\in S_{I,i}^L}\sum_{v\in S_{L,l}^V} tf_{(v,l)}^V}{\sum_{l\in S_{I,i}^L}\sum_{v\in S_{L,l}^V} l_{(v,l)}^V} = \frac{MI_i^I}{V_{f_i}^I}$$

a proportion of a mileage of a heavily congested road of the road $R_r$ is reckoned as follows:

$$m_r^R = \frac{\sum_{l\in S_{R,r}^L}\sum_{v\in S_{L,l}^V} l_{c(v,l)}^V}{\sum_{l\in S_{R,r}^L}\sum_{v\in S_{L,l}^V} l_{(v,l)}^V} = \frac{\sum_{l\in S_{R,r}^L}\sum_{v\in S_{L,l}^V} l_{c(v,l)}^V}{\sum_{l\in S_{R,r}^L}\sum_{v\in S_{L,l}^V} tf_{(v,l)}^V} \times \frac{\sum_{l\in S_{R,r}^L}\sum_{v\in S_{L,l}^V} tf_{(v,l)}^V}{\sum_{l\in S_{I,i}^L}\sum_{v\in S_{L,l}^V} l_{(v,l)}^V} = \frac{MI_r^R}{V_{f_r}^R}$$

a proportion of a mileage of a heavily congested road of the sub-zone $Z_z$ is reckoned as follows:

$$m_z^Z = \frac{\sum_{l\in S_{Z,z}^L}\sum_{v\in S_{L,l}^V} l_{c(v,l)}^V}{\sum_{l\in S_{Z,z}^L}\sum_{v\in S_{L,l}^V} l_{(v,l)}^V} = \frac{\sum_{l\in S_{Z,z}^L}\sum_{v\in S_{L,l}^V} l_{c(v,l)}^V}{\sum_{l\in S_{Z,z}^L}\sum_{v\in S_{L,l}^V} tf_{(v,l)}^V} \times \frac{\sum_{l\in S_{Z,z}^L}\sum_{v\in S_{L,l}^V} tf_{(v,l)}^V}{\sum_{l\in S_{Z,z}^L}\sum_{v\in S_{L,l}^V} l_{(v,l)}^V} = \frac{MI_z^Z}{V_{f_z}^Z}$$

a proportion of a mileage of a heavily congested road of the zone is reckoned as follows:

$$M^A = \frac{\sum_{l\in S_A^L}\sum_{v\in S_{L,l}^V} l_{c(v,l)}^V}{\sum_{l\in S_A^L}\sum_{v\in S_{L,l}^V} l_{(v,l)}^V} = \frac{\sum_{l\in S_A^L}\sum_{v\in S_{L,l}^V} l_{c(v,l)}^V}{\sum_{l\in S_A^L}\sum_{v\in S_{L,l}^V} tf_{(v,l)}^V} \times \frac{\sum_{l\in S_A^L}\sum_{v\in S_{L,l}^V} tf_{(v,l)}^V}{\sum_{l\in S_A^L}\sum_{v\in S_{L,l}^V} l_{(v,l)}^V} = \frac{MI^A}{V_f^A}$$

wherein $m_{(v,l)}^V$ is the proportion of the mileage of the heavily congested road of the vehicle $V_v$ on the lane $L_l$; $l_{(v,l)}^V$ is a vehicle mileage of the vehicle $V_v$ passing the lane $L_l$; $V_{f(v,l)}^V$ is a flow-free driving speed of the vehicle $V_v$ passing the lane $L_l$; $m_v^V$, $m_l^L$, $m_u^U$, $m_s^S$, $m_i^I$, $m_r^R$, $m_z^Z$, and $m^A$ represent proportions of mileages of heavily congested roads of the vehicle $V_v$, the lane $L_l$, the subsection $U_u$, the section $S_s$, the intersection $I_i$, the road $R_r$, the sub-zone $Z_z$, and the zone respectively; and $\nabla_{fv}^V$, $\nabla_{fl}^L$, $\nabla_{fu}^U$, $\nabla_{fs}^S$, $\nabla_{fi}^I$, $\nabla fr^R$, $\nabla fz^Z$, and $\nabla_f^A$ represent average flow-free driving speeds of the vehicle $V_v$, the lane $L_l$, the subsection $U_u$, the section $S_s$, the intersection $I_i$, the road $R_r$, the sub-zone $Z_z$, and the zone respectively.

As a preferred technical solution, a new method for calculating traffic operation state evaluation characteristic indexes is formed collectively by four indexes: the traffic operation index, the delay time index, the index of the number of times of stopping, and the index of the mileage of the congested road, wherein the larger the traffic operation index, the delay time index, the index of the number of times of stopping, and the index of the mileage of the congested road are, the worse the traffic operation state is, that is, the more congested the road traffic is.

Compared with the prior art, the present invention has the beneficial effects that:

1. The present invention provides a method for determining the traffic weight coefficients for combined calculation of the traffic operation states of the road network, to reckon the traffic weight coefficients of various evaluation objects at the different spatial scales, which can effectively reflect the proportions of the road time-space resources of various evaluation objects in the whole road network.

2. With the unit free-flow driving time as a quantitative standard, on the basis of a similar capability of calculating original traffic operation state evaluation indexes, the present invention re-establishes a new evaluation index system calculation method, which normalizes the traffic state characteristic indexes, and can be applicable to analysis and comparison on the traffic operation states of different road networks.

3. In combination with the traffic weight coefficients, the present invention reckons the traffic operation indexes, the average delay times, the average numbers of times of stopping, the proportions of the mileages of the heavily congested roads, and other traffic operation characteristic indexes at the different spatial scales by weighting different compositions of the roads at the different spatial scales in the road network, which further enriches a theoretical method for digital construction of the urban road network.

DETAILED DESCRIPTION OF THE EMBODIMENTS

The present invention will be further described in detail below in combination with the accompanying drawings and the specific embodiments, which is not to be construed as limiting to the present invention.

Figure 1:
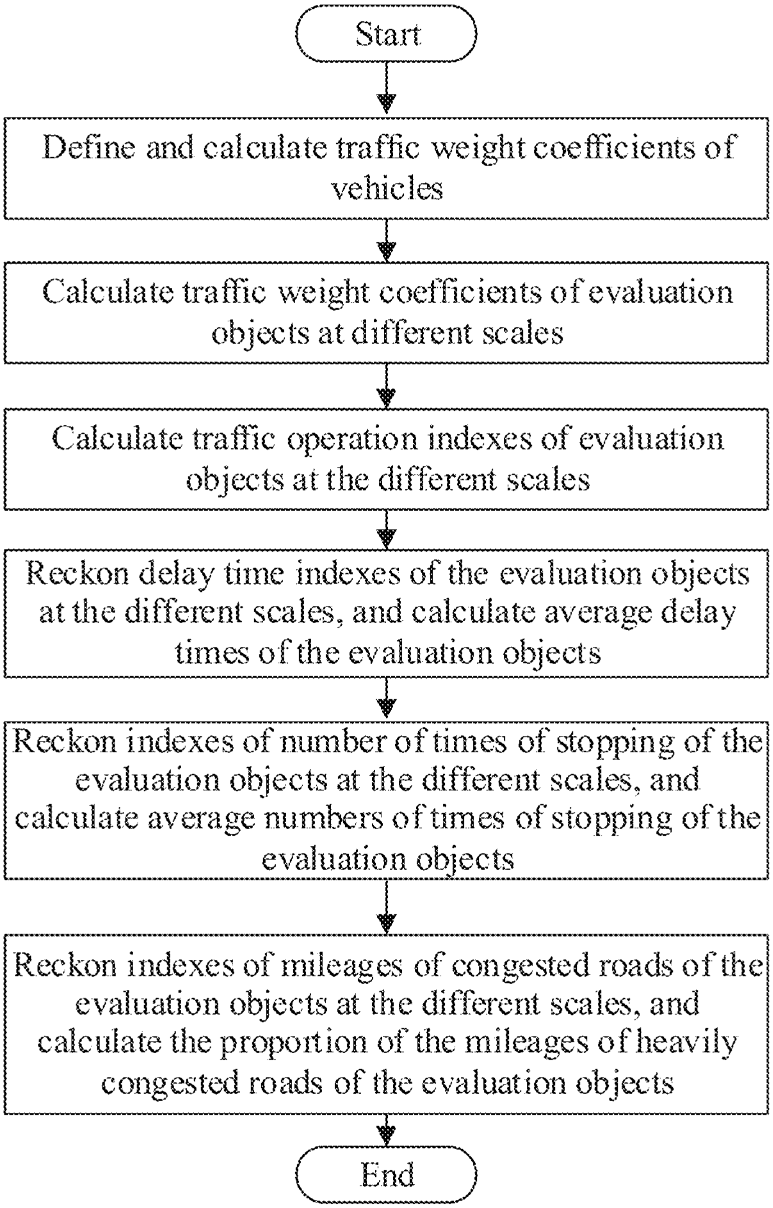
FIG. 1 is a flowchart of a digital road network traffic state reckoning method based on multi-scale calculation.
Figure 2:
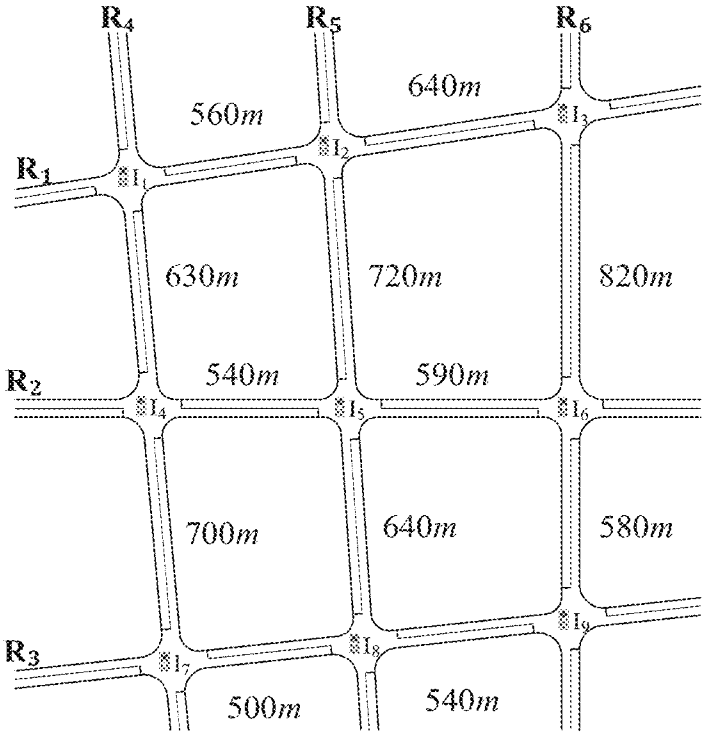
FIG. 2 is a schematic structural diagram of a road network according to an embodiment.

As shown in FIG. 2, assuming that a road network consists of three east-west roads ($R_1$, $R_2$, and $R_3$) and three north-south roads ($R_4$, $R_5$, and $R_6$), including 9 signal control intersections, 48 sections, and 336 lanes in total. FIG. 1 is a flowchart of a digital road network traffic state reckoning method based on multi-scale calculation provided by an example, specifically including the following implementation steps:

Step 1, acquiring traffic weight coefficients of vehicles according to free-flow driving times of the vehicles and an overall free-flow driving time of a road network.

Based on a vehicle detector and other road traffic data acquisition tools, basic traffic operation data of various passing vehicles in the road network is acquired. According to the acquired free-flow driving times $t_{f(v,l)}{}^V$ of various passing vehicles on different lanes in the road network, the traffic weight coefficients $w_{(v,l)}{}^V$ of the vehicles $V_v$ in various lanes $L_l$ are calculated, and the traffic weight coefficients $w_{(v,l)}{}^V$ of the different lanes in the road network belonging to the vehicles $V_v$ are summed, to obtain the traffic weight coefficient $w_v{}^V$ of the $v^{th}$ vehicle in the road network as follows:

$$w_v^V = \sum_{l \in S_{V,v}^L} \frac{t_{f_l}^L}{\sum_{v=1}^{N^V} \sum_{l \in S_{V,v}^L} t_{f_l}^L} = \sum_{l \in S_{V,v}^L} w_{(v,l)}^V$$

Taking vehicles $V_{46}$ and $V_{47}$ as examples, calculation results of the traffic weight coefficients of the vehicles are shown in Table 1.

TABLE 1

Traffic Weight Coefficients of Vehicles

| Vehicle number | Lane number | $t_{f(v,l)}{}^V$/s | $w_{(v,l)}{}^V$ | $w_v{}^V$ |
|---|---|---|---|---|
| . . . | . . . | . . . | . . . | . . . |
| $V_{46}$ | $L_4$ | 35.0 | 0.00013 | 0.00067 |
| | $L_5$ | 37.8 | 0.00014 | |
| | $L_7$ | 2.4 | 0.00015 | |
| | $L_{11}$ | 27.0 | 0.00010 | |
| | $L_{13}$ | 2.4 | 0.00013 | |
| | $L_{123}$ | 0.7 | 0.00000 | |
| | $L_{200}$ | 3.2 | 0.00001 | |
| | $L_{214}$ | 3.1 | 0.00001 | |
| $V_{47}$ | $L_{21}$ | 39.0 | 0.00014 | 0.00035 |
| | $L_{25}$ | 1.0 | 0.00000 | |
| | $L_{26}$ | 2.7 | 0.00019 | |
| | $L_{276}$ | 3.8 | 0.00002 | |
| . . . | . . . | . . . | . . . | . . . |
| Total | | 169623.2 | 1 | 1 |

Step 2, calculating traffic weight coefficients of evaluation objects in the road network at different spatial scales level by level in combination with the traffic weight coefficients of the vehicles and a composition structure of the road network.

According to the traffic weight coefficients $w_{(v,l)}{}^V$ of the vehicle $V_v$ on different lanes $L_l$ in the road network, the traffic weight coefficients of all compositions belonging to a certain specified evaluation object at one spatial scale are summed to obtain the traffic weight coefficient of the evaluation object.

In the embodiment, the traffic weight coefficients of various lanes, various intersections, and various roads are calculated by using the traffic weight coefficients $w_{(v,l)}{}^V$ of various passing vehicles $V_v$ on the different lanes $L_l$ in Table 1. Calculation results are shown in Table 2, Table 3, and Table 4.

TABLE 2

Traffic Weight Coefficients of Lanes

| Lane number | $q_l{}^L$/(vehicle/h) | $t_l{}^L$/s | $\bar{d}_l{}^L$/s | $\bar{h}_l{}^L$/time | $m_l{}^L$ | $t_{fl}{}^L$/s | $w_l{}^L$ |
|---|---|---|---|---|---|---|---|
| $L_1$ | 452 | 33.67 | 1.40 | 0.02 | 2.67% | 32.27 | 0.0215 |
| $L_2$ | 240 | 23.77 | 21.35 | 0.62 | 35.92% | 2.42 | 0.0009 |
| $L_3$ | 228 | 31.28 | 28.83 | 0.68 | 42.52% | 2.45 | 0.0008 |
| $L_4$ | 312 | 32.00 | 0.09 | 0.00 | 0.26% | 31.91 | 0.0147 |
| $L_5$ | 328 | 39.32 | 1.25 | 0.00 | 2.64% | 38.07 | 0.0184 |
| $L_6$ | 176 | 6.36 | 3.70 | 0.14 | 8.40% | 2.67 | 0.0007 |
| $L_7$ | 152 | 31.50 | 28.87 | 0.82 | 41.15% | 2.63 | 0.0006 |
| $L_8$ | 404 | 43.36 | 4.84 | 0.08 | 5.87% | 38.51 | 0.0229 |
| $L_9$ | 236 | 23.83 | 21.31 | 0.56 | 35.78% | 2.52 | 0.0009 |
| $L_{10}$ | 192 | 24.17 | 21.68 | 0.63 | 41.11% | 2.48 | 0.0007 |
| . . . | . . . | . . . | . . . | . . . | . . . | . . . | . . . |
| Total | 5300 | 207.70 | 79.68 | 1.77 | 5.65% | 128.02 | 1 |

TABLE 3

Traffic Weight Coefficients of Intersection $I_2$

| Entrance direction | Lane attribute | Lane number | $q_l{}^L$/(vehicle/h) | $t_l{}^L$/s | $\bar{d}_l{}^L$/s | $\bar{h}_l{}^L$/time | $m_l{}^L$ | $t_{fl}{}^L$/s | $w_l{}^L$ | Various entrances w | $w_i{}^I$ |
|---|---|---|---|---|---|---|---|---|---|---|---|
| North | Tapered section | $L_{261}$ | 80 | 1.00 | 0.29 | 0.00 | 23.60% | 0.72 | 0.0001 | 0.0034 | 0.0118 |
| | Tapered section | $L_{262}$ | 100 | 2.32 | 1.80 | 0.08 | 41.66% | 0.52 | 0.0001 | | |

TABLE 3-continued

| Traffic Weight Coefficients of Intersection $I_2$ | | | | | | | | | | | |
|---|---|---|---|---|---|---|---|---|---|---|---|
| Entrance direction | Lane attribute | Lane number | $q_l^L$/ (vehicle/h) | $t_l^L$/s | $\bar{d}_l^L$/s | $\bar{h}_l^L$/time | $m_l^L$ | $t_{f\,l}^L$/s | $w_l^L$ | Various entrances w | $w_i^I$ |
| | Entrance lane | $L_{82}$ | 200 | 26.88 | 24.78 | 0.80 | 47.65% | 2.10 | 0.0006 | | |
| | Entrance lane | $L_{83}$ | 216 | 26.19 | 23.94 | 0.74 | 42.90% | 2.24 | 0.0007 | | |
| | Left turning | $L_{227}$ | 8 | 3.50 | 0.60 | 0.00 | 14.56% | 2.90 | 0.0000 | | |
| | Straight driving | $L_{218}$ | 180 | 3.98 | 0.57 | 0.00 | 10.98% | 3.41 | 0.0009 | | |
| | Straight driving | $L_{220}$ | 188 | 3.91 | 0.50 | 0.00 | 16.97% | 3.41 | 0.0009 | | |
| | Right turning | $L_{219}$ | 24 | 2.33 | 0.48 | 0.00 | 9.84% | 1.85 | 0.0001 | | |
| East | Tapered section | $L_{126}$ | 76 | 1.05 | 0.26 | 0.00 | 16.39% | 0.79 | 0.0001 | 0.0026 | |
| | Tapered section | $L_{127}$ | 84 | 2.90 | 2.26 | 0.10 | 28.41% | 0.65 | 0.0001 | | |
| | Entrance lane | $L_{12}$ | 144 | 28.61 | 25.90 | 0.75 | 39.75% | 2.71 | 0.0006 | | |
| | Entrance lane | $L_{13}$ | 148 | 24.59 | 21.93 | 0.73 | 39.25% | 2.66 | 0.0006 | | |
| | Left turning | $L_{213}$ | 8 | 2.50 | 0.25 | 0.00 | 7.57% | 2.25 | 0.0000 | | |
| | Straight driving | $L_{214}$ | 140 | 3.60 | 0.56 | 0.00 | 11.98% | 3.04 | 0.0006 | | |
| | Straight driving | $L_{216}$ | 128 | 3.69 | 0.59 | 0.00 | 14.72% | 3.09 | 0.0006 | | |
| | Right turning | $L_{215}$ | 12 | 2.67 | 0.43 | 0.00 | 12.22% | 2.23 | 0.0000 | | |
| South | Tapered section | $L_{170}$ | 44 | 1.00 | 0.20 | 0.00 | 16.92% | 0.80 | 0.0000 | 0.0021 | |
| | Tapered section | $L_{171}$ | 60 | 1.00 | 0.21 | 0.00 | 17.48% | 0.79 | 0.0001 | | |
| | Entrance lane | $L_{86}$ | 108 | 25.74 | 23.41 | 0.81 | 40.84% | 2.33 | 0.0004 | | |
| | Entrance lane | $L_{87}$ | 124 | 24.23 | 21.85 | 0.68 | 38.72% | 2.38 | 0.0004 | | |
| | Left turning | $L_{172}$ | 8 | 3.50 | 0.65 | 0.00 | 14.80% | 2.85 | 0.0000 | | |
| | Straight driving | $L_{173}$ | 100 | 4.00 | 0.57 | 0.00 | 10.34% | 3.43 | 0.0005 | | |
| | Straight driving | $L_{175}$ | 108 | 4.07 | 0.54 | 0.00 | 17.16% | 3.53 | 0.0006 | | |
| | Right turning | $L_{174}$ | 16 | 3.25 | 0.70 | 0.00 | 9.78% | 2.55 | 0.0001 | | |
| West | Tapered section | $L_{124}$ | 108 | 0.53 | 3.66 | 0.07 | 34.79% | 0.53 | 0.0001 | 0.0037 | |
| | Tapered section | $L_{125}$ | 56 | 0.49 | 3.23 | 0.14 | 39.20% | 0.49 | 0.0000 | | |
| | Entrance lane | $L_9$ | 236 | 23.83 | 21.31 | 0.56 | 35.78% | 2.52 | 0.0009 | | |
| | Entrance lane | $L_{10}$ | 192 | 24.17 | 21.68 | 0.63 | 41.11% | 2.48 | 0.0007 | | |
| | Left turning | $L_{205}$ | 16 | 2.58 | 0.93 | 0.00 | 20.41% | 2.58 | 0.0001 | | |
| | Straight driving | $L_{206}$ | 220 | 3.25 | 0.38 | 0.00 | 8.18% | 3.25 | 0.0011 | | |
| | Straight driving | $L_{208}$ | 180 | 3.11 | 0.51 | 0.00 | 5.15% | 3.11 | 0.0008 | | |
| | Right turning | $L_{207}$ | 12 | 1.90 | 0.10 | 0.00 | 10.84% | 1.90 | 0.0000 | | |

In Table 3, the "tapered section", the "entrance lane", the "left turning", the "straight driving", and the "right turning" in the lane attributes represent a stretching-tapered section lane of an intersection, an entrance canalized lane of the intersection, and a left turn traffic through lane, a straight traffic through lane, and a right turn traffic through lane in a certain entrance direction in the intersection respectively.

TABLE 4

Traffic Weight Coefficients of Roads

| Road number | Section/inter-section number | Lane number | Vehicle number | $w_{(v,l)}^V$ | $w_l^L$ | $w_s^S/w_i^I$ | $w_r^R$ |
|---|---|---|---|---|---|---|---|
| $R_1$ | $S_1$ | $L_1$ | $V_{322}$ | 0.000054 | 0.021 | 0.021 | 0.197 |
| | | | $V_{323}$ | 0.000067 | | | |
| | | | $V_{1885}$ | 0.000118 | | | |
| | | | $V_{1892}$ | 0.000112 | | | |
| | | | ... | ... | | | |
| | $S_2$ | $L_4$ | | ... | 0.015 | 0.015 | |
| | $I_1$ | | | ... | | 0.013 | |
| | $S_3$ | $L_5$ | | ... | 0.018 | 0.018 | |
| | $S_4$ | $L_8$ | | ... | 0.023 | 0.023 | |
| | $I_2$ | | | ... | | 0.012 | |
| | $S_5$ | $L_{11}$ | | ... | 0.021 | 0.021 | |
| | $S_6$ | $L_{14}$ | | ... | 0.027 | 0.027 | |
| | $I_3$ | | | ... | | 0.012 | |
| | $S_7$ | $L_{17}$ | | ... | 0.021 | 0.021 | |
| | $S_8$ | $L_{18}$ | | ... | 0.014 | 0.014 | |
| $R_2$ | | | | ... | | | 0.182 |
| $R_3$ | | | | ... | | | 0.158 |
| $R_4$ | | | | ... | | | 0.198 |
| $R_5$ | | | | ... | | | 0.182 |
| $R_6$ | | | | ... | | | 0.189 |

Figure 3:
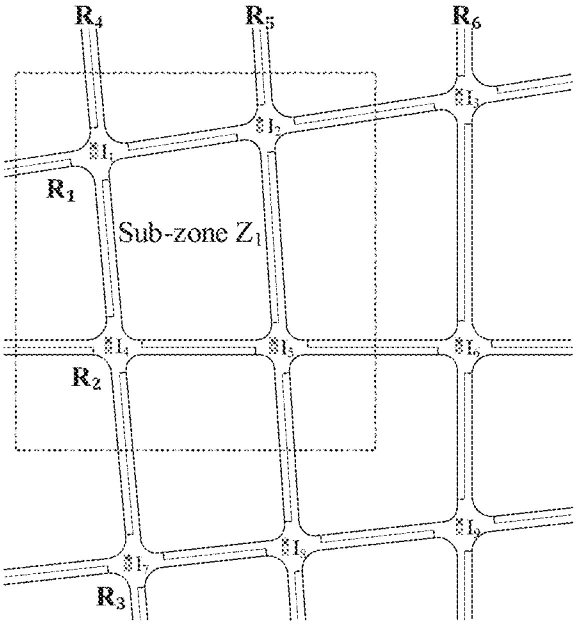
FIG. 3 is a division schematic diagram of a traffic sub-zone $Z_1$ in a road network according to an embodiment.

As shown in FIG. 3, according to the lane composition of the sub-zone $Z_1$, the traffic weight coefficients $w_1^Z$ of the sub-zone $Z_1$ is obtained by using the traffic weight coefficients $w_{(v,l)}^V$ of various passing vehicles $V_v$ on the different lanes $L_l$ in Table 1, as follows:

$$w_1^Z = \sum_{s\in S_{Z,1}^S} w_s^S + \sum_{i\in S_{Z,1}^I} w_i^I = \sum_{l\in S_{Z,1}^L} \sum_{v\in S_{L,l}^V} w_{(v,l)}^V = 0.5274$$

For the whole road network, the traffic weight coefficients $W^A$ of the road network can also be obtained by summing the traffic weight coefficients $w_{(v,l)}^V$ of various passing vehicles $V_v$ on the different lanes $L_l$ in the road network:

$$w^A = \sum_{l=1}^{N^L} w_l^L = \sum_{l\in S_A^L} \sum_{v\in S_{L,l}^V} w_{(v,l)}^V = \sum_{v=1}^{N^V} w_v^V = 1$$

Step 3, reckoning traffic operation indexes of various lanes, various sub-sections, various sections, various intersections, various roads, various sub-zones, and the road network by using an average travel time, the free-flow driving times, and the traffic weight coefficients of the vehicles.

In the embodiment, the traffic operation indexes $PI_{(v,l)}^V$ of various passing vehicles $V_v$ on the different lanes $L_l$ are obtained by using the free-flow driving times $t_{f(v,l)}^V$ and the travel times $t_{(v,l)}^V$ of the vehicles $V_v$ on the lanes $L_l$ in the road network. Further, in combination with the traffic weight coefficients $w_{(v,l)}^V$ various passing vehicles $V_v$ on the different lanes $L_l$ in Table 1, the traffic operation indexes $PI_v^V$ of the vehicles $V_v$ are reckoned.

$$PI_{(v,l)}^V = \frac{t_{(v,l)}^V}{t_{f(v,l)}^V};\quad PI_v^V = \frac{\sum_{l\in S_{V,v}^L} \left(PI_{(v,l)}^V \times w_{(v,l)}^V\right)}{\sum_{l\in S_{V,v}^L} w_{(v,l)}^V}$$

Taking the vehicles $V_{46}$ and $V_{47}$ as examples, calculation results of $PI_{(v,l)}^V$ and $PI_v^V$ are shown in Table 5.

TABLE 5

Traffic Operation States of Vehicles

| Vehicle number | Lane number | $t_{(v,l)}^V$/s | $d_{(v,l)}^V$/s | $h_{(v,l)}^V$/time | $m_{(v,l)}^V$ | $PI_{(v,l)}^V$ | $DI_{(v,l)}^V$ | $HI_{(v,l)}^V$/(times/min) | $MI_{(v,l)}^V$/(m/min) | Operation condition |
|---|---|---|---|---|---|---|---|---|---|---|
| ... | ... | ... | ... | ... | ... | ... | ... | ... | ... | ... |
| $V_{46}$ | $L_4$ | 35 | 0.0 | 0 | 0.00% | 1.00 | 0.00 | 0.00 | 0.00 | $PI_{46}^V = 1.68$ |
| | $L_5$ | 38 | 0.2 | 0 | 0.47% | 1.01 | 0.01 | 0.00 | 3.89 | $DI_{46}^V = 0.68$ |
| | $L_7$ | 41 | 38.6 | 1 | 63.55% | 17.08 | 16.08 | 25.00 | 544.17 | $HI_{46}^V = 1.08$ |
| | $L_{11}$ | 27 | 0.0 | 0 | 0.00% | 1.00 | 0.00 | 0.00 | 0.00 | $MI_{46}^V = 32.91$ |
| | $L_{13}$ | 37 | 34.6 | 1 | 54.28% | 15.42 | 14.42 | 25.00 | 493.22 | |
| | $L_{123}$ | 1 | 0.3 | 0 | 30.00% | 1.43 | 0.43 | 0.00 | 272.06 | |
| | $L_{200}$ | 4 | 0.8 | 0 | 16.60% | 1.25 | 0.25 | 0.00 | 126.30 | |
| | $L_{214}$ | 4 | 0.9 | 0 | 18.65% | 1.29 | 0.29 | 0.00 | 142.34 | |
| $V_{47}$ | $L_{21}$ | 39 | 0.0 | 0 | 0.00% | 1.00 | 0.00 | 0.00 | 0.00 | $PI_{47}^V = 2.09$ |
| | $L_{25}$ | 1 | 0.0 | 0 | 0.00% | 1.00 | 0.00 | 0.00 | 0.00 | $DI_{47}^V = 1.09$ |
| | $L_{26}$ | 52 | 49.3 | 1 | 40.00% | 19.26 | 18.26 | 22.22 | 335.71 | $HI_{47}^V = 1.29$ |
| | $L_{276}$ | 5 | 1.2 | 0 | 18.38% | 1.32 | 0.32 | 0.00 | 126.76 | $MI_{47}^V = 29.85$ |
| ... | ... | ... | ... | ... | ... | ... | ... | ... | ... | ... |

In Table 5, $HI_v^V$ is in a unit of "times/min", and $MI_c^V$ is in a unit of "m/min".

Based on the acquired traffic operation indexes $PI_{(v,l)}^V$ of the vehicles $V_v$ on the lanes $L_l$, in combination with the traffic weight coefficients $w_{(v,l)}^V$, acquired in step 1, of various passing vehicles $V_v$ on different lanes $L_l$ in the road network, the traffic operation indexes $PI_l^L$ of various lanes in the road network are calculated:

$$PI_l^L = \frac{\sum_{v\in S_{L,l}^V}\left(PI_{(v,l)}^V \times w_{(v,l)}^V\right)}{\sum_{v\in S_{L,l}^V} w_{(v,l)}^V}$$

Calculation results are shown in Table 6.

TABLE 6

Traffic Operation States of Lanes

| Lane number | $PI_l^L$ | $DI_l^L$ | $HI_l^L$/ (times/min) | $MI_l^L$/ (m/min) | $\bar{V}_{fl}^L$/ (m/s) | $t_{fl}^L$/s | $\bar{d}_l^L$/s | $\bar{h}_l^L$/time | $m_l^L$ |
|---|---|---|---|---|---|---|---|---|---|
| $L_1$ | 1.04 | 0.04 | 0.03 | 21.69 | 13.54 | 32.27 | 1.40 | 0.02 | 2.67% |
| $L_2$ | 9.81 | 8.81 | 15.28 | 288.87 | 13.40 | 2.42 | 21.35 | 0.62 | 35.92% |
| $L_3$ | 12.74 | 11.74 | 16.73 | 340.75 | 13.36 | 2.45 | 28.83 | 0.68 | 42.52% |
| $L_4$ | 1.00 | 0.00 | 0.00 | 2.22 | 14.01 | 31.91 | 0.09 | 0.00 | 0.26% |
| $L_5$ | 1.03 | 0.03 | 0.00 | 21.41 | 13.53 | 38.07 | 1.25 | 0.00 | 2.64% |
| $L_6$ | 2.39 | 1.39 | 3.07 | 67.62 | 13.42 | 2.67 | 3.70 | 0.14 | 8.40% |
| $L_7$ | 11.99 | 10.99 | 18.64 | 351.95 | 14.26 | 2.63 | 28.87 | 0.82 | 41.15% |
| $L_8$ | 1.13 | 0.13 | 0.12 | 47.57 | 13.51 | 38.51 | 4.84 | 0.08 | 5.87% |
| $L_9$ | 9.47 | 8.47 | 13.33 | 282.27 | 13.15 | 2.52 | 21.31 | 0.56 | 35.78% |
| $L_{10}$ | 9.73 | 8.73 | 15.10 | 331.45 | 13.44 | 2.48 | 21.68 | 0.63 | 41.11% |
| . . . | . . . | . . . | . . . | . . . | . . . | . . . | . . . | . . . | . . . |
| Total | 1.62 | 0.62 | 0.83 | 46.53 | 13.72 | 128.02 | 79.68 | 1.77 | 5.65% |

Further, according to the acquired traffic operation indexes $PI_l^L$ T of the lanes, in combination with the traffic weight coefficients, obtained in step 2, of various lanes, various intersections, and various roads, the traffic operation indexes of various intersections and various roads in the road network are calculated:

$$PI_i^I = \frac{\sum_{l\in S_{I,i}^L}\left(PI_l^L \times w_l^L\right)}{\sum_{l\in S_{I,i}^L} w_l^L};\ PI_r^R = \frac{\sum_{l\in S_{R,r}^L}\left(PI_l^L \times w_l^L\right)}{\sum_{l\in S_{R,r}^L} w_l^L}$$

In the embodiment, taking the intersection $I_2$ as an example, calculation results of the traffic operation indexes $P_2^1$, of the intersection $I_2$ are shown in Table 7; and calculation results of the traffic operation indexes $PI_r^R$ of various roads in the road network are shown in Table 8.

TABLE 7

Traffic Operation States of Intersection $I_2$

| Entrance direction | Lane attribute | Lane number | $PI_l^L$ | $DI_l^L$ | $HI_l^L$/(times/min) | $MI_l^L$/(m/min) | $\bar{V}_{fl}^L$/(m/s) | $t_{fl}^L$/s | Various entrances | Whole intersection |
|---|---|---|---|---|---|---|---|---|---|---|
| North | Tapered section | $L_{261}$ | 1.40 | 0.40 | 0.00 | 206.58 | 14.59 | 0.72 | PI = 5.51<br>DI = 4.51 | $PI_2'$ = 5.15<br>$DI_2'$ = 4.15 |
| | Tapered section | $L_{262}$ | 4.43 | 3.43 | 9.16 | 383.99 | 15.36 | 0.52 | HI = 8.42<br>MI = 204.01 | $HI_2'$ = 7.43<br>$MI_2'$ = 192.40 |
| | Entrance lane | $L_{82}$ | 12.82 | 11.82 | 22.90 | 395.55 | 13.84 | 2.10 | $\bar{d}$ = 25.35<br>$\bar{h}$ = 0.79 | $t_f$ = 5.86<br>$\bar{V}_f$ = 13.23 |
| | Entrance lane | $L_{83}$ | 11.69 | 10.69 | 19.83 | 349.30 | 13.57 | 2.24 | m = 25.50% | $\bar{d}$ = 24.30<br>$\bar{h}$ = 0.73 |
| | Left turning | $L_{227}$ | 1.21 | 0.21 | 0.00 | 108.26 | 12.39 | 2.90 | | m = 24.23% |
| | Straight driving | $L_{218}$ | 1.17 | 0.17 | 0.00 | 84.25 | 12.79 | 3.41 | | |
| | Straight driving | $L_{220}$ | 1.15 | 0.15 | 0.00 | 77.69 | 13.16 | 3.41 | | |
| | Right turning | $L_{219}$ | 1.26 | 0.26 | 0.00 | 127.49 | 12.52 | 1.85 | | |

TABLE 7-continued

Traffic Operation States of Intersection $I_2$

| Entrance direction | Lane attribute | Lane number | $PI_l^L$ | $DI_l^L$ | $HI_l^L$/(times/min) | $MI_l^L$/(m/min) | $\nabla_{fl}^L$/(m/s) | $t_{fl}^L$/s | Various entrances | Whole intersection |
|---|---|---|---|---|---|---|---|---|---|---|
| East | Tapered section | $L_{126}$ | 1.32 | 0.32 | 0.00 | 135.52 | 13.78 | 0.79 | PI = 5.16<br>DI = 4.16 | |
| | Tapered section | $L_{127}$ | 4.49 | 3.49 | 8.82 | 243.44 | 14.28 | 0.65 | HI = 7.62<br>MI = 202.46 | |
| | Entrance lane | $L_{12}$ | 10.56 | 9.56 | 16.62 | 328.03 | 13.75 | 2.71 | $\bar{d}$ = 25.16<br>$\bar{h}$ = 0.77 | |
| | Entrance lane | $L_{13}$ | 9.24 | 8.24 | 16.45 | 326.78 | 13.88 | 2.66 | m = 25.47% | |
| | Left turning | $L_{213}$ | 1.11 | 0.11 | 0.00 | 60.96 | 13.42 | 2.25 | | |
| | Straight driving | $L_{214}$ | 1.19 | 0.19 | 0.00 | 92.71 | 12.90 | 3.04 | | |
| | Straight driving | $L_{216}$ | 1.19 | 0.19 | 0.00 | 90.59 | 12.36 | 3.09 | | |
| | Right turning | $L_{215}$ | 1.19 | 0.19 | 0.00 | 104.44 | 11.83 | 2.23 | | |
| South | Tapered section | $L_{170}$ | 1.25 | 0.25 | 0.00 | 139.49 | 13.74 | 0.80 | PI = 4.80<br>DI = 3.80 | |
| | Tapered section | $L_{171}$ | 1.26 | 0.26 | 0.00 | 152.38 | 14.53 | 0.79 | HI = 7.28<br>MI = 180.95 | |
| | Entrance lane | $L_{86}$ | 11.05 | 10.05 | 20.99 | 341.04 | 13.92 | 2.33 | $\bar{d}$ = 23.24<br>$\bar{h}$ = 0.74 | |
| | Entrance lane | $L_{87}$ | 10.18 | 9.18 | 17.07 | 322.86 | 13.90 | 2.38 | m = 22.76% | |
| | Left turning | $L_{172}$ | 1.23 | 0.23 | 0.00 | 110.92 | 12.49 | 2.85 | | |
| | Straight driving | $L_{173}$ | 1.17 | 0.17 | 0.00 | 77.99 | 12.57 | 3.43 | | |
| | Straight driving | $L_{175}$ | 1.15 | 0.15 | 0.00 | 75.63 | 12.89 | 3.53 | | |
| | Right turning | $L_{174}$ | 1.27 | 0.27 | 0.00 | 124.32 | 12.08 | 2.55 | | |
| West | Tapered section | $L_{124}$ | 7.90 | 6.90 | 8.39 | 282.64 | 13.54 | 0.53 | PI = 4.99<br>DI = 3.99 | |
| | Tapered section | $L_{125}$ | 7.65 | 6.65 | 17.65 | 347.13 | 14.76 | 0.49 | HI = 6.45<br>MI = 180.92 | |
| | Entrance lane | $L_9$ | 9.47 | 8.47 | 13.33 | 282.27 | 13.15 | 2.52 | $\bar{d}$ = 23.27<br>$\bar{h}$ = 0.63 | |
| | Entrance lane | $L_{10}$ | 9.73 | 8.73 | 15.10 | 331.45 | 13.44 | 2.48 | m = 22.98% | |
| | Left turning | $L_{205}$ | 1.36 | 0.36 | 0.00 | 153.98 | 12.58 | 2.58 | | |
| | Straight driving | $L_{206}$ | 1.12 | 0.12 | 0.00 | 63.45 | 12.92 | 3.25 | | |
| | Straight driving | $L_{208}$ | 1.17 | 0.17 | 0.00 | 84.73 | 13.02 | 3.11 | | |
| | Right turning | $L_{207}$ | 1.05 | 0.05 | 0.00 | 38.01 | 12.30 | 1.90 | | |

TABLE 8

Calculation Results of Traffic Operation States of Roads

| Road number | Number | w | PI | DI | HI/(times/min) | MI/(m/min) | $PI_r^R$ | $DI_r^R$ | $HI_r^R$/(times/min) | $MI_r^R$/(m/min) |
|---|---|---|---|---|---|---|---|---|---|---|
| $R_1$ | s $S_{R,1}^{S-}$ | 0.160 | 1.05 | 0.05 | 0.04 | 26.38 | 1.90 | 0.90 | 1.39 | 56.67 |
| | $I_1$ | 0.013 | 5.57 | 4.57 | 7.08 | 182.38 | | | | |
| | $I_2$ | 0.012 | 5.15 | 4.15 | 7.43 | 192.40 | | | | |
| | $I_3$ | 0.012 | 6.19 | 5.19 | 7.63 | 195.87 | | | | |
| $R_2$ | s $S_{R,2}^{S-}$ | 0.146 | 1.09 | 0.09 | 0.08 | 31.81 | 2.09 | 1.09 | 1.44 | 62.24 |
| | $I_4$ | 0.013 | 4.97 | 3.97 | 6.77 | 176.75 | | | | |
| | $I_5$ | 0.012 | 6.21 | 5.21 | 6.43 | 180.54 | | | | |
| | $I_6$ | 0.011 | 7.45 | 6.45 | 7.71 | 201.07 | | | | |
| $R_3$ | s $S_{R,3}^{S-}$ | 0.125 | 1.09 | 0.09 | 0.10 | 33.64 | 2.27 | 1.27 | 1.47 | 63.29 |
| | $I_7$ | 0.011 | 6.49 | 5.49 | 7.00 | 181.83 | | | | |
| | $I_8$ | 0.011 | 6.99 | 5.99 | 5.88 | 160.93 | | | | |
| | $I_9$ | 0.011 | 6.82 | 5.82 | 7.08 | 185.10 | | | | |

TABLE 8-continued

Calculation Results of Traffic Operation States of Roads

| Road number | Number | w | PI | DI | HI/(times/min) | MI/(m/min) | $PI_r^R$ | $DI_r^R$ | $HI_r^R$/(times/min) | $MI_r^R$/(m/min) |
|---|---|---|---|---|---|---|---|---|---|---|
| $R_4$ | s $S_{R,4}^{S-}$ | 0.161 | 1.10 | 0.10 | 0.14 | 30.43 | 1.95 | 0.95 | 1.41 | 58.40 |
| | $I_1$ | 0.013 | 5.57 | 4.57 | 7.08 | 182.38 | | | | |
| | $I_4$ | 0.013 | 4.97 | 3.97 | 6.77 | 176.75 | | | | |
| | $I_7$ | 0.011 | 6.49 | 5.49 | 7.00 | 181.83 | | | | |
| $R_5$ | s $S_{R,5}^{S-}$ | 0.148 | 1.10 | 0.10 | 0.14 | 29.93 | 2.04 | 1.04 | 1.36 | 57.93 |
| | $I_2$ | 0.012 | 5.15 | 4.15 | 7.43 | 192.40 | | | | |
| | $I_5$ | 0.012 | 6.21 | 5.21 | 6.43 | 180.54 | | | | |
| | $I_8$ | 0.011 | 6.99 | 5.99 | 5.88 | 160.93 | | | | |
| $R_6$ | s $S_{R,6}^{S-}$ | 0.155 | 1.10 | 0.10 | 0.12 | 30.75 | 2.12 | 1.12 | 1.45 | 60.10 |
| | $I_3$ | 0.012 | 6.19 | 5.19 | 7.63 | 195.87 | | | | |
| | $I_6$ | 0.011 | 7.45 | 6.45 | 7.71 | 201.07 | | | | |
| | $I_9$ | 0.011 | 6.82 | 5.82 | 7.08 | 185.10 | | | | |

Taking the sub-zone $Z_1$ as an example, the traffic operation indexes $PI_1^Z$ of the sub-zone $Z_1$ are obtained by using the acquired traffic weight coefficients $w_l^L$ and the traffic operation indexes $PI_l^L$ of various lanes in the road network:

$$PI_1^Z = \frac{\sum_{l \in S_{Z,z}^L} (PI_l^L \times w_l^L)}{\sum_{l \in S_{Z,z}^L} w_l^L} = 1.51$$

For the whole road network, the traffic operation indexes $PI^A$ of the road network can also be calculated by using the acquired traffic weight coefficients w and traffic operation indexes $PI_l^L$ of various lanes in the road network. Calculation results are shown in Table 6.

$$PI^A = \sum_{l \in S_A^L} (PI_l^L \times w_l^L) = 1.62$$

Step 4, reckoning delay time indexes of various lanes, various sub-sections, various sections, various intersections, various roads, various sub-zones, and the road network by using an average delay time, the free-flow driving times, and the traffic weight coefficients of the vehicles, and calculating average delay times of various evaluation objects at the different spatial scales in combination with the free-flow driving times of the vehicles.

In the embodiment, the delay time indexes DI (v,l) of various passing vehicles $V_v$ on the different lanes $L_l$ are obtained by using the free-flow driving times $t_{f(v,l)}^V$ and the delay times $d_{(v,l)}^V$ of the vehicles $V_v$ on the lanes $L_l$ in the road network. Further, in combination with the traffic weight coefficients $w_{(v,l)}^V$ of various passing vehicles $V_v$ on the different lanes $L_l$ in Table 1, the delay time indexes $DI_v^V$ of the vehicles $V_v$ are reckoned.

$$DI_{(v,l)}^V = \frac{d_{(v,l)}^V}{t_{f(v,l)}^V};\ DI_v^V = \frac{\sum_{l \in S_{V,v}^L} (DI_{(v,l)}^V \times w_{(v,l)}^V)}{\sum_{l \in S_{V,v}^L} w_{(v,l)}^V}$$

Taking the vehicles $V_{46}$ and $V_{47}$ as examples, calculation results of $DI_{(v,l)}^V$ and $DI_v^V$ are shown in Table 5.

Based on the acquired delay time indexes $DI_{(v,l)}^V$ of the vehicles $V_v$ on the lanes $L_l$, in combination with the traffic weight coefficients $w_{(v,l)}^V$, acquired in step 1, of various passing vehicles $V_v$ on different lanes $L_l$ in the road network, the delay time indexes $DI_l^L$ of various lanes in the road network are calculated:

$$DI_l^L = \frac{\sum_{v \in S_{L,l}^V} (DI_{(v,l)}^V \times w_{(v,l)}^V)}{\sum_{v \in S_{L,l}^V} w_{(v,l)}^V}$$

Calculation results are shown in Table 6.

Further, according to the acquired delay time indexes $DI_l^L$ of the lanes, in combination with the traffic weight coefficients, obtained in step 2, of various lanes, various intersections, and various roads, the delay time indexes of various intersections and various roads in the road network are calculated:

$$DI_i^I = \frac{\sum_{l \in S_{I,i}^L} (DI_l^L \times w_l^L)}{\sum_{l \in S_{I,i}^L} w_l^L};\ DI_r^R = \frac{\sum_{l \in S_{R,r}^L} (DI_l^L \times w_l^L)}{\sum_{l \in S_{R,r}^L} w_l^L}$$

In the embodiment, taking the intersection $I_2$ as an example, calculation results of the delay time indexes $DI_2^1$ of the intersection $I_2$ are shown in Table 7; and calculation results of the delay time indexes $DI_r^R$ of various roads in the road network are shown in Table 8.

Taking the sub-zone $Z_1$ as an example, the delay time indexes $DI_1^Z$ of the sub-zone $Z_1$ are obtained by using the acquired traffic weight coefficients $w_l^L$ and delay time indexes $DI_l^L$ of various lanes in the road network:

$$DI_1^Z = \frac{\sum_{l \in S_{Z,z}^L} (DI_l^L \times w_l^L)}{\sum_{l \in S_{Z,z}^L} w_l^L} = 0.51$$

For the whole road network, the delay time indexes $DI^A$ of the road network can also be calculated by using the acquired traffic weight coefficients $w_l^L$ and delay time indexes $DI_l^L$ of various lanes in the road network. Calculation results are shown in Table 6.

$$DI^A = \sum_{l \in S_A^L} (DI_l^L \times w_l^L) = 0.62$$

Further, by calculating products of the delay time indexes of various lanes, various sections, various intersections, and various roads in the road network and the road network, and corresponding average free-flow driving times, the average delay times of various evaluation objects can be obtained, as shown in Table 6, Table 7, and Table 9. The average delay times calculated by using the delay time indexes of various evaluation objects are consistent with results actually calculated by a definition of an average delay time.

times $t_{f(v,l)}^V$ and the numbers of times of stopping $h_{(v,l)}^V$ of the vehicles $V_v$ on the lanes $L_l$ in the road network. Further, in combination with the traffic weight coefficients $w_{(v,l)}^V$ of various passing vehicles $V_v$ on the different lanes $L_l$ in Table 1, the indexes of the numbers of times of stopping $HI_v^V$ of the vehicles $V_v$ are reckoned.

$$HI_{(v,l)}^V = \frac{h_{(v,l)}^V}{t_{f(v,l)}^V};\ HI_v^V = \frac{\sum_{l \in S_{V,v}^L} (HI_{(v,l)}^V \times w_{(v,l)}^V)}{\sum_{l \in S_{V,v}^L} w_{(v,l)}^V}$$

Taking the vehicles $V_{46}$ and $V_{47}$ as examples, calculation results of $HI_{(v,l)}^V$ and $HI_v^V$ are shown in Table 5.

Based on the acquired indexes of the numbers of times of stopping $HI_{(v,l)}^V$ of the vehicles $V_v$ on the lanes $L_l$ in combination with the traffic weight coefficients $w_{(v,l)}^V$, acquired in step 1, of various passing vehicles $V_v$ on different lanes $L_l$ in the road network, the indexes of the numbers of times of stopping HIT of various lanes in the road network are calculated:

$$HI_l^L = \frac{\sum_{v \in S_{L,l}^V} (HI_{(v,l)}^V \times w_{(v,l)}^V)}{\sum_{v \in S_{L,l}^V} w_{(v,l)}^V}$$

Calculation results are shown in Table 6.

Further, according to the acquired indexes of the numbers of times of stopping $HI_l^L$ of the lanes, in combination with the traffic weight coefficients, obtained in step 2, of various

TABLE 9

Traffic Operation State Characteristic Indexes of Roads

| Road number | Number | $t_f$/s | $\overline{V}_f$/(m/s) | $\overline{d}$/s | $\overline{h}$/time | m | $t_{f\,r}^R$/s | $\overline{V}_{f\,r}^R$/(m/s) | $\overline{d}_r^R$/s | $\overline{h}_r^R$/time | $m_r^R$ |
|---|---|---|---|---|---|---|---|---|---|---|---|
| $R_1$ | s $S_{R,1}^{S}$— | 103.84 | 13.59 | 5.62 | 0.06 | 3.23% | 42.31 | 13.54 | 38.18 | 0.98 | 6.98% |
| | $I_1$ | 5.70 | 13.34 | 26.05 | 0.67 | 22.79% | | | | | |
| | $I_2$ | 5.81 | 13.23 | 24.09 | 0.72 | 24.23% | | | | | |
| | $I_3$ | 5.93 | 13.28 | 30.79 | 0.75 | 24.59% | | | | | |
| $R_2$ | s $S_{R,2}^{S}$— | 94.44 | 13.74 | 8.31 | 0.13 | 3.86% | 39.10 | 13.65 | 42.49 | 0.94 | 7.60% |
| | $I_4$ | 6.46 | 13.34 | 25.65 | 0.73 | 22.09% | | | | | |
| | $I_5$ | 5.78 | 13.26 | 30.12 | 0.62 | 22.70% | | | | | |
| | $I_6$ | 5.64 | 13.34 | 36.34 | 0.72 | 25.12% | | | | | |
| $R_3$ | s $S_{R,3}^{S}$— | 80.78 | 13.64 | 7.37 | 0.13 | 4.11% | 33.89 | 13.57 | 43.19 | 0.83 | 7.78% |
| | $I_7$ | 5.70 | 13.32 | 31.26 | 0.66 | 22.74% | | | | | |
| | $I_8$ | 6.03 | 13.19 | 36.16 | 0.59 | 20.33% | | | | | |
| | $I_9$ | 5.85 | 13.32 | 34.00 | 0.69 | 23.16% | | | | | |
| $R_4$ | s $S_{R,4}^{S}$— | 104.05 | 13.95 | 10.53 | 0.24 | 3.64% | 42.49 | 13.83 | 40.22 | 1.00 | 7.04% |
| | $I_1$ | 5.70 | 13.34 | 26.05 | 0.67 | 22.79% | | | | | |
| | $I_4$ | 6.46 | 13.34 | 25.65 | 0.73 | 22.09% | | | | | |
| | $I_7$ | 5.70 | 13.32 | 31.26 | 0.66 | 22.74% | | | | | |
| $R_5$ | s $S_{R,5}^{S}$— | 95.80 | 13.71 | 9.43 | 0.23 | 3.64% | 39.21 | 13.62 | 40.86 | 0.89 | 7.09% |
| | $I_2$ | 5.81 | 13.23 | 24.09 | 0.72 | 24.23% | | | | | |
| | $I_5$ | 5.78 | 13.26 | 30.12 | 0.62 | 22.70% | | | | | |
| | $I_8$ | 6.03 | 13.19 | 36.16 | 0.59 | 20.33% | | | | | |
| $R_6$ | s $S_{R,6}^{S}$— | 100.35 | 13.94 | 10.02 | 0.21 | 3.68% | 40.62 | 13.83 | 45.66 | 0.98 | 7.24% |
| | $I_3$ | 5.93 | 13.28 | 30.79 | 0.75 | 24.59% | | | | | |
| | $I_6$ | 5.64 | 13.34 | 36.34 | 0.72 | 25.12% | | | | | |
| | $I_9$ | 5.85 | 13.32 | 34.00 | 0.69 | 23.16% | | | | | |

Step 5, reckoning indexes of the numbers of times of stopping of various lanes, various sub-sections, various sections, various intersections, various roads, various sub-zones, and the road network by using an average number of times of stopping, the free-flow driving times, and the traffic weight coefficients of the vehicles, and calculating average numbers of times of stopping of various evaluation objects at the different spatial scales in combination with the free-flow driving times of the vehicles.

In the embodiment, the indexes of the numbers of times of stopping $HI_{(v,l)}^V$ of various passing vehicles $V_v$ on the different lanes $L_l$ are obtained by using the free-flow driving lanes, various intersections, and various roads, the indexes of the numbers of times of stopping of various intersections and various roads in the road network are calculated:

$$HI_i^I = \frac{\sum_{l\in S_{I,i}^L}(HI_l^L \times w_l^L)}{\sum_{l\in S_{I,i}^L} w_l^L};\ HI_r^R = \frac{\sum_{l\in S_{R,r}^L}(HI_l^L \times w_l^L)}{\sum_{l\in S_{R,r}^L} w_l^L}$$

In the embodiment, taking the intersection $I_2$ as an example, calculation results of the indexes of the numbers of times of stopping $HI_2^1$ of the intersection $I_2$ are shown in Table 7; and calculation results of the indexes of the numbers of times of stopping $HI_r^R$ of various roads in the road network are shown in Table 8.

Taking the sub-zone $Z_1$ as an example, the indexes of the numbers of times of stopping $HI_1^Z$ of the sub-zone Z are obtained by using the acquired traffic weight coefficients $w_l^L$ and indexes of the numbers of times of stopping $HI_l^L$ of various lanes in the road network:

$$HI_i^Z = \frac{\sum_{l\in S_{Z,z}^L}(HI_l^L \times w_l^L)}{\sum_{l\in S_{Z,z}^L} w_l^L} = 0.75 \text{ times/min}$$

For the whole road network, the indexes of the numbers of times of stopping $HI^A$ of the road network can also be calculated by using the acquired traffic weight coefficients $w_l^L$ and indexes of the numbers of times of stopping $HI_l^L$ of various lanes in the road network. Calculation results are shown in Table 6.

$$HI^A = \sum_{l\in S_A^L}(HI_l^L \times w_l^L) = 0.83 \text{ times/min}$$

Further, by calculating products of the indexes of the numbers of times of stopping of various lanes, various sections, various intersections, and various roads in the road network and the road network, and corresponding average free-flow driving times, the average numbers of times of stopping of various evaluation objects can be obtained, as shown in Table 6, Table 7, and Table 9. The average numbers of times of stopping calculated by using the indexes of the numbers of times of stopping of various evaluation objects are consistent with results actually calculated by a definition of the average number of times of stopping.

Step 6, reckoning indexes of mileages of congested roads of various lanes, various sub-sections, various sections, various intersections, various roads, various sub-zones, and the road network by using mileages of heavily congested roads, the free-flow driving times, and the traffic weight coefficients of the vehicles, and calculating proportions of the mileages of the heavily congested roads of various evaluation objects at the different spatial scales in combination with free-flow driving speeds of the vehicles.

In the embodiment, the indexes of the mileages of the congested roads $MI_{(v,l)}^V$ of various passing vehicles $V_v$ on the different lanes $L_l$ are obtained by using the free-flow driving times $t_{f(v,l)}^V$ and overall mileages of the congested roads $l_{c(v,l)}^V$ of the vehicles $V_v$ on the lanes $L_l$ in the road network. Further, in combination with the traffic weight coefficients $w_{(v,l)}^V$ of various passing vehicles $V_v$ on the different lanes $L_l$ in Table 1, the indexes of the mileages of the congested roads $MI_v^V$ of the vehicles $V_v$ are reckoned.

$$MI_{(v,l)}^V = \frac{l_{c(v,l)}^V}{t_{f(v,l)}^V};\ MI_v^V = \frac{\sum_{l\in S_{V,v}^L}(MI_{(v,l)}^L \times w_{(v,l)}^V)}{\sum_{l\in S_{V,v}^L} w_{(v,l)}^V}$$

Taking the vehicles $V_{46}$ and $V_{47}$ as examples, calculation results of $MI_{(v,l)}^V$ and $MI_v^V$ are shown in Table 5.

Based on the acquired indexes of the mileages of the congested roads $MI_{(v,l)}^V$ of the vehicles $V_v$ on the lanes $L_l$, in combination with the traffic weight coefficients $w_{(v,l)}^V$, acquired in step 1, of various passing vehicles $V_v$ on different lanes $L_l$ in the road network, the indexes of the mileages of the congested roads $MI_l^L$ of various lanes in the road network are calculated:

$$MI_l^L = \frac{\sum_{v\in S_{L,l}^V}(MI_{(v,l)}^V \times w_{(v,l)}^V)}{\sum_{v\in S_{L,l}^V} w_{(v,l)}^V}$$

Calculation results are shown in Table 6.

Further, according to the acquired indexes of the mileages of the congested roads $MI_l^L$ of the lanes, in combination with the traffic weight coefficients, obtained in step 2, of various lanes, various intersections, and various roads, the indexes of the mileages of the congested roads of various intersections and various roads in the road network are calculated:

$$MI_i^I = \frac{\sum_{l\in S_{I,i}^L}(MI_l^L \times w_l^L)}{\sum_{l\in S_{I,i}^L} w_l^L};\ MI_r^R = \frac{\sum_{l\in S_{R,r}^L}(MI_l^L \times w_l^L)}{\sum_{l\in S_{R,r}^L} w_l^L}$$

In the embodiment, taking the intersection $I_2$ as an example, calculation results of the indexes of the mileages of the congested roads $MI_2^1$ of the intersection $I_2$ are shown in Table 7; and calculation results of the indexes of the mileages of the congested roads $MI_r^R$ of various roads in the road network are shown in Table 8.

Taking the sub-zone $Z_1$ as an example, the indexes of the mileages of the congested roads $MI_1^Z$ of the sub-zone $Z_1$ are obtained by using the acquired traffic weight coefficients $w_l^L$ and the indexes of the mileages of the congested roads $MI_l^L$ of various lanes in the road network:

$$MI_1^Z = \frac{\sum_{l\in S_{Z,z}^L}(MI_l^L \times w_l^L)}{\sum_{l\in S_{Z,z}^L} w_l^L} = 46.62 \text{ m/min}$$

For the whole road network, the indexes of the mileages of the congested roads $MI^A$ of the road network can also be calculated by using the acquired traffic weight coefficients $w_l^L$ and indexes of the mileages of the congested roads $MI_l^L$ of various lanes in the road network. Calculation results are shown in Table 6.

$$MI^A = \sum_{l\in S_A^L}\left(MI_l^L \times w_l^L\right) = 46.53\ \text{m/min}$$

Further, by calculating products of the indexes of the mileages of the congested roads of various lanes, various sections, various intersections, and various roads in the road network and the road network, and corresponding average free-flow driving speeds, the proportions of the mileages of the heavily congested roads of various evaluation objects can be obtained, as shown in Table 6, Table 7, and Table 9. The proportions of the mileages of the heavily congested roads calculated by using the indexes of the mileages of the congested roads of various evaluation objects are consistent with results actually calculated by a definition of the proportion of the mileage of the heavily congested road.

It should be noted that the evaluation indexes used in the specific embodiments of the present invention are the traffic operation index, the delay time index, the index of the number of times of stopping, and the index of the mileage of the congested road, which collectively constitute a new method for calculating a characteristic index system for traffic operation state evaluation. The larger the traffic operation index, the delay time index, the index of the number of times of stopping, and the index of the mileage of the congested road are, the worse the traffic operation state is, that is, the more congested the road traffic is.

The above embodiments are preferred implementations of the present invention, which are not limited by the above embodiments. Other changes, modifications, replacements, combinations, and simplification made without departing from the spirit and the principle of the present invention should all be equivalent permutations, and fall within the scope of protection of the present invention.

The invention claimed is:

1. A digital road network traffic state reckoning method based on multi-scale calculation, performed by an intelligent transportation system, comprising the following steps:

S1, acquiring traffic weight coefficients of vehicles according to free-flow driving times of the vehicles and an overall free-flow driving time of a road network, wherein the traffic weight coefficient of each vehicle is a ratio of the overall free-flow driving time of a certain passing vehicle in the road network to the overall free-flow driving time of all vehicles in the road network, which is obtained by summing the traffic weight coefficients of the vehicle on various through lanes in the road network, and reflects a proportion of the certain passing vehicle occupying an overall road time-space resource of the road network; and a formula of the traffic weight coefficient is as follows:

$$w_v^V = \frac{tf_v^V}{\sum_{v=1}^{N^V} tf_v^V} = \frac{\sum_{l\in S_{V,v}^L} tf_{(v,l)}^V}{\sum_{v=1}^{N^V}\sum_{l\in S_{V,v}^L} tf_{(v,l)}^V} =$$

-continued $$\frac{\sum_{l\in S_{V,v}^L} tf_l^L}{\sum_{v=1}^{N^V}\sum_{l\in S_{V,v}^L} tf_l^L} = \sum_{l\in S_{V,v}^L}\frac{tf_l^L}{\sum_{v=1}^{N^V}\sum_{l\in S_{V,v}^L} tf_l^L} = \sum_{l\in S_{V,v}^L} w_{(v,l)}^V$$

wherein $w_v^V$ is a traffic weight coefficient of the $v^{th}$ vehicle $V_v$ in the road network; $t_{f_v}^V$ is an overall free-flow driving time of the vehicle $V_v$ passing the road network; $N^V$ is the number of vehicles passing the road network within an evaluation period; $S_{V,v}^L$ is a set of lanes through which the vehicle $V_v$ passes in the road network within the evaluation period; $t_{f_{(v,l)}}^V$ is a free-flow driving time of the vehicle $V_v$ passing the $l^{th}$ lane $L_l$ in the road network; $t_{f_l}^L$ is an average free-flow driving time of the vehicles passing the lane $L_l$; and $w_{(v,l)}^V$ is a traffic weight coefficient of the vehicle $V_v$ on the lane $L_l$;

S2, calculating traffic weight coefficients of evaluation objects in the road network at different spatial scales level by level in combination with the traffic weight coefficients of the vehicles and a composition structure of the road network, which is specifically as follows:

according to a definition of the traffic weight coefficient, for the traffic weight coefficients of each evaluation object in the road network at the different spatial scales, each value is a ratio of the overall free-flow driving time of all the passing vehicles within a period of time to the overall free-flow driving time of all the vehicles in the whole road network for each evaluation object; and the traffic weight coefficients of all compositions belonging to one evaluation object at a same spatial scale are summed to obtain the traffic weight coefficient of the evaluation object, which is specifically as follows:

a traffic weight coefficient of the vehicle $V_v$ passing the lane $L_l$ is reckoned as follows:

$$w_{(v,l)}^V = \frac{tf_{(v,l)}^V}{\sum_{v=1}^{N^V}\sum_{l\in S_{V,v}^L} tf_{(v,l)}^V}$$

a traffic weight coefficient of the lane $L_l$ is reckoned as follows:

$$w_l^L = \frac{\sum_{v\in S_{L,l}^V} tf_{(v,l)}^V}{\sum_{v=1}^{N^V}\sum_{l\in S_{V,v}^L} tf_{(v,l)}^V} = \sum_{v\in S_{L,l}^V}\frac{tf_{(v,l)}^V}{\sum_{v=1}^{N^V}\sum_{l\in S_{V,v}^L} tf_{(v,l)}^V} = \sum_{v\in S_{L,l}^V} w_{(v,l)}^V$$

a traffic weight coefficient of a subsection $U_u$ is reckoned as follows:

$$w_u^U = \frac{\sum_{l\in S_{U,u}^L}\sum_{v\in S_{L,l}^V} tf_{(v,l)}^V}{\sum_{v=1}^{N^V}\sum_{l\in S_{V,v}^L} tf_{(v,l)}^V} = \sum_{l\in S_{U,u}^L}\frac{\sum_{v\in S_{L,l}^V} tf_{(v,l)}^V}{\sum_{v=1}^{N^V}\sum_{l\in S_{V,v}^L} tf_{(v,l)}^V} = \sum_{l\in S_{U,u}^L} w_l^L$$

a traffic weight coefficient of a section $S_S$ is reckoned as follows:

$$w_s^S=\frac{\sum_{u\in S_{S,s}^U}\sum_{l\in S_{U,u}^L}\sum_{v\in S_{L,l}^V}tf_{(v,l)}^V}{\sum_{v=1}^{N^V}\sum_{l\in S_{V,v}^L}tf_{(v,l)}^V}=\sum_{u\in S_{S,s}^U}\frac{\sum_{l\in S_{U,u}^L}\sum_{v\in S_{L,l}^V}tf_{(v,l)}^V}{\sum_{v=1}^{N^V}\sum_{l\in S_{V,v}^L}tf_{(v,l)}^V}=\sum_{u\in S_{S,s}^U}w_u^U=\sum_{l\in S_{S,s}^L}w_l^L$$

a traffic weight coefficient of an intersection $I_i$ is reckoned as follows:

$$w_i^I=\frac{\sum_{l\in S_{I,i}^L}\sum_{v\in S_{L,l}^V}tf_{(v,l)}^V}{\sum_{v=1}^{N^V}\sum_{l\in S_{V,v}^L}tf_{(v,l)}^V}=\sum_{l\in S_{I,i}^L}\frac{\sum_{v\in S_{L,l}^V}tf_{(v,l)}^V}{\sum_{v=1}^{N^V}\sum_{l\in S_{V,v}^L}tf_{(v,l)}^V}=\sum_{l\in S_{I,i}^L}w_l^L$$

a traffic weight coefficient of a road $R_r$ is reckoned as follows:

$$w_r^R=\frac{\sum_{s\in S_{R,r}^S}\sum_{u\in S_{S,s}^U}\sum_{l\in S_{U,u}^L}\sum_{v\in S_{L,l}^V}tf_{(v,l)}^V+\sum_{i\in S_{R,r}^I}\sum_{l\in S_{I,i}^L}\sum_{v\in S_{L,l}^V}tf_{(v,l)}^V}{\sum_{v=1}^{N^V}\sum_{l\in S_{V,v}^L}tf_{(v,l)}^V}=\sum_{s\in S_{R,r}^S}w_s^S+\sum_{i\in S_{R,r}^I}w_i^I=\sum_{l\in S_{R,r}^L}w_l^L$$

a traffic weight coefficient of a sub-zone $Z_z$ is reckoned as follows:

$$w_z^Z=\frac{\sum_{s\in S_{Z,z}^S}\sum_{u\in S_{S,s}^U}\sum_{l\in S_{U,u}^L}\sum_{v\in S_{L,l}^V}tf_{(v,l)}^V+\sum_{i\in S_{Z,z}^I}\sum_{l\in S_{I,i}^L}\sum_{v\in S_{L,l}^V}tf_{(v,l)}^V}{\sum_{v=1}^{N^V}\sum_{l\in S_{V,v}^L}tf_{(v,l)}^V}=\sum_{s\in S_{Z,z}^S}w_s^S+\sum_{i\in S_{Z,z}^I}w_i^I=\sum_{l\in S_{Z,z}^L}w_l^L$$

wherein $w_l^L$ is the traffic weight coefficient of the lane $L_l$; $S_{L,l}^V$ is a set of vehicles passing the lane $L_l$ within the evaluation period; $W_u^U$ is the traffic weight coefficient of the $u^{th}$ subsection $U_u$ in the road network; $S_{U,u}^L$ is a set of lanes contained in the subsection $U_u$; $W_s^S$ is the traffic weight coefficient of the $s^{th}$ section $S_s$ in the road network; $S_{S,s}^U$ is a set sub-sections contained in the section $S_s$; $S_{S,s}^L$ is a set of lanes contained in the section $S_s$; $w_i^I$ is the traffic weight coefficient of the $i^{th}$ intersection $I_i$ in the road network; $S_{I,i}^L$ is a set of lanes contained in the intersection $I_i$; $w_r^R$ is the traffic weight coefficient of the $r^{th}$ road $R_r$ in the road network; $S_{R,r}^S$ is a set of sections contained in the road $R_r$; $S_{R,r}^I$ is a set of intersections contained in the road $R_r$; $S_{R,r}^L$ is a set of lanes contained in the road $R_r$; $w_z^Z$ is the traffic weight coefficient of the $z^{th}$ sub-zone $Z_z$ in the road network; $S_{Z,z}^S$ a set of sections contained in the sub-zone $Z_z$; $S_{Z,z}^I$ is a set of intersections contained in the sub-zone $Z_z$; and $S_{Z,z}^L$ is a set of lanes contained in the sub-zone $Z_z$; and according to the definition of the traffic weight coefficient of the road network, the traffic weight coefficients of all the vehicles, lanes, road sections, and intersections in the road network are summed respectively, with each sum being 1; and a formula is as follows:

$$w^A=\frac{\sum_{s=1}^{N^S}\sum_{u\in S_{S,s}^U}\sum_{l\in S_{U,u}^L}\sum_{v\in S_{L,l}^V}tf_{(v,l)}^V+\sum_{i=1}^{N^I}\sum_{l\in S_{I,i}^L}\sum_{v\in S_{L,l}^V}tf_{(v,l)}^V}{\sum_{v=1}^{N^V}\sum_{l\in S_{V,v}^L}tf_{(v,l)}^V}=$$

$$\sum_{s=1}^{N^S}w_s^S+\sum_{i=1}^{N^I}w_i^I=\sum_{u=1}^{N^U}w_u^U+\sum_{i=1}^{N^I}w_i^I=\sum_{l=1}^{N^L}w_l^L=\sum_{v=1}^{N^V}w_v^V=\sum_{l\in S_A^L}\sum_{v\in S_{L,l}^V}w_{(v,l)}^V=1$$

wherein $w^A$ is the overall traffic weight coefficient of the road network; $N^S$ is the number of sections in the road network; $N^I$ is the number of intersections in the road network; $N^U$ is the number of sub-sections in the road network; and $N^L$ is the number of lanes in the road network;

S3, reckoning traffic operation indexes of various lanes, various sub-sections, various sections, various intersections, various roads, various sub-zones, and the road network by using an average travel time, the free-flow driving times, and the traffic weight coefficients of the vehicles;

S4, reckoning delay time indexes of various lanes, various sub-sections, various sections, various intersections, various roads, various sub-zones, and the road network by using an average delay time, the free-flow driving times, and the traffic weight coefficients of the vehicles, and calculating average delay times of various evaluation objects at the different spatial scales in combination with the free-flow driving times of the vehicles;

S5, reckoning indexes of numbers of times of stopping of various lanes, various sub-sections, various sections, various intersections, various roads, various sub-zones, and the road network by using an average number of times of stopping, the free-flow driving times, and the traffic weight coefficients of the vehicles, and calculating average numbers of times of stopping of various evaluation objects at the different spatial scales in combination with the free-flow driving times of the vehicles;

S6, reckoning indexes of mileages of congested roads of various lanes, various sub-sections, various sections, various intersections, various roads, various sub-zones, and the road network by using mileages of heavily congested roads, the free-flow driving times, and the traffic weight coefficients of the vehicles, and calculating proportions of the mileages of the heavily congested roads of various evaluation objects at the different spatial scales in combination with free-flow driving speeds of the vehicles; and S7, constructing a digital urban traffic road network by utilizing the traffic operation indexes, the delay time indexes, the indexes of the number of times of stopping, and the indexes of the mileage of the congested road, to analyze traffic operation states of the roads, the lanes, and the vehicles, thereby intelligently managing and controlling urban traffic.

2. The digital road network traffic state reckoning method based on multi-scale calculation according to 1, wherein step S3 is specifically as follows:

the traffic operation index of each evaluation object in the road network is a ratio of an overall travel time of all the passing vehicles in each evaluation object to the overall free-flow driving time, that is, an average travel time of all the passing vehicles in a distance corresponding to a unit free-flow driving time; and the traffic operation index of each evaluation object may be obtained by weighted summation of the traffic weight coefficients and the traffic operation indexes of the vehicles, the lanes, the sub-sections, the sections, and the intersections belonging to the evaluation object, and the traffic operation index is dimensionless, specifically as follows:

a traffic operation index of the vehicle $V_v$ passing the lane $L_l$ is reckoned as follows:

$$PI^V_{(v,l)} = \frac{t^V_{(v,l)}}{tf^V_{(v,l)}}$$

a traffic operation index of the vehicle $V_v$ is reckoned as follows:

$$PI^V_v = \frac{\sum_{l\in S^L_{V,v}} t^V_{(v,l)}}{\sum_{l\in S^L_{V,v}} tf^L_l} = \frac{\sum_{l\in S^L_{V,v}} \left(PI^V_{(v,l)} \times tf^V_{(v,l)}\right)}{\sum_{v=1}^{N^V} \sum_{l\in S^L_{V,v}} tf^L_l} \times \frac{\sum_{v=1}^{N^V} \sum_{l\in S^L_{V,v}} tf^L_l}{\sum_{l\in S^L_{V,v}} tf^L_l} = \frac{\sum_{l\in S^L_{V,v}} \left(PI^V_{(v,l)} \times w^V_{(v,l)}\right)}{\sum_{l\in S^L_{V,v}} w^V_{(v,l)}}$$

a traffic operation index of the lane $L_l$ is reckoned as follows:

$$PI^L_l = \frac{\sum_{v\in S^V_{L,l}} t^V_{(v,l)}}{\sum_{l\in S^L_{V,v}} tf^L_l} = \frac{\sum_{v\in S^V_{L,l}} t^V_{(v,l)}}{\sum_{v=1}^{N^V} \sum_{l\in S^L_{V,v}} tf^V_{(v,l)}} \times \frac{\sum_{v=1}^{N^V} \sum_{l\in S^L_{V,v}} tf^V_{(v,l)}}{\sum_{v\in S^V_{L,l}} tf^V_{(v,l)}} = \frac{\sum_{v\in S^V_{L,l}} \left(PI^V_{(v,l)} \times w^V_{(v,l)}\right)}{\sum_{v\in S^V_{L,l}} w^V_{(v,l)}}$$

a traffic operation index of a subsection $U_u$ is reckoned as follows:

$$PI^U_u = \frac{\sum_{l\in S^L_{U,u}} \sum_{v\in S^V_{L,l}} t^V_{(v,l)}}{\sum_{l\in S^L_{U,u}} \sum_{v\in S^V_{L,l}} tf^V_{(v,l)}} = \frac{\sum_{l\in S^L_{U,u}} \sum_{v\in S^V_{L,l}} \left(PI^V_{(v,l)} \times w^V_{(v,l)}\right)}{\sum_{l\in S^L_{U,u}} \sum_{v\in S^V_{L,l}} w^V_{(v,l)}} = \frac{\sum_{l\in S^L_{U,u}} \left(PI^L_l \times w^L_l\right)}{\sum_{l\in S^L_{U,u}} w^L_l};$$

a traffic operation index of the section $S_s$ is reckoned as follows:

$$PI^S_s = \frac{\sum_{u\in S^U_{S,s}} \sum_{l\in S^L_{U,u}} \sum_{v\in S^V_{L,l}} t^V_{(v,l)}}{\sum_{u\in S^U_{S,s}} \sum_{l\in S^L_{U,u}} \sum_{v\in S^V_{L,l}} tf^V_{(v,l)}} = \frac{\sum_{l\in S^L_{S,s}} \sum_{v\in S^V_{L,l}} \left(PI^V_{(v,l)} \times w^V_{(v,l)}\right)}{\sum_{l\in S^L_{S,s}} \sum_{v\in S^V_{L,l}} w^V_{(v,l)}} = \frac{\sum_{l\in S^L_{S,s}} \left(PI^L_l \times w^L_l\right)}{\sum_{l\in S^L_{S,s}} w^L_l} = \frac{\sum_{u\in S^U_{S,s}} \left(PI^U_u \times w^U_u\right)}{\sum_{u\in S^U_{S,s}} w^U_u}$$

a traffic operation index of the intersection $I_i$ is reckoned as follows:

$$PI^I_i = \frac{\sum_{l\in S^L_{I,i}} \sum_{v\in S^V_{L,l}} t^V_{(v,l)}}{\sum_{l\in S^L_{I,i}} \sum_{v\in S^V_{L,l}} tf^V_{(v,l)}} = \frac{\sum_{l\in S^L_{I,i}} \sum_{v\in S^V_{L,l}} \left(PI^V_{(v,l)} \times w^V_{(v,l)}\right)}{\sum_{l\in S^L_{I,i}} \sum_{v\in S^V_{L,l}} w^V_{(v,l)}} = \frac{\sum_{l\in S^L_{I,i}} \left(PI^L_l \times w^L_l\right)}{\sum_{l\in S^L_{I,i}} w^L_l}$$

a traffic operation index of the road $R_r$ is reckoned as follows:

$$PI^R_r = \frac{\sum_{s\in S^S_{R,r}} \sum_{u\in S^U_{S,s}} \sum_{l\in S^L_{U,u}} \sum_{v\in S^V_{L,l}} t^V_{(v,l)} + \sum_{i\in S^I_{R,r}} \sum_{l\in S^L_{I,i}} \sum_{v\in S^V_{L,l}} t^V_{(v,l)}}{\sum_{s\in S^S_{R,r}} \sum_{u\in S^U_{S,s}} \sum_{l\in S^L_{U,u}} \sum_{v\in S^V_{L,l}} tf^V_{(v,l)} + \sum_{i\in S^I_{R,r}} \sum_{l\in S^L_{I,i}} \sum_{v\in S^V_{L,l}} tf^V_{(v,l)}} = \frac{\sum_{l\in S^L_{R,r}} \sum_{v\in S^V_{L,l}} t^V_{(v,l)}}{\sum_{l\in S^L_{R,r}} \sum_{v\in S^V_{L,l}} tf^V_{(v,l)}} = \frac{\sum_{l\in S^L_{R,r}} \left(PI^L_l \times w^L_l\right)}{\sum_{l\in S^L_{R,r}} w^L_l}$$

a traffic operation index of a sub-zone $Z_z$ is reckoned as follows:

$$PI^Z_z = \frac{\sum_{s\in S^S_{Z,z}} \sum_{u\in S^U_{S,s}} \sum_{l\in S^L_{U,u}} \sum_{v\in S^V_{L,l}} t^V_{(v,l)} + \sum_{i\in S^I_{Z,z}} \sum_{l\in S^L_{I,i}} \sum_{v\in S^V_{L,l}} t^V_{(v,l)}}{\sum_{s\in S^S_{Z,z}} \sum_{u\in S^U_{S,s}} \sum_{l\in S^L_{U,u}} \sum_{v\in S^V_{L,l}} tf^V_{(v,l)} + \sum_{i\in S^I_{Z,z}} \sum_{l\in S^L_{I,i}} \sum_{v\in S^V_{L,l}} tf^V_{(v,l)}} = \frac{\sum_{l\in S^L_{Z,z}} \sum_{v\in S^V_{L,l}} t^V_{(v,l)}}{\sum_{l\in S^L_{Z,z}} \sum_{v\in S^V_{L,l}} tf^V_{(v,l)}} = \frac{\sum_{l\in S^L_{Z,z}} \left(PI^L_l \times w^L_l\right)}{\sum_{l\in S^L_{Z,z}} w^L_l}$$

a traffic operation index of a zone is reckoned as follows:

$$PI^A = \frac{\sum_{s\in S_A^S}\sum_{u\in S_{S,s}^U}\sum_{l\in S_{U,u}^L}\sum_{v\in S_{L,l}^V} t_{(v,l)}^V + \sum_{i\in S_A^I}\sum_{l\in S_{I,i}^L}\sum_{v\in S_{L,l}^V} t_{(v,l)}^V}{\sum_{s\in S_A^S}\sum_{u\in S_{S,s}^U}\sum_{l\in S_{U,u}^L}\sum_{v\in S_{L,l}^V} tf_{(v,l)}^V + \sum_{i\in S_A^I}\sum_{l\in S_{I,i}^L}\sum_{v\in S_{L,l}^V} tf_{(v,l)}^V} = \frac{\sum_{l\in S_A^L}\sum_{v\in S_{L,l}^V} t_{(v,l)}^V}{\sum_{l\in S_A^L}\sum_{v\in S_{L,l}^V} tf_{(v,l)}^V} = \sum_{l\in S_A^L}\left(PI_l^L \times w_l^L\right)$$

wherein $PI_{(v,l)}^V$ is the traffic operation index of the vehicle $V_v$ on the lane $L_l$; $t_{(v,l)}^V$ is a travel time of the vehicle $V_v$ passing the lane $L_l$; $PI_v^V$, $PI_l^L$, $PI_u^U$, $PI_s^S$, $PI_i^I$, $PI_r^R$, $PI_z^Z$, and $PI^A$ represent traffic operation indexes of the vehicle $V_v$, the lane $L_l$, the subsection $U_u$, the section, $S_s$, the intersection $I_i$, the road $R_r$, the sub-zone $Z_z$, and the zone respectively; $S_A^S$ is a set of sections contained in the zone; $S_A^I$ is a set of intersections contained in the zone; and $S_A^L$ is a set of lanes contained in the zone.

3. The digital road network traffic state reckoning method based on multi-scale calculation according to 1, wherein step S4 specifically comprises:

S401, reckoning the delay time indexes of various evaluation objects at multiple spatial scales, wherein the delay time index of each evaluation object in the road network is a ratio of an overall delay time of all the passing vehicles in each evaluation object to the overall free-flow driving time, that is, an average delay time of all the passing vehicles in the distance corresponding to the unit free-flow driving time; and the delay time index of each evaluation object may be obtained by weighted summation of the traffic weight coefficients and the delay time indexes of the vehicles, the lanes, the sub-sections, the sections, and the intersections belonging to the evaluation object, and the traffic operation index is dimensionless, having an ability to further calculate the average delay time, specifically as follows:

a delay time index of the vehicle $V_v$ passing the lane $L_l$ is reckoned as follows:

$$DI_{(v,l)}^V = \frac{d_{(v,l)}^V}{tf_{(v,l)}^V}$$

a delay time index of the vehicle $V_v$ is reckoned as follows:

$$DI_v^V = \frac{\sum_{l\in S_{V,v}^L} d_{(v,l)}^V}{\sum_{l\in S_{V,v}^L} tf_l^L} = \frac{\sum_{l\in S_{V,v}^L}\left(DI_{(v,l)}^V \times tf_{(v,l)}^V\right)}{\sum_{v=1}^{N^V}\sum_{l\in S_{V,v}^L} tf_l^L} \times \frac{\sum_{v=1}^{N^V}\sum_{l\in S_{V,v}^L} tf_l^L}{\sum_{l\in S_{V,v}^L} tf_l^L} = \frac{\sum_{l\in S_{V,v}^L}\left(DI_{(v,l)}^V \times w_{(v,l)}^V\right)}{\sum_{l\in S_{V,v}^L} w_{(v,l)}^V}$$

a delay time index of the lane $L_l$ is reckoned as follows:

$$DI_l^L = \frac{\sum_{v\in S_{L,l}^V} d_{(v,l)}^V}{\sum_{v\in S_{L,l}^V} tf_{(v,l)}^V} = \frac{\sum_{v\in S_{L,l}^V} d_{(v,l)}^V}{\sum_{v=1}^{N^V}\sum_{l\in S_{V,v}^L} tf_{(v,l)}^V} \times \frac{\sum_{v=1}^{N^V}\sum_{l\in S_{V,v}^L} tf_{(v,l)}^V}{\sum_{v\in S_{L,l}^V} tf_{(v,l)}^V} = \frac{\sum_{v\in S_{L,l}^V}\left(DI_{(v,l)}^V \times w_{(v,l)}^V\right)}{\sum_{v\in S_{L,l}^V} w_{(v,l)}^V}$$

a delay time index of a subsection $U_u$ is reckoned as follows:

$$DI_u^U = \frac{\sum_{l\in S_{U,u}^L}\sum_{v\in S_{L,l}^V} d_{(v,l)}^V}{\sum_{l\in S_{U,u}^L}\sum_{v\in S_{L,l}^V} tf_{(v,l)}^V} = \frac{\sum_{l\in S_{U,u}^L}\sum_{v\in S_{L,l}^V}\left(DI_{(v,l)}^V \times w_{(v,l)}^V\right)}{\sum_{l\in S_{U,u}^L}\sum_{v\in S_{L,l}^V} w_{(v,l)}^V} \times \frac{\sum_{l\in S_{U,u}^L}\left(DI_l^L \times w_l^V\right)}{\sum_{l\in S_{U,u}^L} w_l^V}$$

a delay time index of the section $S_s$ is reckoned as follows:

$$DI_s^S = \frac{\sum_{u\in S_{S,s}^U}\sum_{l\in S_{U,u}^L}\sum_{v\in S_{L,l}^V} d_{(v,l)}^V}{\sum_{u\in S_{S,s}^U}\sum_{l\in S_{U,u}^L}\sum_{v\in S_{L,l}^V} tf_{(v,l)}^V} = \frac{\sum_{l\in S_{S,s}^L}\sum_{v\in S_{L,l}^V}\left(DI_{(v,l)}^V \times w_{(v,l)}^V\right)}{\sum_{l\in S_{S,s}^L}\sum_{v\in S_{L,l}^V} w_{(v,l)}^V} = \frac{\sum_{l\in S_{S,s}^L}\left(DI_l^L \times w_l^L\right)}{\sum_{l\in S_{S,s}^L} w_l^L} = \frac{\sum_{u\in S_{S,s}^U}\left(DI_u^U \times w_u^U\right)}{\sum_{u\in S_{S,s}^U} w_u^U}$$

a delay time index of the intersection $I_i$ is reckoned as follows:

$$DI_i^I = \frac{\sum_{l\in S_{I,i}^L}\sum_{v\in S_{L,l}^V} d_{(v,l)}^V}{\sum_{l\in S_{I,i}^L}\sum_{v\in S_{L,l}^V} tf_{(v,l)}^V} = \frac{\sum_{l\in S_{I,i}^L}\sum_{v\in S_{L,l}^V}\left(DI_{(v,l)}^V \times w_{(v,l)}^V\right)}{\sum_{l\in S_{I,i}^L}\sum_{v\in S_{L,l}^V} w_{(v,l)}^V} = \frac{\sum_{l\in S_{I,i}^L}\left(DI_l^L \times w_l^L\right)}{\sum_{l\in S_{I,i}^L} w_l^L}$$

a delay time index of the road $R_r$ is reckoned as follows:

$$DI_r^R = \frac{\sum_{s\in S_{R,r}^S}\sum_{u\in S_{S,s}^U}\sum_{l\in S_{U,u}^L}\sum_{v\in S_{L,l}^V} d_{(v,l)}^V + \sum_{i\in S_{R,r}^I}\sum_{l\in S_{I,i}^L}\sum_{v\in S_{L,l}^V} d_{(v,l)}^V}{\sum_{s\in S_{R,r}^S}\sum_{u\in S_{S,s}^U}\sum_{l\in S_{U,u}^L}\sum_{v\in S_{L,l}^V} tf_{(v,l)}^V + \sum_{i\in S_{R,r}^I}\sum_{l\in S_{I,i}^L}\sum_{v\in S_{L,l}^V} tf_{(v,l)}^V} = \frac{\sum_{l\in S_{R,r}^L}\sum_{v\in S_{L,l}^V} d_{(v,l)}^V}{\sum_{l\in S_{R,r}^L}\sum_{v\in S_{L,l}^V} tf_{(v,l)}^V} = \frac{\sum_{l\in S_{R,r}^L}\left(DI_l^L \times w_l^L\right)}{\sum_{l\in S_{R,r}^L} w_l^L}$$

a delay time index of a sub-zone $Z_z$ is reckoned as follows:

$$DI_z^Z = \frac{\sum_{s\in S_{Z,z}^S}\sum_{u\in S_{S,s}^U}\sum_{l\in S_{U,u}^L}\sum_{v\in S_{L,l}^V} d_{(v,l)}^V + \sum_{i\in S_{Z,z}^I}\sum_{l\in S_{I,i}^L}\sum_{v\in S_{L,l}^V} d_{(v,l)}^V}{\sum_{s\in S_{Z,z}^S}\sum_{u\in S_{S,s}^U}\sum_{l\in S_{U,u}^L}\sum_{v\in S_{L,l}^V} tf_{(v,l)}^V + \sum_{i\in S_{Z,z}^I}\sum_{l\in S_{I,i}^L}\sum_{v\in S_{L,l}^V} tf_{(v,l)}^V} = \frac{\sum_{l\in S_{Z,z}^L}\sum_{v\in S_{L,l}^V} d_{(v,l)}^V}{\sum_{l\in S_{Z,z}^L}\sum_{v\in S_{L,l}^V} tf_{(v,l)}^V} = \frac{\sum_{l\in S_{Z,z}^L}(DI_l^L \times w_l^L)}{\sum_{l\in S_{Z,z}^L} w_l^L}$$

a delay time index of a zone is reckoned as follows:

$$DI^A = \frac{\sum_{s\in S_A^S}\sum_{u\in S_{S,s}^U}\sum_{l\in S_{U,u}^L}\sum_{v\in S_{L,l}^V} d_{(v,l)}^V + \sum_{i\in S_A^I}\sum_{l\in S_{I,i}^L}\sum_{v\in S_{L,l}^V} d_{(v,l)}^V}{\sum_{s\in S_A^S}\sum_{u\in S_{S,s}^U}\sum_{l\in S_{U,u}^L}\sum_{v\in S_{L,l}^V} tf_{(v,l)}^V + \sum_{i\in S_A^I}\sum_{l\in S_{I,i}^L}\sum_{v\in S_{L,l}^V} tf_{(v,l)}^V} = \frac{\sum_{l\in S_A^L}\sum_{v\in S_{L,l}^V} d_{(v,l)}^V}{\sum_{l\in S_A^L}\sum_{v\in S_{L,l}^V} tf_{(v,l)}^V} = \sum_{l\in S_A^L}(DI_l^L \times w_l^L)$$

wherein $DI_{(v,l)}^V$ is the delay time index of the vehicle $V_v$ on the lane $L_l$; $d_{(v,l)}^V$ is the delay time of the vehicle $V_v$ passing the lane $L_l$; and $DI_v^V$, $DI_l^L$, $DI_u^U$, $DI_s^S$, $DI_i^I$, $DI_r^R$, $DI_z^Z$, and $DI^A$ represent the delay time indexes of the vehicle $V_v$, the lane $L_l$, the subsection $U_u$, the road $S_s$, the intersection $I_i$, the road $R_r$, the sub-zone $Z_z$, and the zone respectively; and S402, calculating the average delay times of various evaluation objects, wherein according to the acquired delay time indexes of the different evaluation objects at the multiple spatial scales, the average delay time of each evaluation object is calculated, which is specifically as follows:

an average delay time of the vehicle $V_v$ passing the lane $L_l$ is reckoned as follows:

$$d_{(v,l)}^V = DI_{(v,l)}^V \times tf_{(v,l)}^V$$

an average delay time of the vehicle $V_v$ is reckoned as follows:

$$d_v^V = \sum_{l\in S_{V,v}^L} d_{(v,l)}^V = DI_v^V \times \sum_{l\in S_{V,v}^L} tf_l^L = DI_v^V \times tf_v^V$$

an average delay time of the lane $L_l$ is reckoned as follows:

$$\overline{d}_l^L = \frac{\sum_{v\in S_{L,l}^V} d_{(v,l)}^V}{N_{L,l}^V} = \frac{\sum_{v\in S_{L,l}^V} d_{(v,l)}^V}{\sum_{v\in S_{L,l}^V} tf_{(v,l)}^V} \times \frac{\sum_{v\in S_{L,l}^V} tf_{(v,l)}^V}{N_{L,l}^V} = DI_l^L \times tf_l^L$$

an average delay time of a subsection $U_u$ is reckoned as follows:

$$\overline{d}_u^U = \frac{\sum_{l\in S_{U,u}^L}\sum_{v\in S_{L,l}^V} d_{(v,l)}^V}{N_{U,u}^V} = \frac{\sum_{l\in S_{U,u}^L}\sum_{v\in S_{L,l}^V} d_{(v,l)}^V}{\sum_{l\in S_{U,u}^L}\sum_{v\in S_{L,l}^V} tf_{(v,l)}^V} \times \frac{\sum_{l\in S_{U,u}^L}\sum_{v\in S_{L,l}^V} tf_{(v,l)}^V}{N_{U,u}^V} = DI_u^U \times tf_u^U$$

an average delay time of the section $S_s$ is reckoned as follows:

$$\overline{d}_s^S = \frac{\sum_{u\in S_{S,s}^U}\sum_{l\in S_{U,u}^L}\sum_{v\in S_{L,l}^V} d_{(v,l)}^V}{N_{S,s}^V} = \frac{\sum_{u\in S_{S,s}^U}\sum_{l\in S_{U,u}^L}\sum_{v\in S_{L,l}^V} d_{(v,l)}^V}{\sum_{u\in S_{S,s}^U}\sum_{l\in S_{U,u}^L}\sum_{v\in S_{L,l}^V} tf_{(v,l)}^V} \times \frac{\sum_{u\in S_{S,s}^U}\sum_{l\in S_{U,u}^L}\sum_{v\in S_{L,l}^V} tf_{(v,l)}^V}{N_{S,s}^V} = DI_s^S \times tf_s^S$$

an average delay time of the intersection $I_i$ is reckoned as follows:

$$\overline{d}_i^I = \frac{\sum_{l\in S_{I,i}^L}\sum_{v\in S_{L,l}^V} d_{(v,l)}^V}{N_{I,i}^V} = \frac{\sum_{l\in S_{I,i}^L}\sum_{v\in S_{L,l}^V} d_{(v,l)}^V}{\sum_{l\in S_{I,i}^L}\sum_{v\in S_{L,l}^V} tf_{(v,l)}^V} \times \frac{\sum_{l\in S_{I,i}^L}\sum_{v\in S_{L,l}^V} tf_{(v,l)}^V}{N_{I,i}^V} = DI_i^I \times tf_i^I$$

an average delay time of the road $R_r$ is reckoned as follows:

$$\overline{d}_r^R = \frac{\sum_{l\in S_{R,r}^L}\sum_{v\in S_{L,l}^V} d_{(v,l)}^V}{N_{R,r}^V} = \frac{\sum_{l\in S_{R,r}^L}\sum_{v\in S_{L,l}^V} d_{(v,l)}^V}{\sum_{l\in S_{R,r}^L}\sum_{v\in S_{L,l}^V} tf_{(v,l)}^V} \times \frac{\sum_{l\in S_{R,r}^L}\sum_{v\in S_{L,l}^V} tf_{(v,l)}^V}{N_{R,r}^V} = DI_r^R \times tf_r^R$$

an average delay time of a sub-zone $Z_z$ is reckoned as follows:

$$\bar{d}_z^Z=\frac{\sum_{l\in S_{Z,z}^L}\sum_{v\in S_{L,l}^V}d_{(v,l)}^V}{N_{Z,z}^V}=\frac{\sum_{l\in S_{Z,z}^L}\sum_{v\in S_{L,l}^V}d_{(v,l)}^V}{\sum_{l\in S_{Z,z}^L}\sum_{v\in S_{L,l}^V}tf_{(v,l)}^V}\times\frac{\sum_{l\in S_{Z,z}^L}\sum_{v\in S_{L,l}^V}tf_{(v,l)}^V}{N_{Z,z}^V}=DI_z^Z\times tf_z^Z$$

an average delay time of the zone is reckoned as follows:

$$\bar{d}^A=\frac{\sum_{l\in S_A^L}\sum_{v\in S_{L,l}^V}d_{(v,l)}^V}{N^V}=\frac{\sum_{l\in S_A^L}\sum_{v\in S_{L,l}^V}d_{(v,l)}^V}{\sum_{l\in S_A^L}\sum_{v\in S_{L,l}^V}tf_{(v,l)}^V}\times\frac{\sum_{l\in S_A^L}\sum_{v\in S_{L,l}^V}tf_{(v,l)}^V}{N^V}=DI^A\times tf^A$$

wherein $d_v^V$ is the delay time of the vehicle $V_v$; $\bar{d}_l^L$, $\bar{d}_u^U$, $\bar{d}_s^S$, $\bar{d}_i^I$, $\bar{d}_r^R$, $\bar{d}_z^Z$, and $\bar{d}^A$ represent the average delay times of the lane $L_l$, the subsection $U_u$, the section $S_s$, the intersection $I_i$, the road $R_r$, the sub-zone $Z_z$, and the zone respectively; $N_{L,l}^V$, $N_{U,u}^V$, $N_{S,s}^V$, $N_{I,i}^V$, $N_{R,r}^V$, and $N_{Z,z}^V$ represent numbers of vehicles passing the lane $L_l$, the subsection $U_u$, the section $S_s$, the intersection $I_i$, the road $R_r$, the sub-zone $Z_z$ within the evaluation period respectively; and $t_{f_u}^U$, $t_{f_s}^S$, $t_{f_i}^I$, $t_{f_r}^R$, $t_{f_z}^Z$, and $t_f^A$ represent the average free-flow driving times of the subsection $U_u$, the section $S_s$, the intersection $I_i$, the road $R_r$, the sub-zone $Z_z$, and the zone respectively.

4. The digital road network traffic state reckoning method based on multi-scale calculation according to 1, wherein step S5 specifically comprises:

S501, reckoning the indexes of the numbers of times of stopping of various evaluation objects at the multiple spatial scales, wherein the index of the number of times of stopping of each evaluation object in the road network is a ratio of an overall number of times of stopping of all the passing vehicles in each evaluation object to the overall free-flow driving time, that is, an average number of times of stopping of all the passing vehicles in the distance corresponding to the unit free-flow driving time; and the index of the number of times of stopping of each evaluation object may be obtained by weighted summation of the traffic weight coefficients and the indexes of the numbers of times of stopping of the vehicles, the lanes, the sub-sections, the sections, and the intersections belonging to the evaluation object, and the index of the number of times of stopping is in a unit of "times/min", having an ability to further calculate the average number of times of stopping, specifically as follows:

an index of number of times of stopping of the vehicle $V_v$ passing the lane $L_l$ is reckoned as follows:

$$HI_{(v,l)}^V=\frac{h_{(v,l)}^V}{tf_{(v,l)}^V}$$

an index of number of times of stopping of the vehicle $V_v$ is reckoned as follows:

$$HI_v^V=\frac{\sum_{l\in S_{V,v}^L}h_{(v,l)}^V}{\sum_{l\in S_{V,v}^L}tf_l^L}=\frac{\sum_{l\in S_{V,v}^L}\left(HI_{(v,l)}^V\times tf_{(v,l)}^V\right)}{\sum_{v=1}^{N^V}\sum_{l\in S_{V,v}^L}tf_l^L}\times\frac{\sum_{v=1}^{N^V}\sum_{l\in S_{V,v}^L}tf_l^L}{\sum_{l\in S_{V,v}^L}tf_l^L}=\frac{\sum_{l\in S_{V,v}^L}\left(HI_{(v,l)}^V\times w_{(v,l)}^V\right)}{\sum_{l\in S_{V,v}^L}w_{(v,l)}^V}$$

an index of number of times of stopping of the lane $L_l$ is reckoned as follows:

$$HI_l^L=\frac{\sum_{v\in S_{L,l}^V}h_{(v,l)}^V}{\sum_{v\in S_{L,l}^V}tf_{(v,l)}^V}=\frac{\sum_{v\in S_{L,l}^V}h_{(v,l)}^V}{\sum_{v=1}^{N^V}\sum_{l\in S_{L,l}^L}tf_{(v,l)}^V}\times\frac{\sum_{v=1}^{N^V}\sum_{l\in S_{L,l}^L}tf_{(v,l)}^V}{\sum_{v\in S_{L,l}^V}tf_{(v,l)}^V}=\frac{\sum_{v\in S_{L,l}^V}\left(HI_{(v,l)}^V\times w_{(v,l)}^V\right)}{\sum_{v\in S_{L,l}^V}w_{(v,l)}^V}$$

an index of number of times of stopping of the subsection $U_u$ is reckoned as follows:

$$HI_u^U=\frac{\sum_{l\in S_{U,u}^L}\sum_{v\in S_{L,l}^V}h_{(v,l)}^V}{\sum_{l\in S_{U,u}^L}\sum_{v\in S_{L,l}^V}tf_{(v,l)}^V}=\frac{\sum_{l\in S_{U,u}^L}\sum_{v\in S_{L,l}^V}\left(HI_{(v,l)}^V\times w_{(v,l)}^V\right)}{\sum_{l\in S_{U,u}^L}\sum_{v\in S_{L,l}^V}w_{(v,l)}^V}=\frac{\sum_{l\in S_{U,u}^L}\left(HI_l^L\times w_l^L\right)}{\sum_{l\in S_{U,u}^L}w_l^L}$$

an index of number of times of stopping of the section $S_s$ is reckoned as follows:

$$HI_s^S=\frac{\sum_{u\in S_{S,s}^U}\sum_{l\in S_{U,u}^L}\sum_{v\in S_{L,l}^V}h_{(v,l)}^V}{\sum_{u\in S_{S,s}^U}\sum_{l\in S_{U,u}^L}\sum_{v\in S_{L,l}^V}tf_{(v,l)}^V}=\frac{\sum_{l\in S_{S,s}^L}\sum_{v\in S_{L,l}^V}\left(HI_{(v,l)}^V\times w_{(v,l)}^V\right)}{\sum_{l\in S_{S,s}^L}\sum_{v\in S_{L,l}^V}w_{(v,l)}^V}=\frac{\sum_{l\in S_{S,s}^L}\left(HI_l^L\times w_l^L\right)}{\sum_{l\in S_{S,s}^L}w_k^L}=\frac{\sum_{u\in S_{S,s}^U}\left(HI_u^U\times w_u^U\right)}{\sum_{u\in S_{S,s}^U}w_u^U}$$

an index of number of times of stopping of the intersection $I_i$ is reckoned as follows:

$$HI_i^I=\frac{\sum_{l\in S_{I,i}^L}\sum_{v\in S_{L,l}^V}h_{(v,l)}^V}{\sum_{l\in S_{I,i}^L}\sum_{v\in S_{L,l}^V}tf_{(v,l)}^V}=\frac{\sum_{l\in S_{I,i}^L}\sum_{v\in S_{L,l}^V}\left(HI_{(v,l)}^V\times w_{(v,l)}^V\right)}{\sum_{l\in S_{I,i}^L}\sum_{v\in S_{L,l}^V}w_{(v,l)}^V}=\frac{\sum_{l\in S_{I,i}^L}\left(HI_l^L\times w_l^L\right)}{\sum_{l\in S_{I,i}^L}w_l^L}$$

an index of number of times of stopping of the road $R_r$ is reckoned as follows:

$$HI_r^R = \frac{\sum_{s\in S_{R,r}^S}\sum_{u\in S_{S,s}^U}\sum_{l\in S_{U,u}^L}\sum_{v\in S_{L,l}^V} h_{(v,l)}^V + \sum_{i\in S_{R,r}^I}\sum_{l\in S_{I,i}^L}\sum_{v\in S_{L,l}^V} h_{(v,l)}^V}{\sum_{s\in S_{R,r}^S}\sum_{u\in S_{S,s}^U}\sum_{l\in S_{U,u}^L}\sum_{v\in S_{L,l}^V} tf_{(v,l)}^V + \sum_{i\in S_{R,r}^I}\sum_{l\in S_{I,i}^L}\sum_{v\in S_{L,l}^V} tf_{(v,l)}^V} = \frac{\sum_{l\in S_{R,r}^L}\sum_{v\in S_{L,l}^V} h_{(v,l)}^V}{\sum_{l\in S_{R,r}^L}\sum_{v\in S_{L,l}^V} tf_{(v,l)}^V} = \frac{\sum_{l\in S_{R,r}^L}\left(HI_l^L\times w_l^L\right)}{\sum_{l\in S_{R,r}^L} w_l^L}$$

an index of number of times of stopping of the sub-zone $Z_z$ is reckoned as follows:

$$HI_z^Z = \frac{\sum_{s\in S_{Z,z}^S}\sum_{u\in S_{S,s}^U}\sum_{l\in S_{U,u}^L}\sum_{v\in S_{L,l}^V} h_{(v,l)}^V + \sum_{i\in S_{Z,z}^I}\sum_{l\in S_{I,i}^L}\sum_{v\in S_{L,l}^V} h_{(v,l)}^V}{\sum_{s\in S_{Z,z}^S}\sum_{u\in S_{S,s}^U}\sum_{l\in S_{U,u}^L}\sum_{v\in S_{L,l}^V} tf_{(v,l)}^V + \sum_{i\in S_{Z,z}^I}\sum_{l\in S_{I,i}^L}\sum_{v\in S_{L,l}^V} tf_{(v,l)}^V} = \frac{\sum_{l\in S_{Z,z}^L}\sum_{v\in S_{L,l}^V} h_{(v,l)}^V}{\sum_{l\in S_{Z,z}^L}\sum_{v\in S_{L,l}^V} tf_{(v,l)}^V} = \frac{\sum_{l\in S_{Z,z}^L}\left(HI_l^L\times w_l^L\right)}{\sum_{l\in S_{Z,z}^L} w_l^L}$$

an index of number of times of stopping of the zone is reckoned as follows:

$$HI^A = \frac{\sum_{s\in S_{A}^S}\sum_{u\in S_{S,s}^U}\sum_{l\in S_{U,u}^L}\sum_{v\in S_{L,l}^V} h_{(v,l)}^V + \sum_{i\in S_{A}^I}\sum_{l\in S_{I,i}^L}\sum_{v\in S_{L,l}^V} h_{(v,l)}^V}{\sum_{s\in S_{A}^S}\sum_{u\in S_{S,s}^U}\sum_{l\in S_{U,u}^L}\sum_{v\in S_{L,l}^V} tf_{(v,l)}^V + \sum_{i\in S_{A}^I}\sum_{l\in S_{I,i}^L}\sum_{v\in S_{L,l}^V} tf_{(v,l)}^V} = \frac{\sum_{l\in S_{A}^L}\sum_{v\in S_{L,l}^V} h_{(v,l)}^V}{\sum_{l\in S_{A}^L}\sum_{v\in S_{L,l}^V} tf_{(v,l)}^V} = \sum_{l\in S_A^L}\left(HI_l^L\times w_l^L\right)$$

wherein $HI_{(v,l)}^V$ is the index of the number of times of stopping of the vehicle $V_v$ on the lane $L_l$; $h_{(v,l)}^V$ is the number of times of stopping of the vehicle $V_v$ passing the lane $L_l$; and $HI_v^V$, $HI_l^L$, $HI_u^U$, $HI_s^S$, $HI_i^I$, $HI_r^R$, $HI_z^Z$, and $HI^A$ represent the indexes of number of times of stopping of the vehicle $V_v$, the lane $L_l$, the subsection $U_u$, the section $S_s$, the intersection $I_i$, the road $R_r$, the sub-zone $Z_z$, and the zone respectively; and S502, calculating the average numbers of times of stopping of various evaluation objects, wherein according to the acquired indexes of number of times of stopping of the different evaluation objects at the multiple spatial scales, the average numbers of times of stopping of various evaluation objects are calculated, which are specifically as follows:

an average number of times of stopping of the vehicle $V_v$ passing the lane $L_l$ is reckoned as follows:

$$h_{(v,l)}^V = HI_{(v,l)}^V \times tf_{(v,l)}^V$$

an average number of times of stopping of the vehicle $V_v$ is reckoned as follows:

$$h_v^V = \sum_{l\in S_{V,v}^L} h_{(v,l)}^V = HI_v^V \times \sum_{l\in S_{V,v}^L} tf_l^L = HI_v^V \times tf_v^V$$

an average number of times of stopping of the lane $L_l$ is reckoned as follows:

$$\overline{h}_l^L = \frac{\sum_{v\in S_{L,l}^V} h_{(v,l)}^V}{N_{L,l}^V} = \frac{\sum_{v\in S_{L,l}^V} h_{(v,l)}^V}{\sum_{v\in S_{L,l}^V} tf_{(v,l)}^V} \times \frac{\sum_{v\in S_{L,l}^V} tf_{(v,l)}^V}{N_{L,l}^V} = HI_l^L \times tf_l^L$$

an average number of times of stopping of the subsection $U_u$ is reckoned as follows:

$$\overline{h}_u^U = \frac{\sum_{l\in S_{U,u}^L}\sum_{v\in S_{L,l}^V} h_{(v,l)}^V}{N_{U,u}^V} = \frac{\sum_{l\in S_{U,u}^L}\sum_{v\in S_{L,l}^V} h_{(v,l)}^V}{\sum_{l\in S_{U,u}^L}\sum_{v\in S_{L,l}^V} tf_{(v,l)}^V} \times \frac{\sum_{l\in S_{U,u}^L}\sum_{v\in S_{L,l}^V} tf_{(v,l)}^V}{N_{U,u}^V} = HI_u^U \times tf_u^U$$

an average number of times of stopping of the section $S_s$ is reckoned as follows:

$$\overline{h}_s^S = \frac{\sum_{u\in S_{S,s}^U}\sum_{l\in S_{U,u}^L}\sum_{v\in S_{L,l}^V} h_{(v,l)}^V}{N_{S,s}^V} = \frac{\sum_{u\in S_{S,s}^U}\sum_{l\in S_{U,u}^L}\sum_{v\in S_{L,l}^V} h_{(v,l)}^V}{\sum_{u\in S_{S,s}^U}\sum_{l\in S_{U,u}^L}\sum_{v\in S_{L,l}^V} tf_{(v,l)}^V} \times \frac{\sum_{u\in S_{S,s}^U}\sum_{l\in S_{U,u}^L}\sum_{v\in S_{L,l}^V} tf_{(v,l)}^V}{N_{S,s}^V} = HI_s^S \times tf_s^S$$

an average number of times of stopping of the intersection $I_i$ is reckoned as follows:

$$\overline{h}_i^I = \frac{\sum_{l\in S_{I,i}^L}\sum_{v\in S_{L,l}^V} h_{(v,l)}^V}{N_{I,i}^V} = \frac{\sum_{l\in S_{I,i}^L}\sum_{v\in S_{L,l}^V} h_{(v,l)}^V}{\sum_{l\in S_{I,i}^L}\sum_{v\in S_{L,l}^V} tf_{(v,l)}^V} \times \frac{\sum_{l\in S_{I,i}^L}\sum_{v\in S_{L,l}^V} tf_{(v,l)}^V}{N_{I,i}^V} = HI_s^S \times tf_i^I$$

an average number of times of stopping of the road $R_r$ is reckoned as follows:

$$\overline{h}_r^R=\frac{\sum_{l\in S_{R,r}^L}\sum_{v\in S_{L,l}^V}h_{(v,l)}^V}{N_{R,r}^V}=\frac{\sum_{l\in S_{R,r}^L}\sum_{v\in S_{L,l}^V}h_{(v,l)}^V}{\sum_{l\in S_{R,r}^L}\sum_{v\in S_{L,l}^V}tf_{(v,l)}^V}\times\frac{\sum_{l\in S_{R,r}^L}\sum_{v\in S_{L,l}^V}tf_{(v,l)}^V}{N_{R,r}^V}=HI_r^R\times tf_r^R$$

an average number of times of stopping of the sub-zone $Z_z$ is reckoned as follows:

$$\overline{h}_z^Z=\frac{\sum_{l\in S_{Z,z}^L}\sum_{v\in S_{L,l}^V}h_{(v,l)}^V}{N_{Z,z}^V}=\frac{\sum_{l\in S_{Z,z}^L}\sum_{v\in S_{L,l}^V}h_{(v,l)}^V}{\sum_{l\in S_{Z,z}^L}\sum_{v\in S_{L,l}^V}tf_{(v,l)}^V}\times\frac{\sum_{l\in S_{Z,z}^L}\sum_{v\in S_{L,l}^V}tf_{(v,l)}^V}{N_{Z,z}^V}=HI_z^Z\times tf_z^Z$$

an average number of times of stopping of the zone is reckoned as follows:

$$\overline{h}^A=\frac{\sum_{l\in S_A^L}\sum_{v\in S_{L,l}^V}h_{(v,l)}^V}{N_A^V}=\frac{\sum_{l\in S_A^L}\sum_{v\in S_{L,l}^V}h_{(v,l)}^V}{\sum_{l\in S_A^L}\sum_{v\in S_{L,l}^V}tf_{(v,l)}^V}\times\frac{\sum_{l\in S_A^L}\sum_{v\in S_{L,l}^V}tf_{(v,l)}^V}{N_A^V}=HI^A\times tf^A$$

wherein $h_v^V$ is the number of times of stopping of the vehicle $V_v$; and $\overline{h}_l^L$, $\overline{h}_u^U$, $\overline{h}_s^S$, $\overline{h}_i^I$, $\overline{h}_r^R$, $\overline{h}_z^Z$, and $\overline{h}^A$ represent the average numbers of times of stopping of the lane $L_l$, the subsection $U_u$, the second $S_s$, the intersection $I_i$, the road $R_r$, the sub-zone $Z_z$, and the zone respectively.

5. The digital road network traffic state reckoning method based on multi-scale calculation according to 1, wherein step S6 specifically comprises:

S601, reckoning the indexes of the mileages of the congested roads of various evaluation objects at the multiple spatial scales, wherein the index of the mileage of the congested roads of each evaluation object in the road network is a ratio of an overall mileage of a heavily congested road of all the passing vehicles in each evaluation object to the overall free-flow driving time, that is, an average mileage of a heavily congested road of all the passing vehicles in the distance corresponding to the unit free-flow driving time; and the index of the mileage of the congested road of each evaluation object may be obtained by weighted summation of the traffic weight coefficients and the indexes of the mileages of the congested roads of the vehicles, the lanes, the sub-sections, the sections, and the intersections belonging to the evaluation object, and the index of the mileage of the congested road is in a unit of "m/min", having an ability to further calculate the proportion of the mileage of the heavily congested road, specifically as follows:

an index of a mileage of a congested road of the vehicle $V_v$ passing the lane Ly is reckoned as follows:

$$MI_{(v,l)}^V=\frac{l_{c(v,l)}^V}{tf_{(v,l)}^V}$$

an index of a mileage of a congested road of the vehicle $V_v$ is reckoned as follows:

$$MI_v^V=\frac{\sum_{l\in S_{V,v}^L}l_{c(v,l)}^V}{\sum_{l\in S_{V,v}^L}tf_{(v,l)}^V}=\frac{\sum_{l\in S_{V,v}^L}\left(MI_{(v,l)}^V\times tf_{(v,l)}^V\right)}{\sum_{v=1}^{N^V}\sum_{l\in S_{V,v}^L}tf_l^L}\times\frac{\sum_{v=1}^{N^V}\sum_{l\in S_{V,v}^L}tf_l^L}{\sum_{l\in S_{V,v}^L}tf_l^L}=\frac{\sum_{l\in S_{V,v}^L}\left(MI_{(v,l)}^V\times w_{(v,l)}^V\right)}{\sum_{l\in S_{V,v}^L}w_{(v,l)}^V}$$

an index of a mileage of a congested road of the lane $L_l$ is reckoned as follows:

$$MI_l^L=\frac{\sum_{v\in S_{L,l}^V}l_{c(v,l)}^V}{\sum_{v\in S_{L,l}^V}tf_{(v,l)}^V}=\frac{\sum_{v\in S_{L,l}^V}l_{c(v,l)}^V}{\sum_{v=1}^{N^V}\sum_{v\in S_{L,l}^V}tf_{(v,l)}^V}\times\frac{\sum_{v=1}^{N^V}\sum_{v\in S_{L,l}^V}tf_{(v,l)}^V}{\sum_{v\in S_{L,l}^V}tf_{(v,l)}^V}=\frac{\sum_{v\in S_{L,l}^V}\left(MI_{(v,l)}^V\times w_{(v,l)}^V\right)}{\sum_{v\in S_{L,l}^V}w_{(v,l)}^V}$$

an index of a mileage of a congested road of the subsection $U_u$ is reckoned as follows:

$$MI_u^U=\frac{\sum_{l\in S_{U,u}^L}\sum_{v\in S_{L,l}^V}l_{c(v,l)}^V}{\sum_{l\in S_{U,u}^L}\sum_{v\in S_{L,l}^V}tf_{(v,l)}^V}=\frac{\sum_{l\in S_{U,u}^L}\sum_{v\in S_{L,l}^V}\left(MI_{(v,l)}^V\times w_{(v,l)}^V\right)}{\sum_{l\in S_{U,u}^L}\sum_{v\in S_{L,l}^V}w_{(v,l)}^V}=\frac{\sum_{l\in S_{U,u}^L}\left(MI_l^L\times w_l^L\right)}{\sum_{l\in S_{U,u}^L}w_l^L}$$

an index of a mileage of a congested road of the section $S_s$ is reckoned as follows:

$$MI_s^S=\frac{\sum_{u\in S_{S,s}^U}\sum_{l\in S_{U,u}^L}\sum_{v\in S_{L,l}^V}l_{c(v,l)}^V}{\sum_{u\in S_{S,s}^U}\sum_{l\in S_{U,u}^L}\sum_{v\in S_{L,l}^V}tf_{(v,l)}^V}=\frac{\sum_{l\in S_{S,s}^L}\sum_{v\in S_{L,l}^V}\left(MI_{(v,l)}^V\times w_{(v,l)}^V\right)}{\sum_{l\in S_{S,s}^L}\sum_{v\in S_{L,l}^V}w_{(v,l)}^V}=\frac{\sum_{l\in S_{S,s}^L}\left(MI_l^L\times w_l^L\right)}{\sum_{l\in S_{S,s}^L}w_l^L}=\frac{\sum_{u\in S_{S,s}^U}\left(MI_u^U\times w_u^U\right)}{\sum_{u\in S_{S,s}^U}w_u^U}$$

an index of a mileage of a congested road of the intersection $I_i$ is reckoned as follows:

$$MI_i^I=\frac{\sum_{l\in S_{I,i}^L}\sum_{v\in S_{L,l}^V} l_{c(v,l)}^V}{\sum_{l\in S_{I,i}^L}\sum_{v\in S_{L,l}^V} tf_{(v,l)}^V}=\frac{\sum_{l\in S_{I,i}^L}\sum_{v\in S_{L,l}^V}\left(MI_{(v,l)}^V\times w_{(v,l)}^V\right)}{\sum_{l\in S_{I,i}^L}\sum_{v\in S_{L,l}^V} w_{(v,l)}^V}=\frac{\sum_{l\in S_{I,i}^L}\left(MI_l^L\times w_l^L\right)}{\sum_{l\in S_{I,i}^L} w_l^L}$$

an index of a mileage of a congested road of the road $R_r$ is reckoned as follows:

$$MI_r^R=\frac{\sum_{s\in S_{R,r}^S}\sum_{u\in S_{S,s}^U}\sum_{l\in S_{U,u}^L}\sum_{v\in S_{L,l}^V} l_{c(v,l)}^V+\sum_{i\in S_{R,r}^I}\sum_{l\in S_{I,i}^L}\sum_{v\in S_{L,l}^V} l_{c(v,l)}^V}{\sum_{s\in S_{R,r}^S}\sum_{u\in S_{S,s}^U}\sum_{l\in S_{U,u}^L}\sum_{v\in S_{L,l}^V} tf_{(v,l)}^V+\sum_{i\in S_{R,r}^I}\sum_{l\in S_{I,i}^L}\sum_{v\in S_{L,l}^V} tf_{(v,l)}^V}=\frac{\sum_{l\in S_{R,r}^L}\sum_{v\in S_{L,l}^V} l_{c(v,l)}^V}{\sum_{l\in S_{R,r}^L}\sum_{v\in S_{L,l}^V} tf_{(v,l)}^V}=\frac{\sum_{l\in S_{R,r}^L}\left(MI_l^L\times w_l^L\right)}{\sum_{l\in S_{R,r}^L} w_l^L}$$

an index of a mileage of a congested road of the sub-zone $Z_z$ is reckoned as follows:

$$MI_z^Z=\frac{\sum_{s\in S_{Z,z}^S}\sum_{u\in S_{S,s}^U}\sum_{l\in S_{U,u}^L}\sum_{v\in S_{L,l}^V} l_{c(v,l)}^V+\sum_{i\in S_{Z,z}^I}\sum_{l\in S_{I,i}^L}\sum_{v\in S_{L,l}^V} l_{c(v,l)}^V}{\sum_{s\in S_{Z,z}^S}\sum_{u\in S_{S,s}^U}\sum_{l\in S_{U,u}^L}\sum_{v\in S_{L,l}^V} tf_{(v,l)}^V+\sum_{i\in S_{Z,z}^I}\sum_{l\in S_{I,i}^L}\sum_{v\in S_{L,l}^V} tf_{(v,l)}^V}=\frac{\sum_{l\in S_{Z,z}^L}\sum_{v\in S_{L,l}^V} l_{c(v,l)}^V}{\sum_{l\in S_{Z,z}^L}\sum_{v\in S_{L,l}^V} tf_{(v,l)}^V}=\frac{\sum_{l\in S_{Z,z}^L}\left(MI_l^L\times w_l^L\right)}{\sum_{l\in S_{Z,z}^L} w_l^L}$$

an index of a mileage of a congested road of the zone is reckoned as follows:

$$MI^A=\frac{\sum_{s\in S_A^S}\sum_{u\in S_{S,s}^U}\sum_{l\in S_{U,u}^L}\sum_{v\in S_{L,l}^V} l_{c(v,l)}^V+\sum_{i\in S_A^I}\sum_{l\in S_{I,i}^L}\sum_{v\in S_{L,l}^V} l_{c(v,l)}^V}{\sum_{s\in S_A^S}\sum_{u\in S_{S,s}^U}\sum_{l\in S_{U,u}^L}\sum_{v\in S_{L,l}^V} tf_{(v,l)}^V+\sum_{i\in S_A^I}\sum_{l\in S_{I,i}^L}\sum_{v\in S_{L,l}^V} tf_{(v,l)}^V}=\frac{\sum_{l\in S_A^L}\sum_{v\in S_{L,l}^V} l_{c(v,l)}^V}{\sum_{l\in S_A^L}\sum_{v\in S_{L,l}^V} tf_{(v,l)}^V}=\sum_{l\in S_A^L}\left(MI_l^L\times w_l^L\right)$$

wherein $MI_{(v,l)}^V$ is the index of the mileage of the congested road of the vehicle $V_v$ on the lane $L_l$; $l_{c(v,l)}^V$ is the mileage of the congested road of the vehicle $V_v$ passing the lane $L_l$; and $MI_v^V$, $MI_l^L$, $MI_u^U$, $MI_s^S$, $MI_i^I$, $MI_r^R$, $MI_z^Z$, and $MI^A$ represent the indexes of the mileages of the congested roads of the vehicle $V_v$, the lane $L_l$, the subsection $U_u$, the section $S_s$, the intersection $I_i$, the road $R_r$, the sub-zone $Z_z$, and the zone respectively; and S602, calculating the proportions of the mileages of the heavily congested roads of various evaluation objects, wherein according to the acquired index of the mileage of the congested road of the different evaluation objects at the multiple spatial scales, the proportion of the mileage of the heavily congested road of each evaluation object is calculated, which is specifically as follows:

a proportion of a mileage of a heavily congested road of the vehicle $V_v$ passing the lane $L_l$ is reckoned as follows:

$$m_{(v,l)}^V=\frac{l_{c(v,l)}^V}{l_{(v,l)}^V}=\frac{l_{c(v,l)}^V}{tf_{(v,l)}^V}\times\frac{tf_{(v,l)}^V}{l_{(v,l)}^V}=\frac{MI_{(v,l)}^V}{Vf_{(v,l)}^V}$$

a proportion of a mileage of a heavily congested road of the vehicle $V_v$ is reckoned as follows:

$$m_v^V=\frac{\sum_{l\in S_{V,v}^L} l_{c(v,l)}^V}{\sum_{l\in S_{V,v}^L} l_{(v,l)}^V}=\frac{\sum_{l\in S_{V,v}^L} l_{c(v,l)}^V}{\sum_{l\in S_{V,v}^L} tf_l^L}\times\frac{\sum_{l\in S_{V,v}^L} tf_l^L}{\sum_{l\in S_{V,v}^L} l_{(v,l)}^V}=\frac{MI_v^V}{Vf_v^V}$$

a proportion of a mileage of a heavily congested road of the lane $L_l$ is reckoned as follows:

$$m_l^L=\frac{\sum_{v\in S_{L,l}^V} l_{c(v,l)}^V}{\sum_{v\in S_{L,l}^V} l_{(v,l)}^V}=\frac{\sum_{v\in S_{L,l}^V} l_{c(v,l)}^V}{\sum_{v\in S_{L,l}^V} tf_{(v,l)}^V}\times\frac{\sum_{v\in S_{L,l}^V} tf_{(v,l)}^V}{\sum_{v\in S_{L,l}^V} l_{(v,l)}^V}=\frac{MI_l^L}{Vf_l^L}$$

a proportion of a mileage of a heavily congested road of the subsection $U_u$ is reckoned as follows:

$$m_u^U=\frac{\sum_{l\in S_{U,u}^L}\sum_{v\in S_{L,l}^V} l_{c(v,l)}^V}{\sum_{l\in S_{U,u}^L}\sum_{v\in S_{L,l}^V} l_{(v,l)}^V}=\frac{\sum_{l\in S_{U,u}^L}\sum_{v\in S_{L,l}^V} l_{c(v,l)}^V}{\sum_{l\in S_{U,u}^L}\sum_{v\in S_{L,l}^V} tf_{(v,l)}^V}\times\frac{\sum_{l\in S_{U,u}^L}\sum_{v\in S_{L,l}^V} tf_{(v,l)}^V}{\sum_{l\in S_{U,u}^L}\sum_{v\in S_{L,l}^V} l_{(v,l)}^V}=\frac{MI_u^U}{Vf_u^U}$$

a proportion of a mileage of a heavily congested road of the section $S_s$ is reckoned as follows:

$$m_s^S=\frac{\sum_{u\in S_{S,s}^U}\sum_{l\in S_{U,u}^L}\sum_{v\in S_{L,l}^V} l_{c(v,l)}^V}{\sum_{u\in S_{S,s}^U}\sum_{l\in S_{U,u}^L}\sum_{v\in S_{L,l}^V} l_{(v,l)}^V}=\frac{\sum_{u\in S_{S,s}^U}\sum_{l\in S_{U,u}^L}\sum_{v\in S_{L,l}^V} l_{c(v,l)}^V}{\sum_{u\in S_{S,s}^U}\sum_{l\in S_{U,u}^L}\sum_{v\in S_{L,l}^V} tf_{(v,l)}^V}\times\frac{\sum_{u\in S_{S,s}^U}\sum_{l\in S_{U,u}^L}\sum_{v\in S_{L,l}^V} tf_{(v,l)}^V}{\sum_{u\in S_{S,s}^U}\sum_{l\in S_{U,u}^L}\sum_{v\in S_{L,l}^V} l_{(v,l)}^V}=\frac{MI_s^S}{Vf_s^S}$$

a proportion of a mileage of a heavily congested road of the intersection $I_i$ is reckoned as follows:

$$m_i^I = \frac{\sum_{l \in S_{I,i}^L} \sum_{v \in S_{L,l}^V} l_{c(v,l)}^V}{\sum_{l \in S_{I,i}^L} \sum_{v \in S_{L,l}^V} l_{(v,l)}^V} = \frac{\sum_{l \in S_{I,i}^L} \sum_{v \in S_{L,l}^V} l_{c(v,l)}^V}{\sum_{l \in S_{I,i}^L} \sum_{v \in S_{L,l}^V} tf_{(v,l)}^V} \times \frac{\sum_{l \in S_{I,i}^L} \sum_{v \in S_{L,l}^V} tf_{(v,l)}^V}{\sum_{l \in S_{I,i}^L} \sum_{v \in S_{L,l}^V} l_{(v,l)}^V} = \frac{MI_i^I}{\overline{V_f}_i^I}$$

a proportion of a mileage of a heavily congested road of the road $R_r$ is reckoned as follows:

$$m_r^R = \frac{\sum_{l \in S_{R,r}^L} \sum_{v \in S_{L,l}^V} l_{c(v,l)}^V}{\sum_{l \in S_{R,r}^L} \sum_{v \in S_{L,l}^V} l_{(v,l)}^V} = \frac{\sum_{l \in S_{R,r}^L} \sum_{v \in S_{L,l}^V} l_{c(v,l)}^V}{\sum_{l \in S_{R,r}^L} \sum_{v \in S_{L,l}^V} tf_{(v,l)}^V} \times \frac{\sum_{l \in S_{R,r}^L} \sum_{v \in S_{L,l}^V} tf_{(v,l)}^V}{\sum_{l \in S_{R,r}^L} \sum_{v \in S_{L,l}^V} l_{(v,l)}^V} = \frac{MI_r^R}{\overline{V_f}_r^R}$$

a proportion of a mileage of a heavily congested road of the sub-zone $Z_z$ is reckoned as follows:

$$m_z^Z = \frac{\sum_{l \in S_{Z,z}^L} \sum_{v \in S_{L,l}^V} l_{c(v,l)}^V}{\sum_{l \in S_{Z,z}^L} \sum_{v \in S_{L,l}^V} l_{(v,l)}^V} = \frac{\sum_{l \in S_{Z,z}^L} \sum_{v \in S_{L,l}^V} l_{c(v,l)}^V}{\sum_{l \in S_{Z,z}^L} \sum_{v \in S_{L,l}^V} tf_{(v,l)}^V} \times \frac{\sum_{l \in S_{Z,z}^L} \sum_{v \in S_{L,l}^V} tf_{(v,l)}^V}{\sum_{l \in S_{Z,z}^L} \sum_{v \in S_{L,l}^V} l_{(v,l)}^V} = \frac{MI_z^Z}{\overline{V_f}_z^Z}$$

a proportion of a mileage of a heavily congested road of the zone is reckoned as follows:

$$m^A = \frac{\sum_{l \in S_A^L} \sum_{v \in S_{L,l}^V} l_{c(v,l)}^V}{\sum_{l \in S_A^L} \sum_{v \in S_{L,l}^V} l_{(v,l)}^V} = \frac{\sum_{l \in S_A^L} \sum_{v \in S_{L,l}^V} l_{c(v,l)}^V}{\sum_{l \in S_A^L} \sum_{v \in S_{L,l}^V} tf_{(v,l)}^V} \times \frac{\sum_{l \in S_A^L} \sum_{v \in S_{L,l}^V} tf_{(v,l)}^V}{\sum_{l \in S_A^L} \sum_{v \in S_{L,l}^V} l_{(v,l)}^V} = \frac{MI^A}{\overline{V_f}^A}$$

wherein $m_{(v,l)}^V$ is the proportion of the mileage of the heavily congested road of the vehicle $V_v$ on the lane $L_l$; $l_{(v,l)}^V$ is a vehicle mileage of the vehicle $V_v$ passing the lane $L_l$; $V_{f_{(v,l)}}^V$ is a flow-free driving speed of the vehicle $V_v$ passing the lane $L_l$; $m_v^V$, $m_l^L$, $m_u^U$, $m_s^S$, $m_i^I$, $m_r^R$, $m_z^Z$, and $m^A$ represent proportions of mileages of heavily congested roads of the vehicle $V_v$, the lane $L_l$, the subsection $U_u$, the section $S_s$, the intersection $I_i$, the road $R_r$, the sub-zone $Z_z$, and the zone respectively; and $\nabla_{f_v}^V$, $\nabla_{f_l}^L$, $\nabla_{f_u}^U$, $\nabla_{f_s}^S$, $\hat{V}_{f_i}^I$, $\nabla f_r^R$, $\nabla f_z^Z$, and $\overline{V}_f^A$ represent average flow-free driving speeds of the vehicle $V_v$, the lane $L_l$, the subsection $U_u$, the section $S_s$, the intersection $I_i$, the road $R_r$, the sub-zone $Z_z$, and the zone respectively.

6. The digital road network traffic state reckoning method based on multi-scale calculation according to 1, wherein the larger the traffic operation index, the delay time index, the index of the number of times of stopping, and the index of the mileage of the congested road are, the worse the traffic operation state is, that is, the more congested the road traffic is.

* * * * *